(12) United States Patent  
Horvitz

(10) Patent No.: US 8,402,148 B2  
(45) Date of Patent: *Mar. 19, 2013

(54) REPRESENTATION, DECISION MODELS, AND USER INTERFACE FOR ENCODING MANAGING PREFERENCES, AND PERFORMING AUTOMATED DECISION MAKING ABOUT THE TIMING AND MODALITIES OF INTERPERSONAL COMMUNICATIONS

(75) Inventor: Eric J. Horvitz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 882 days.

This patent is subject to a terminal disclaimer.

(21) Appl. No.: 11/965,141

(22) Filed: Dec. 27, 2007

(65) Prior Publication Data

US 2008/0104517 A1  May 1, 2008

Related U.S. Application Data

(63) Continuation of application No. 10/281,546, filed on Oct. 28, 2002, now Pat. No. 7,330,895, which is a continuation-in-part of application No. 09/809,142, filed on Mar. 15, 2001, now Pat. No. 7,389,351.

(51) Int. Cl.
*G06F 15/16* (2006.01)

(52) U.S. Cl. ........................................ 709/228; 709/227

(58) Field of Classification Search .................. 709/203, 709/204, 220–222, 227–229, 240, 249; 379/265–266.1; 455/414–420

See application file for complete search history.

(56) References Cited

U.S. PATENT DOCUMENTS

| | | | |
|---|---|---|---|
| 4,672,632 A | 6/1987 | Andersen | |
| 4,791,561 A | 12/1988 | Huber | |
| 5,487,111 A | 1/1996 | Slusky | |
| 5,493,692 A | 2/1996 | Theimer et al. | |
| 5,513,126 A | 4/1996 | Harkins et al. | |
| 5,530,745 A | 6/1996 | Urasaka et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,615,342 A | 3/1997 | Johnson | |

(Continued)

FOREIGN PATENT DOCUMENTS

| EP | 1594070 A2 | 11/2005 |
|---|---|---|
| JP | 09-091358 A | 4/1997 |

(Continued)

OTHER PUBLICATIONS

T. Joachims, Text categorization with support vector machines: learning with many relevant features, Machine Learning, European Conference on Machine Learning, Apr. 21, 1998, pp. 137-142.

(Continued)

*Primary Examiner* — Brendan Higa

(57) ABSTRACT

The present invention relates to a system and methodology providing a user interface that can be employed by contactors and contactees in conjunction with a communications architecture for identifying and establishing an optimal communication based on preferences, capabilities, contexts and goals of the parties to engage in the communication. The user interface can include a graphical display having a plurality of display objects and associated input fields operable by one or more parties to a communication in order to facilitate convenient access, control, personalization and communications via the communications architecture. For example, configuration capabilities are provided in the user interface to enable operational adjustments to one or more operating parameters, communications groupings, policies and/or context preferences relating to a preferred modality of communication and to potential parties of communication between the contactors and contactees. User interface controls are also provided for defining deterministic policies and for encoding preferences for cost-benefit analyses.

20 Claims, 60 Drawing Sheets

U.S. PATENT DOCUMENTS

| | | | |
|---|---|---|---|
| 5,621,790 A * | 4/1997 | Grossman et al. | 379/266.08 |
| 5,623,422 A | 4/1997 | Williams | |
| 5,675,779 A | 10/1997 | Doktor | |
| 5,689,642 A | 11/1997 | Harkins et al. | |
| 5,790,801 A | 8/1998 | Funato | |
| 5,794,210 A | 8/1998 | Goldhaber et al. | |
| 5,809,251 A | 9/1998 | May et al. | |
| 5,812,865 A * | 9/1998 | Theimer et al. | 709/228 |
| 5,841,854 A | 11/1998 | Schumacher et al. | |
| 5,859,979 A | 1/1999 | Tung et al. | |
| 5,893,075 A | 4/1999 | Plainfield et al. | |
| 5,896,448 A | 4/1999 | Holt | |
| 5,905,789 A * | 5/1999 | Will | 379/211.03 |
| 5,931,913 A | 8/1999 | Meriwether et al. | |
| 5,960,423 A | 9/1999 | Chaudhuri et al. | |
| 5,963,910 A | 10/1999 | Ulwick | |
| 6,009,553 A | 12/1999 | Martinez et al. | |
| 6,014,135 A | 1/2000 | Fernandes | |
| 6,014,669 A | 1/2000 | Slaughter et al. | |
| 6,029,195 A | 2/2000 | Herz | |
| 6,032,189 A | 2/2000 | Jinzenji et al. | |
| 6,035,306 A | 3/2000 | Lowenthal et al. | |
| 6,044,486 A | 3/2000 | Underseth et al. | |
| 6,073,142 A | 6/2000 | Geiger et al. | |
| 6,112,098 A | 8/2000 | Flint et al. | |
| 6,119,101 A | 9/2000 | Peckover | |
| 6,127,946 A | 10/2000 | Tzidon et al. | |
| 6,130,937 A | 10/2000 | Fotta | |
| 6,134,530 A | 10/2000 | Bunting et al. | |
| 6,157,955 A | 12/2000 | Narad et al. | |
| 6,163,683 A | 12/2000 | Dunn et al. | |
| 6,167,253 A | 12/2000 | Farris et al. | |
| 6,167,445 A | 12/2000 | Gai et al. | |
| 6,167,450 A | 12/2000 | Angwin et al. | |
| 6,181,684 B1 | 1/2001 | Turcotte et al. | |
| 6,188,905 B1 | 2/2001 | Rudrapatna et al. | |
| 6,212,550 B1 | 4/2001 | Segur | |
| 6,215,863 B1 | 4/2001 | Bennett, III et al. | |
| 6,216,111 B1 | 4/2001 | Walker et al. | |
| 6,243,398 B1 | 6/2001 | Kahane et al. | |
| 6,272,146 B1 | 8/2001 | Bowater et al. | |
| 6,279,112 B1 | 8/2001 | O'Toole et al. | |
| 6,285,987 B1 | 9/2001 | Roth et al. | |
| 6,292,480 B1 | 9/2001 | May | |
| 6,332,126 B1 | 12/2001 | Peirce et al. | |
| 6,336,194 B1 | 1/2002 | Dahman et al. | |
| 6,353,398 B1 | 3/2002 | Amin et al. | |
| 6,381,323 B1 | 4/2002 | Schwab et al. | |
| 6,385,454 B1 | 5/2002 | Bahl et al. | |
| 6,404,874 B1 | 6/2002 | Chestnut | |
| 6,405,035 B1 * | 6/2002 | Singh | 455/414.1 |
| 6,421,655 B1 | 7/2002 | Horvitz et al. | |
| 6,421,730 B1 | 7/2002 | Narad et al. | |
| 6,424,711 B1 | 7/2002 | Bayless et al. | |
| 6,438,217 B1 | 8/2002 | Huna | |
| 6,438,603 B1 | 8/2002 | Ogus | |
| 6,442,589 B1 * | 8/2002 | Takahashi et al. | 709/203 |
| 6,453,017 B1 | 9/2002 | Cannon et al. | |
| 6,463,265 B1 | 10/2002 | Cohen et al. | |
| 6,466,232 B1 | 10/2002 | Newell et al. | |
| 6,490,698 B1 | 12/2002 | Horvitz et al. | |
| 6,493,685 B1 | 12/2002 | Ensel et al. | |
| 6,513,046 B1 | 1/2003 | Abbott, III et al. | |
| 6,526,129 B1 | 2/2003 | Beaton et al. | |
| 6,549,915 B2 | 4/2003 | Abbott, III et al. | |
| 6,553,347 B1 | 4/2003 | Tavor et al. | |
| 6,571,216 B1 | 5/2003 | Garg et al. | |
| 6,578,076 B1 | 6/2003 | Putzolu | |
| 6,587,876 B1 | 7/2003 | Mahon et al. | |
| 6,640,230 B1 | 10/2003 | Alexander et al. | |
| 6,654,734 B1 | 11/2003 | Mani et al. | |
| 6,658,095 B1 | 12/2003 | Yoakum et al. | |
| 6,671,695 B2 | 12/2003 | Mcfadden | |
| 6,672,506 B2 | 1/2004 | Swartz et al. | |
| 6,697,840 B1 | 2/2004 | Godefroid et al. | |
| 6,717,936 B1 | 4/2004 | Srinivasan | |
| 6,718,026 B1 | 4/2004 | Pershan et al. | |
| 6,738,931 B1 | 5/2004 | Osborn et al. | |
| 6,741,188 B1 | 5/2004 | Miller et al. | |
| 6,747,675 B1 | 6/2004 | Abbott et al. | |
| 6,751,636 B1 | 6/2004 | Mende, Jr. et al. | |
| 6,766,373 B1 | 7/2004 | Beadle et al. | |
| D494,584 S | 8/2004 | Schlieffers et al. | |
| 6,791,580 B1 | 9/2004 | Abbott et al. | |
| 6,792,082 B1 | 9/2004 | Levine | |
| 6,796,505 B2 | 9/2004 | Pellaumail et al. | |
| 6,801,223 B1 | 10/2004 | Abbott et al. | |
| 6,812,937 B1 | 11/2004 | Abbott et al. | |
| 6,826,540 B1 | 11/2004 | Plantec et al. | |
| 6,837,436 B2 | 1/2005 | Swartz et al. | |
| 6,839,554 B2 | 1/2005 | McDowell et al. | |
| 6,842,877 B2 | 1/2005 | Robarts et al. | |
| 6,925,441 B1 | 8/2005 | Jones, III et al. | |
| 6,931,116 B1 | 8/2005 | Gross et al. | |
| 6,931,384 B1 | 8/2005 | Horvitz et al. | |
| 6,957,248 B2 | 10/2005 | Quine et al. | |
| 6,968,179 B1 | 11/2005 | De Vries | |
| 6,969,179 B2 | 11/2005 | Sloan et al. | |
| 6,988,132 B2 | 1/2006 | Horvitz | |
| 7,010,501 B1 | 3/2006 | Roslak et al. | |
| 7,010,600 B1 | 3/2006 | Prasad et al. | |
| 7,035,923 B1 | 4/2006 | Yoakum et al. | |
| 7,040,541 B2 | 5/2006 | Swartz et al. | |
| 7,046,680 B1 | 5/2006 | McDysan et al. | |
| 7,063,263 B2 | 6/2006 | Swartz et al. | |
| 7,085,786 B2 | 8/2006 | Carlson et al. | |
| 7,085,825 B1 | 8/2006 | Pishevar et al. | |
| 7,103,806 B1 | 9/2006 | Horvitz | |
| 7,107,544 B1 | 9/2006 | Luke | |
| 7,127,486 B1 | 10/2006 | Reistad et al. | |
| 7,145,898 B1 | 12/2006 | Elliott | |
| 7,149,795 B2 | 12/2006 | Sridhar et al. | |
| 7,171,378 B2 | 1/2007 | Petrovich et al. | |
| 7,184,533 B1 | 2/2007 | Shaffer et al. | |
| 7,185,073 B1 | 2/2007 | Gai et al. | |
| 7,194,080 B2 | 3/2007 | Worsham et al. | |
| 7,195,157 B2 | 3/2007 | Swartz et al. | |
| 7,250,846 B2 * | 7/2007 | Ebling et al. | 340/7.28 |
| 7,251,696 B1 | 7/2007 | Horvitz | |
| 7,254,226 B1 * | 8/2007 | Roberts et al. | 379/215.01 |
| 7,289,614 B1 | 10/2007 | Twerdahl et al. | |
| 7,330,895 B1 | 2/2008 | Horvitz | |
| 7,353,284 B2 | 4/2008 | Agnoli et al. | |
| 7,385,501 B2 | 6/2008 | Miller et al. | |
| 7,389,351 B2 | 6/2008 | Horvitz | |
| 7,493,267 B1 | 2/2009 | Walker et al. | |
| 7,525,450 B2 | 4/2009 | Miller et al. | |
| 7,580,908 B1 | 8/2009 | Horvitz et al. | |
| 7,644,144 B1 | 1/2010 | Horvitz et al. | |
| 7,716,532 B2 | 5/2010 | Horvitz | |
| 7,742,591 B2 | 6/2010 | Paek et al. | |
| 7,747,719 B1 | 6/2010 | Horvitz et al. | |
| 7,831,529 B2 | 11/2010 | Horvitz et al. | |
| 7,831,532 B2 | 11/2010 | Horvitz | |
| 7,870,240 B1 | 1/2011 | Horvitz | |
| 8,161,165 B2 | 4/2012 | Horvitz | |
| 8,166,178 B2 | 4/2012 | Horvitz | |
| 8,249,060 B1 | 8/2012 | Horvitz | |
| 8,271,631 B1 | 9/2012 | Horvitz et al. | |
| 2001/0030664 A1 | 10/2001 | Shulman et al. | |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0032689 A1 | 3/2002 | Abbott, III et al. | |
| 2002/0044152 A1 | 4/2002 | Abbott, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |

| | | | |
|---|---|---|---|
| 2002/0112056 A1 | 8/2002 | Baldwin et al. | |
| 2002/0118772 A1 | 8/2002 | Lin | |
| 2002/0133416 A1 | 9/2002 | Abhyanker | |
| 2002/0138572 A1 | 9/2002 | Delany | |
| 2002/0143654 A1 | 10/2002 | Wang et al. | |
| 2002/0143876 A1* | 10/2002 | Boyer et al. | 709/205 |
| 2002/0156879 A1 | 10/2002 | Delany et al. | |
| 2002/0161862 A1 | 10/2002 | Horvitz | |
| 2002/0174199 A1 | 11/2002 | Horvitz | |
| 2003/0004679 A1 | 1/2003 | Tryon et al. | |
| 2003/0023711 A1 | 1/2003 | Parmar et al. | |
| 2003/0033421 A1 | 2/2003 | Haeri et al. | |
| 2003/0046401 A1 | 3/2003 | Abbott et al. | |
| 2003/0052915 A1* | 3/2003 | Brown et al. | 345/752 |
| 2003/0097485 A1 | 5/2003 | Horvitz et al. | |
| 2003/0139970 A1 | 7/2003 | Badura et al. | |
| 2003/0154476 A1 | 8/2003 | Abbott, III et al. | |
| 2003/0184498 A1 | 10/2003 | Blumberg et al. | |
| 2003/0191676 A1 | 10/2003 | Templeton | |
| 2004/0143636 A1 | 7/2004 | Horvitz et al. | |
| 2004/0201500 A1 | 10/2004 | Miller et al. | |
| 2005/0034078 A1 | 2/2005 | Abbott et al. | |
| 2005/0084082 A1* | 4/2005 | Horvitz et al. | 379/114.06 |
| 2005/0147118 A1 | 7/2005 | Jonsson | |
| 2005/0165860 A1 | 7/2005 | Cabrera et al. | |
| 2005/0193102 A1 | 9/2005 | Horvitz | |
| 2005/0223043 A1 | 10/2005 | Randal et al. | |
| 2005/0266858 A1 | 12/2005 | Miller et al. | |
| 2005/0272442 A1 | 12/2005 | Miller et al. | |
| 2006/0019676 A1 | 1/2006 | Miller et al. | |
| 2006/0041648 A1 | 2/2006 | Horvitz | |
| 2006/0291580 A1* | 12/2006 | Horvitz | 375/265 |
| 2008/0090591 A1 | 4/2008 | Miller et al. | |
| 2008/0091537 A1 | 4/2008 | Miller et al. | |
| 2008/0134069 A1 | 6/2008 | Horvitz | |
| 2008/0140776 A1 | 6/2008 | Horvitz | |
| 2008/0140788 A1 | 6/2008 | Carter et al. | |
| 2008/0161018 A1 | 7/2008 | Miller et al. | |

FOREIGN PATENT DOCUMENTS

| | | |
|---|---|---|
| JP | 11-088560 A | 3/1999 |
| WO | 9800787 | 1/1998 |

OTHER PUBLICATIONS

International Search Report dated Sep. 29, 2003 for PCT Application Serial No. 00/20685, 3 Pages.
Robert M. Losee, Jr., Minimizing information overload: the ranking of electronic messages, Journal of Information Sceince 15, Elsevier Sceince Publishers B.V., 1989, pp. 179-189.
Carlson J., et al., "Channel Expanion Theory and the Experiential Nature of Media Richness Perceptions", Academy of Management vol. 42, No. 2, Apr. 1, 1999, p. 153-170.
Kaushal Kurapati, Srinivas Gutta, David Schaffer, Jacquelyn Martino, and John Zimmerman, A Multi-Agent TV Recorder, Adaptive Systems Department, Philips Research Briarcliff, 2001. 8 pages.
Eric J. Horvitz and Adrian C. Klein, "Utility-Based Abstraction and Categorization", Palo Alto Laboratory, Rockwell International Research, 1993, 8 pages.
Eric J. Horvitz, John S Breese and Max Henrion, "Decision Theory in Expert Systems and Artificial Intelligence", Jul. 1988, 38 pages.
Eric J. Horvitz, Andy Jacobs and David Hovel, "Attention-Sensitive Alerting", Microsoft Research, Jul. 1999, 10 pages.
John R. Carlson and Robert W. Zmud, "Channel Expansion Theory and the Experiential Nature of Media Richness Perceptions", Academy of Management Journal, vol. 42, No. 2, 1999, 18 pages.
Andrew Silver, John Larkins and Dave Stringer, "Unified Network Presence Management", Nortel Networks Wireless Solutions, 6 pages.
European Search Report dated Aug. 28, 2003, for international Application Serial No. 02000906.4-1244.
Andy Harter, et al., A Distributed Location System for the Active Office, IEEE Network, 1994, pp. 62-70.
Gualing Chen, et al. A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.
Mike Spreitzer, et al. Providing Location Information in a Ubiquitous Computing Environment, Sigops '93, 1993, pp. 270-283.
Marvin Theimer, et al. Operating System Issues for PDAs, in Fourth Workshop on Workstation Operating Systems, 1993, 7 pages.
Roy Want, Active Badges and Personal Interactive Computing Objects, IEE Transactions on Consumer Electronics, 1992, 11pages, vol. 38—No. 1.
Bill N. Schilit, et al., The PereTab Mobile Computing System, IEEE WWOS-IV, 1993, 4 pages.
Bill N. Schilit, et al., Customizing Mobile Applications, Proceedings USNIX Symposium on Mobile and Location Independent Computing, Aug. 1993, 9 pages.
Mike Spreitzer, et al., Architectural Considerations for Scalable, Secure, Mobile Computing with location Information, in the 14th International Conference on Distributed Computing Systems, Jun. 1994, pp. 29-38.
Mike Spreitzer, et al., Scalable, Secure, Mobile Computing with Location Information, Communications of the ACM, Jul. 1993, 1 page, vol. 36—No. 7.
Roy Want, et al., The Active Badge Location System, ATC Transactions on information Systems, Jan. 1992, pp. 91-102, vol. 10—No. 1.
Mark Weiser, Some Computer Science Issues in Ubiquitous Computing, Communications of the ACM, Jul. 1993, pp. 75-84, C|vol. 36—No. 7.
M. Billinghurst, et al., An Evaluation of Wearable Information Spaces. Proceedings of the Virtual Reality Annual International Symposium, 1998, 8 pages.
Bradley J. Rhodes, The Wearable Remembrance Agent: A System for Augmented Theory, The Proceedings of the First International Conference on the Practical Application of Intelligent Agents and Multi Agent Technology, 1996, pp. 487-495.
Eric Horvitz, et al.,In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, the Proceedings of the First International Symposium on Wearable Computers, Oct. 1997, pp. 123-128.
Eric Horvitz, et al.,Attention-Sensitive Alerting in Computing Systems, Microsoft Research, Aug. 1999.
Bill N. Schilt, et al., Disseminating Active map Information to Mobile Hosts, IEEE Network, 1994, pp. 22-32, vol. 8—No. 5.
Mark Billinghurst, et al. Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computing for the 21st Century, Scientific American, Sep. 1991, pp. 94-104m, vol. 265—No. 3.
OA mailed Jun. 20, 2008 for U.S. Appl. No. 11/464,155, 20 pages.
Bhattacharya, et al., Coordinating Backup/Recovery and Data Consistency between Database and File Systems, Jun. 4-6, 2002, 12 pages, ACM SIGMOD, Madison Wisconsin, USA.
Bill Schilit, et al., Context-Aware Computing Applications, in Proceedings of the Workshop on Mobile Computing Systems and Applications, Dec. 1994. pp. 85-90.
Hewlett-Packard Development Company, LP., Sybase Database Migration, 2004, 19 pages.
Planning Protection Schedules, Published Apr. 8, 2005, Updated Aug. 17, 2005, 5 pages. http://www.microsoft.com/technet/prodtechnol/dpm/proddocs/7f70f48c-6661-4573-ac17-47.
Webster's II New Riverside University Dictionary, Houghton Mifflin Company, 1994, pp. 496. In OA Dated Aug. 11, 2008 for U.S. Appl. No. 11/250,848, 40 pages.
International Search Report dated Sep. 7, 2002 for PCT Application Serial No. PCT02/07894, filed Mar. 15, 2002.
OA Dated Oct. 16, 2008 for U.S. Appl. No. 10/036,566, 24 pages.

OA dated Nov. 13, 2008 for U.S. Appl. No. 11/250,848, 18 pages.
OA dated Jan. 6, 2009 for U.S. Appl. No. 11/464,151, 57 pages.
Eric Horvitz, Principles of Mixed Initiative User Interfaces, 1999, Conference on Human Factors in Computing Systems archive Proceedings of the SIGCHI conference on Human factors in computing systems: the CHI is the limit, ISBN:0-201-48559-1, pp. 159-166.
OA dated Jan. 6, 2009 for U.S. Appl. No. 11/464,157, 61 pages.
Harry Newton, Newton's Telecom Dictionary, Feb. 2002, CMP Books, Eighteenth Edition, pp. 123-124.
OA dated Jan. 28, 2009 for U.S. Appl. No. 11/047,066, 73 pages.
OA dated Jan. 16, 2009 for U.S. Appl. No. 11/047,130, 61 pages.
OA dated Jan. 16, 2009 for U.S. Appl. No. 11/047,318, 65 pages.
OA dated Jan. 15, 2009 for U.S. Appl. No. 11/047,228, 61 pages.
Horvitz, et al., Attention-Sensitive Alerting in Computing Systems, Microsoft Research, Aug. 1999.
Horvitz, et al., In Pursuit of Effective Harndsfree Decision Support: Coupling Bayesian Inference, Speech Understanding, and User Models, 1995, 8 pages.

Rhodes, Remembrance Agent: A continuooously running automated information retrieval system, The Proceedings of the First International Conference on the Pratctical Application of Intelligent Agents and Multi Agent Technology, 1996, pp. 487-495.
Webster's II New Riverside University Dictionary, Houghton Mifflin Company, 1994, pp. 496. In OA dated Aug. 11, 2007 for U.S. Appl. No. 11/250,848, 40 pages.
European Supplemental Search Report for Application No. 02723449.1 mailed Jul. 30, 2009.
Marchal B., "XML by Example", Que publications, ISBN: 0789722429, 1999, pp. 6-8.
U.S. Appl. No. 11/047,318, filed Jan. 31, 2005, 94 pages.
U.S. Appl. No. 11/047,228, filed Jan. 31, 2005, 94 pages.
U.S. Appl. No. 11/464,151, filed Aug. 11, 2006, 80 pages.
U.S. Appl. No. 11/464,155, filed Aug. 11, 2006, 80 pages.
U.S. Appl. No. 11/464,157, filed Aug. 11, 2006, 80 pages.

* cited by examiner

Fig. 42

REPRESENTATION, DECISION MODELS, AND USER INTERFACE FOR ENCODING MANAGING PREFERENCES, AND PERFORMING AUTOMATED DECISION MAKING ABOUT THE TIMING AND MODALITIES OF INTERPERSONAL COMMUNICATIONS

CROSS-REFERENCE TO RELATED APPLICATIONS

This application is a continuation of U.S. patent application Ser. No. 10/281,546, now U.S. Pat. No. 7,330,895, filed Oct. 28, 2002, entitled REPRESENTATION, DECISION MODELS, AND USER INTERFACE FOR ENCODING MANAGING PREFERENCES, AND PERFORMING AUTOMATED DECISION MAKING ABOUT THE TIMING AND MODALITIES OF INTERPERSONAL COMMUNICATIONS, which is a continuation-in-part of U.S. patent application Ser. No. 09/809,142, which was filed Mar. 15, 2001, now U.S. Pat. No. 7,389,351, entitled System and Method For Identifying and Establishing Preferred Modalities or Channels for Communications Based on Participants' Preferences and Contexts. The entireties of U.S. Pat. No. 7,330,895 and U.S. patent application Ser. No. 09/809,142 are incorporated herein by reference.

TECHNICAL FIELD

The present invention relates generally to computer systems, and more particularly to a system and method for communications, display, configuration and optimization of a communications architecture that facilitates ideal communication links between contactors and contactees.

BACKGROUND OF THE INVENTION

Advanced technology computer and communication systems have transformed many important aspects of human and computer interactions. For example, with technology advancements such as wireless and Internet systems, electronic messaging and information systems have become much more sophisticated. These systems may include e-mail, voice mail, videoconferencing, pager and cell phone technologies, for example, wherein almost an infinite supply of information may be sent and retrieved between parties in a concurrent manner. Due to the content and volume of information available, and the ever-increasing number of modalities for communicating such information, other systems have been developed to manage, direct and control message exchanges between parties and/or systems.

In some cases, methods employing automated decision making tools derived from the Decision Science and related Artificial Intelligence communities, as well as other techniques have been employed to manage and direct electronic information transfers. As a general example, this can include considerations regarding what type of device or modality (e.g., cell phone, pager, e-mail) one or all parties have access to. Other considerations can enable systems to direct messages to a particular location and/or communication modality associated with the party, as well as consider whether the value of information contained within a message exceeds the cost of disrupting the recipient presently or in the future. For example, one particular recipient of a message may desire to receive emergency messages from family, at any time of the day and by any or all available system or modality, desire to receive non-project related business messages from coworkers via e-mail, and desire not to receive some messages at all such as "Spam" e-mail or other unwanted solicitations. As can be appreciated, expectations for communicating between parties can differ greatly from one party to another.

In order to provide these and other communications capabilities, intelligent decision systems for mediating and optimizing interpersonal communications can be endowed with the ability to consider and operate upon a number of decision-making variables concerning multiple aspects of the party's circumstances when managing and directing message traffic between parties. For example, these variables can enable the system to determine and make decisions regarding a particular party's communications desires and distinguish competing requirements from one party to another. In other words, respective parties have different priorities, desires and needs that can influence decision-making processes and communications flowing from the system. Consequently, in order to satisfy a variety of requirements applying to a plurality of different circumstances and parties, many decision-making variables can be acted upon to tailor communications requirements according to a particular user's needs.

Often, along with the large number of variables that influence these systems, there is a complex and/or competing relationship between the decision-making variables, however. For example, one variable or combination of variables may subtly or overtly influence decisions relating to other variables or combinations thereof. Since the number of variables involved in the decision-making process can be extensive and/or interrelated, it may be challenging for users to personalize the decision-making process to meet specific requirements relating to that user's circumstances and desires. In other cases, it can be difficult or impossible to convey these desires between communicating parties.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology providing decision models, useful representations of preferences and candidate controls and associated user interfaces to facilitate reasoning about the timing and modality of communications between contactors and contactees. According to one aspect of the present invention, a decision model and the user interface enables users (contactors and/or contactees) to define groups of communications parties (e.g., static groups, groups by relationships, dynamic groups by activities) in which to conduct potential communications. Users can assign groups to different communication policies and can further define and refine policies for the communications. In addition, interface users can define special contexts (e.g., contexts that are called out in the policies) and can define preferences for notifications about an awareness of communications attempts from other contacting parties. Furthermore, users can define context-sensitive communication-sequences for best-effort communications, if desired. At the end of an interface session, for example, an XML file that captures the user's settings and preferences can be captured as a profile. The XML file can be subsequently transmitted to a server and/or other system to control the user's communications with other parties.

The user interface provides an interactive experience for contactors and contactees and includes sharing, displaying, editing and adjusting one or more communications preferences, policies, groupings and/or decision parameters in conjunction with a communications architecture. In accordance with the architecture, preferred modalities or channels of communications are established based on a participants preferences and/or contexts, wherein the architecture identifies and establishes data communications and determines optimal communication links between contactors and contactees. Determinations can be based on deterministic and/or uncertain contactee and/or contactor preferences, capabilities and context, both present and predicted.

Beyond the specification of logical relationships and policies, the present invention provides an alternate representation of communication preferences centering on the encoding of scalar-valued properties, including such variables as the costs of interruption in different contexts, the costs of deferring a call for some period of time, and the costs associated with a suboptimal communication modality or channel. Several models are provided that can make use of such scalar values, and alternate definitions of the scalar values, including utilities consistent with the axioms of utility theory (e.g., as described in the work of von Neumann and Morgenstern) and/or dollar values that a user would be willing to pay to avoid a suboptimal situation, to be used in formal decision analyses about communications, and heuristic priority measures that can be used in less formal heuristic cost-benefit analyses.

In accordance with one aspect of the present invention, the representations of key variables and preferences, the associated logical and/or numerical communication decision models, and associated user interfaces can facilitate exchanges of information relating to status and/or preferred modalities of communications between parties such as exchanging lists, gestures, icons, and suggestions regarding communications capabilities and desires from one party to the other. In this manner, interface users can determine preferred modalities of communication for a prospective contactor or contactee in conjunction with receiving other information as to the timing and/or current capabilities of attempted communications with the party. Thus, communications between parties are facilitated and optimized according to explicit and/or inferred desires or intentions of the parties via the user interface.

According to another aspect of the present invention, a configuration and runtime user interface can be employed to display one or more communications modalities associated with preferred and/or determined modalities of communication as provided by the communications architecture. Thus, a cross-device experience can be initiated between contactors and contactees along with enabling users to adjust and/or configure one or more operational parameters within the communications architecture. For example, this can include providing or sharing lists relating to one or more preferences of the contactors and/or contactees regarding a currently determined "best mode" communications device or can include user supplied alternatives or overrides to the determination.

Other features can include sharing user-configurable or inferred gestures such as "I am busy now" or "My cell phone battery has died." Input adjusters such as sliders, buttons, and input fields can be included within the user interface to enable users to alter characteristics of the communications policies, preferences and groupings. For example, the communications architecture can determine (e.g., utilizing decision-theoretic policies) that the best available communications device to reach a contactee is currently device "A" and/or generally device "B". If over time the user decides that more or less communications should be received/directed to device "B", then an adjustment such as a slider can be provided to "tune" or alter the decision-making policies within the architecture to increase or decrease the likelihood of communications from device "B". Adjustments can also include computing a "boost value" that can be utilized to increase or decrease the effects of one or more operating policies or groupings of variables within the communications architecture.

Moreover, the growth in the popularity of personal computers and computing applications is providing new opportunities and new substrates for initiating communications. For example, there is a significant opportunity to integrate access to real-time interpersonal communications with other software applications, such as word processors, and thus, allowing people to initiate communications directly with others from within a multitude of applications in accordance with the present invention. In some cases, such communications can include metadata that shares information or pointers about the project or content at the focus of attention of the contactor with the contactee, who may or may not be using the same application during the communication. A person may desire to segment people into different groups and/or projects or topics and specify how incoming calls from different people and on different projects are to be handled. For some, a person may desire to be interrupted no matter what they are doing. For other communication attempts, a recipient of an incoming communication may want to have the timing or the channel of the call shifted to another time and/or channel respectively if they are busy with an activity that of some degree of uninterruptability.

Furthermore, a user (the contactee) may indicate a set of people (contactors) whose attempts to establish a real-time communication with that user when that user was busy would be rescheduled automatically, and thus time shifted in an efficient manner. Moving beyond just time to decision making about the modality of communications, a user without access to a device with a graphical display and full keyboard may want to have an attempt at an incoming communication to be shifted in time so as to facilitate that the user will have access to a full desktop system based on the metadata associated with the communication attempt, which indicates that the intent of the communication is to establish a real-time communication about a portion of edited text in a shared document that can be viewed simultaneously by the contactor and contactee should both have access to a full networked desktop computing system.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 42 is a diagram illustrating a graphical user interface demonstrating how additional cost can be added for additional properties of people and/or communications.

DETAILED DESCRIPTION OF THE INVENTION

The present invention relates to a system and methodology providing a user interface that can be employed by contactors and contactees in conjunction with a communications architecture for identifying and establishing an optimal communication based on preferences, capabilities, contexts and goals of the parties to engage in the communication. The user interface can include a graphical display having a plurality of display objects and associated input fields operable by one or more parties to a communication in order to facilitate convenient access, control, personalization and communications via the communications architecture. For example, configuration capabilities are provided in the user interface to enable operational adjustments to one or more operating parameters, communications groupings, policies and/or context preferences relating to a preferred modality of communication and to potential parties of communication between the contactors and contactees. In addition, cross-device information can be shared between the contactors and the contactees relating to the preferences and/or determined contexts of the communicating parties in order to facilitate optimal communications between the parties. Other aspects can include components and/or processes for defining orderings over a handling of calls by multiple parameters, wherein a contactor is provided a list of options as ranked by one or more users' preferences, the preferences provided in an arranged order of a given user's desire that relates to a communications situation at hand. These aspects can include sharing out the arranged order directly or only a best option, if desired. Decisions regarding the options, preferences, and/or orderings can be based on an identity, a group identity, a context and/or other considerations.

Figure 1:
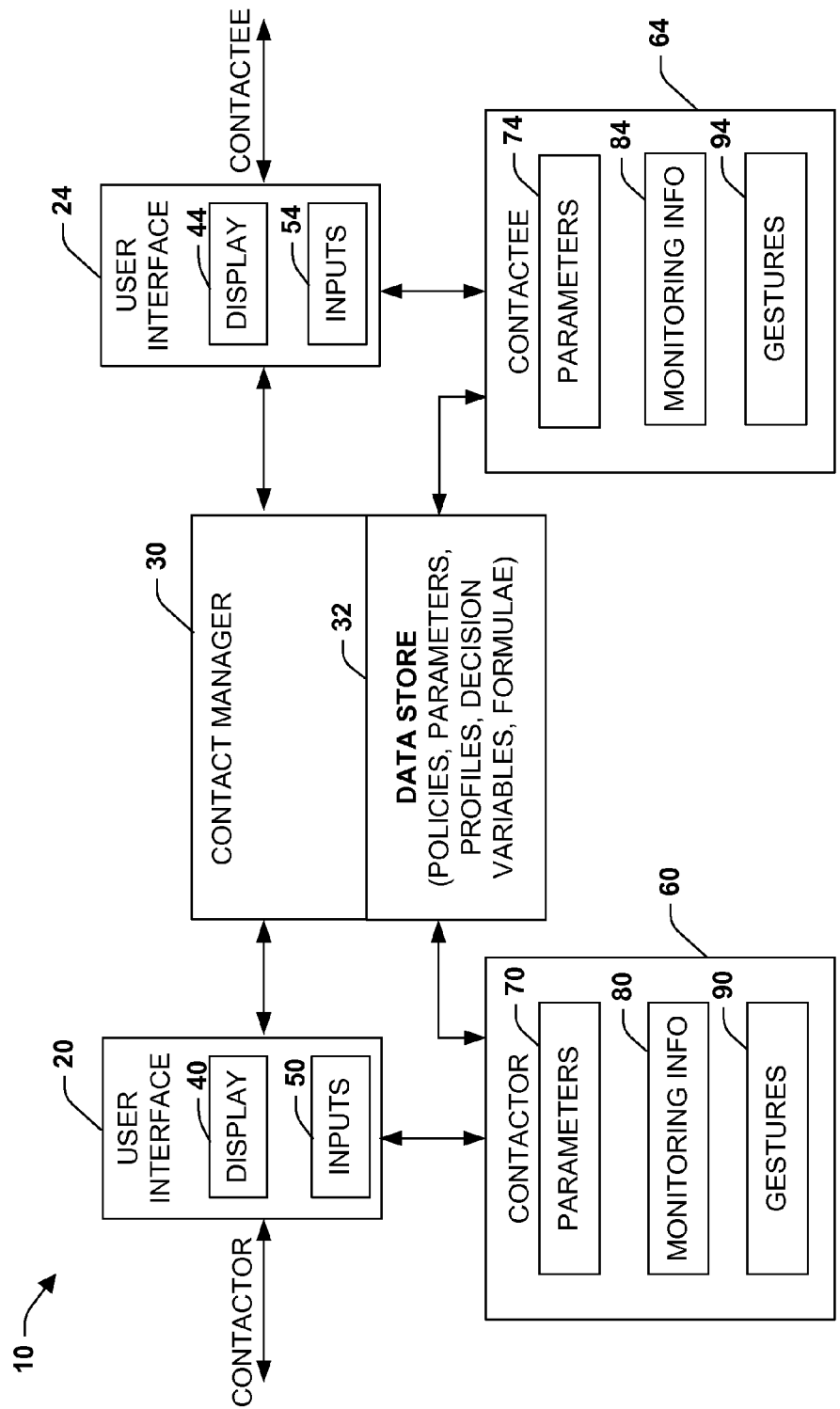
FIG. 1 is a schematic block diagram illustrating a communications system and user interface in accordance with an aspect of the present invention.

Referring initially to FIG. 1, a system 10 illustrates a contactor user interface 20 and contactee user interface 24 that interact with a contact manager 30 to facilitate optimal communications between parties such as contactors and contactees in accordance with an aspect of the present invention. The contact manager 30 is associated with a data store 32 that includes a plurality of policies, parameters, profiles, decision variables and/or formulae to enable contactors to communicate with contactees. The information stored in the data store 32 is related to optimal or desired communications preferences of the parties that are defined via the user interfaces 20 and 24, respectively. Thus, the contact manager 30 employs the information within the data store 32 to make decisions regarding how to establish communications between the contactors and contactees in accordance with the communications preferences. It is noted that the contact manager 30 and associated communications architecture for establishing optimal communications will be described in more detail below in relation to FIGS. 52-60.

The user interfaces 20 and 24 generally include an associated display 40 and 44 respectively, to provide feedback and output data to a user regarding various aspects of communications, preferences, configurations and/or attempted communications between the parties. The displays 40 and 44 can include display objects (e.g., icons, buttons, sliders, input boxes, selection options, menus, tabs and so forth) having multiple dimensions, shapes, colors, text, data and sounds to facilitate optimal communications between the parties. In addition, various menus and alternative screens or display outputs can be provided that perform a plurality of aspects of the present invention and will be described in more detail below. The user interfaces 20 and 24 also include a plurality of inputs 50 and 54 for adjusting and configuring one or more aspects of the present invention. This can include receiving user commands from a mouse, keyboard, speech input and/or other device to effect operations of the respective interface.

In accordance with one aspect of the present invention, the user interfaces 20 and 24 facilitate a personalized process for parties to interact, wherein the parties can configure and adapt the respective interface to more closely match their preferences regarding how and when communications are established. This can include providing a contactor data store 60 and a contactee data store 64 to receive various settings and configurations regarding communications preferences as provided from the respective interfaces 20 and 24. It is to be appreciated that both interfaces 20 and 24 do not have to be operative in order to establish communications between the contactors and contactees. For example, the contactee can receive communications attempts from the contact manager 30 via substantially any contactor communications source directed to the contact manager 30, wherein the contactee determines how the communications are received via the user interface 24.

As illustrated, the contactor and contactee data stores 60 and 64 can include configuration data that is provided by the respective user interfaces 20 and 24. The data can include a plurality of communications configuration parameters 70 and 74, monitoring information 80 and 84 that includes both inferred and user settings regarding context of the parties (e.g., availability, focus, attention, busy-ness states, schedule, calendar and so forth) and can include one or more gestures 90 and 94 regarding communications preferences and capabilities. The gestures 90 and can be predetermined (configured by the user) or inferred gestures determined or received by the contact manager 30 that provide information between the contactors and contactees when communications are attempted. Examples of such gestures include "I am busy now," "I will be available in about an hour for phone communications," "Hardware problems with my cell phone or laptop such as a low battery or system crash are currently being experienced," "I just left on vacation and am directing all work communications to my e-mail," "It is an emergency and I must speak with you now." It is to be appreciated that a plurality of such gestures can be employed.

It is further to be appreciated that the interface aspects described thus far and which are described in more detail below can be applied to various processes and methodologies for establishing optimal communications between parties. For example, various aspects relating to FIGS. 1-60 described below can be implemented as a set of acts or states in a process or methodology. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 2:
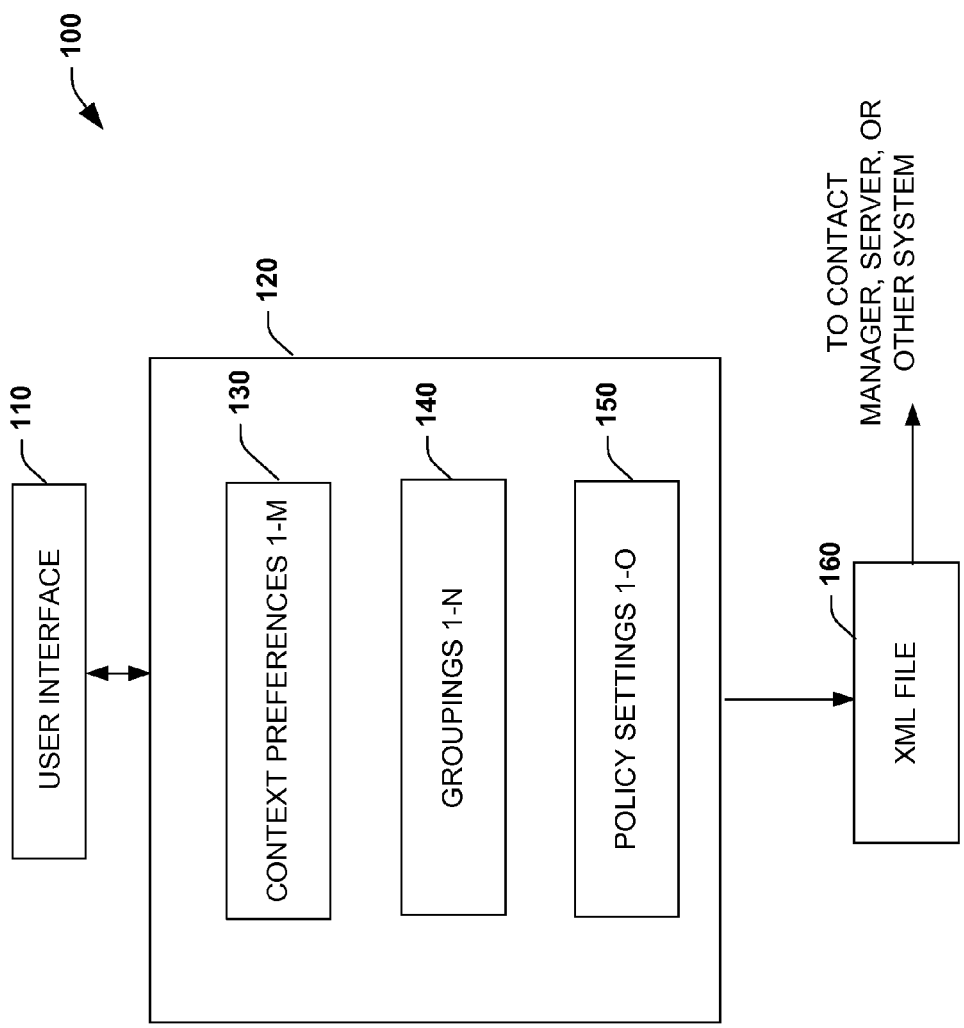
FIG. 2 is a diagram illustrating a plurality of configuration settings in accordance with an aspect of the present invention.

Referring now to FIG. 2, a system 100 illustrates a plurality of configuration settings in accordance with an aspect of the present invention. The system 100 includes a user interface 110 that can be employed by contactors and/or contactees to configure a data store 120 that receives the desired configuration settings. The data store 120 includes 1 to M context and/or communications preferences 130, M being an integer, that relate to various aspects of a state of the contactor and/or contactee associated with a present or future ability to communicate. This can include user selected or defined options and include inferred states of contactor/contactee preference. Another aspect of the data store 120 is to include settings and configurations for desired parties of contact that includes 1 to N selected groupings 140 of potential parties to a communication, N also being an integer. To facilitate how contactors and contactees can communicate via the selected groupings 140, 1 to O policy or rule settings 150 can be provided to control how, when and if parties communicate, wherein O is also an integer. In accordance with the configuration settings 130 through 150, an XML file or blob 160 can be created that captures the desired settings. The XML file 160 can then be directed to a subsequent system such as a contact manager, server or other system to facilitate communications between contactors and contactees based upon the settings. The XML file 160 will be described in more detail below in relation to FIG. 8.

Figure 3:
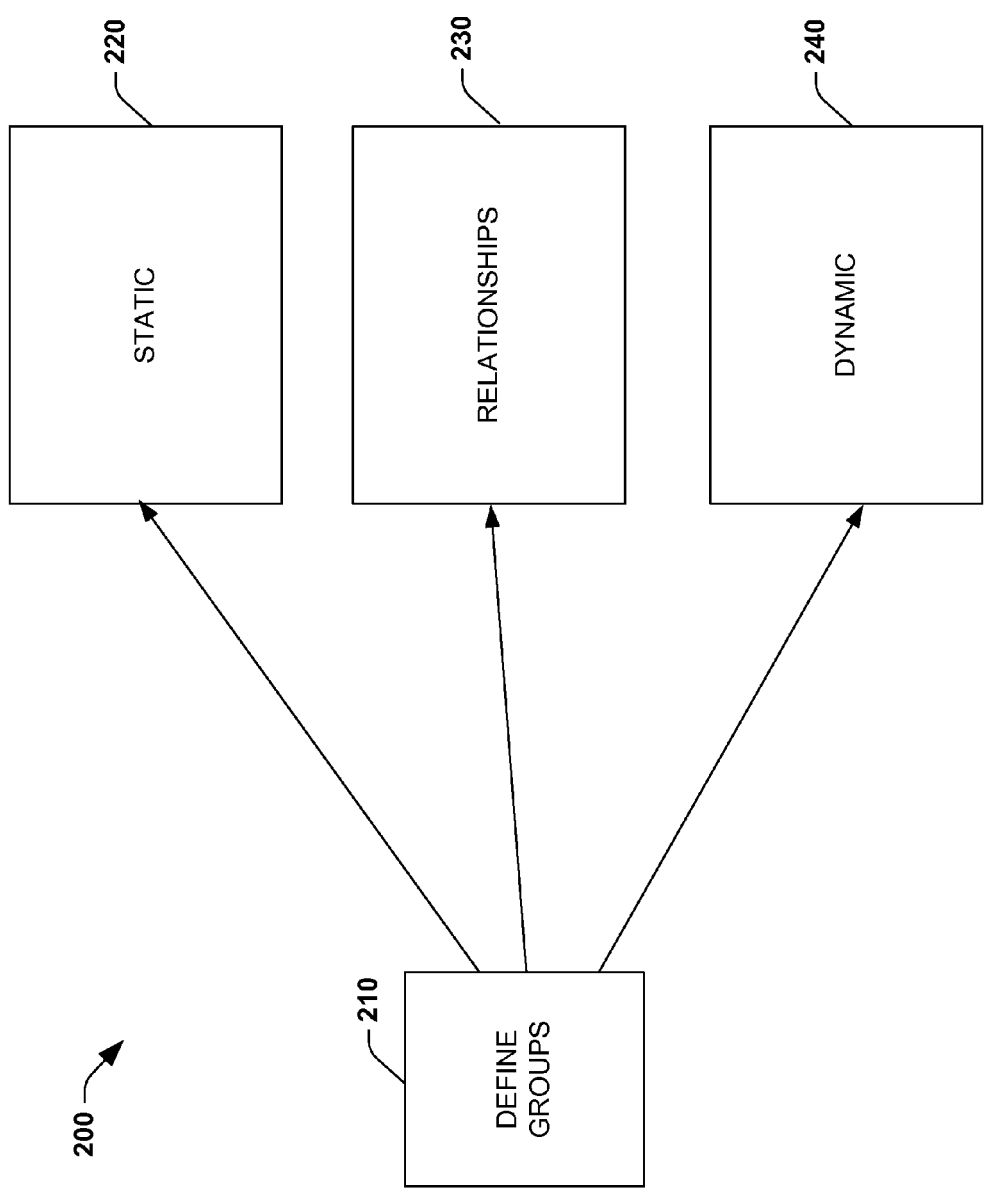
FIG. 3 is a diagram illustrating group configurations in accordance with an aspect of the present invention.

Turning to FIG. 3, a system 200 illustrates defining group configurations in accordance with an aspect of the present invention. As discussed above in relation to FIG. 2, contactors and contactees can define a plurality of potential parties in which to communicate via 1-N groupings. This is illustrated at 210, wherein a user interface such as described above is employed to configure the groups. According to one aspect, static groups 220 can be defined. These groups can include such selections of potential communicating parties as family (nuclear/extended), friends, colleagues, associates, reports and substantially any type of defined group such as an organization or company. It is to be appreciated that other such classifications can be provided. At 230, groups can be defined according to relationships of the user employing the user interface. For example, this can include specifying different kinds of relationships by management and organization and include abstractions such as relative distance up and/or down an organizational chart (e.g., my reports, my manager, my department, anyone up or down the organizational chart from me). A third type of grouping can include defining dynamic assignments 240 to communicating parties. This can include assigning groups by communications or communications history, by meetings (e.g., gleaned from an electronic calendar automatically), by project, and/or by a current state and project such as in a case of shared or collaborative projects or activities.

Figure 4:
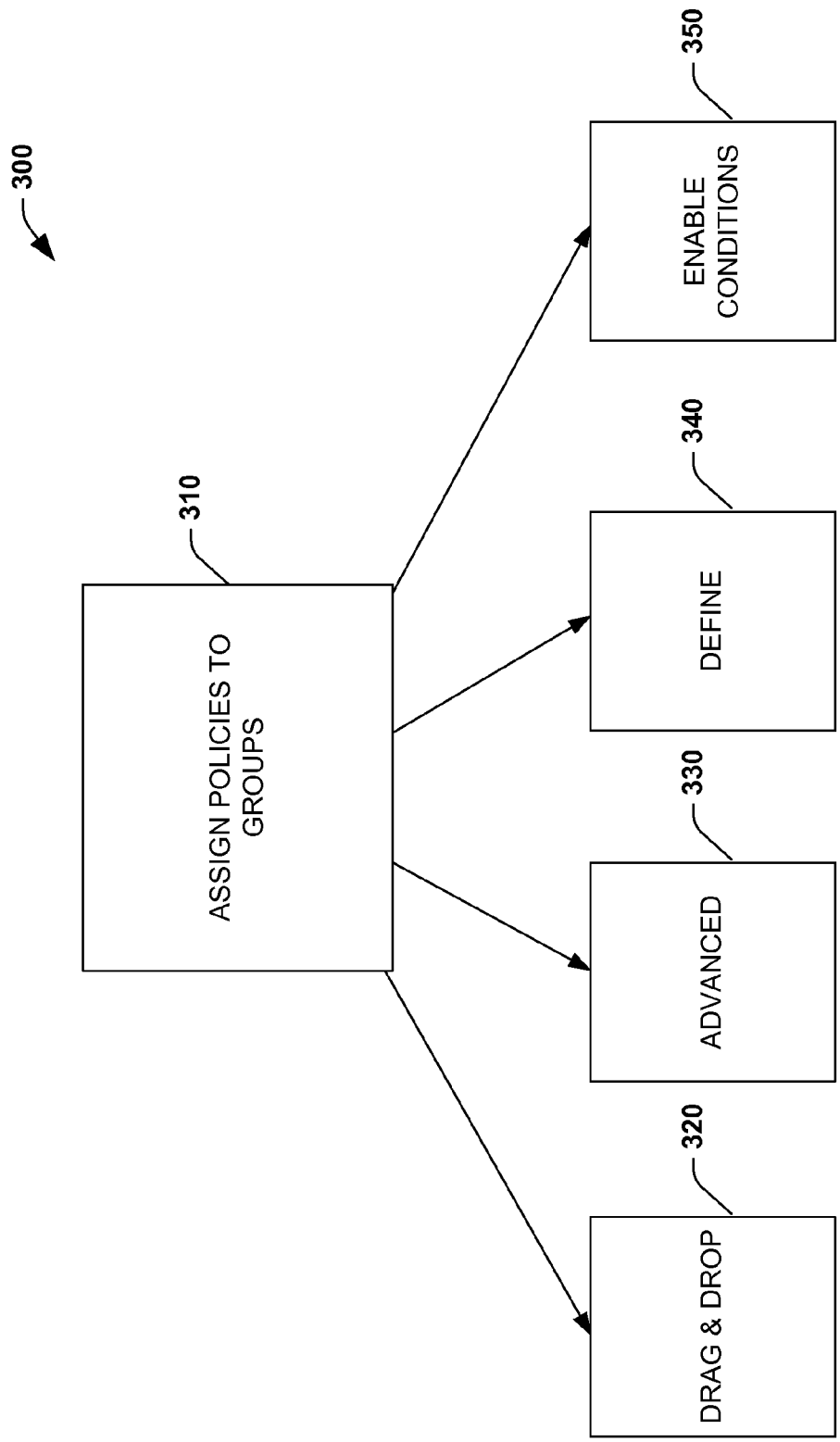
FIG. 4 is a diagram illustrating policy assignments in accordance with an aspect of the present invention.

Referring to FIG. 4, a system 300 illustrates various aspects of how the defined groups described above can be associated with communications policy (controlling how communications established) via the user interface in accordance with an aspect of the present invention. At 310, one or more communications policies are assigned to the groups described above. This can include dragging and dropping 320 (e.g., via user interface mouse action) a defined group into a communications policy window or field that connects the selected group to a policy setting or configuration that controls the communications for the selected group. Another type of assignment can include an advanced mode setting 330 for context-sensitive assignments. Advanced mode can include modifying assignments of groups to policies by such aspects as time, day of the week, and/or other contextual inputs. Still yet another type of assignment can include defining policies 340 via the user interface for action and display. This can include considering default and conditional statements for communications decisions and include one or more context settings of atypical busy-ness states or availability. Another assignment can include one or more condition settings 350. As an example, the condition settings 350 can include considering whether to disallow or reducing scheduling of future communications.

Figure 5:
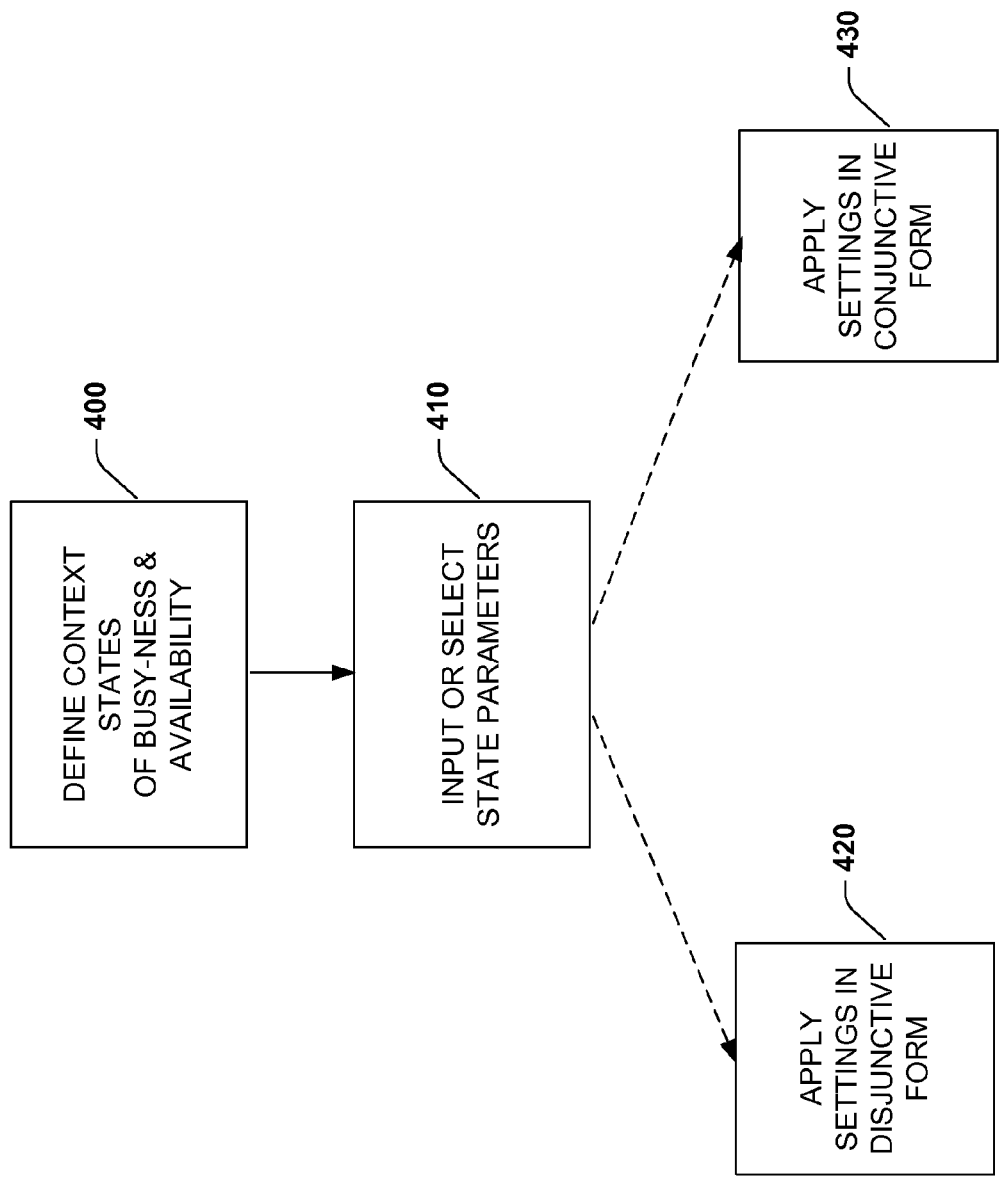
FIG. 5 is a diagram illustrating defining states and setting state parameters in accordance with an aspect of the present invention.

FIG. 5 is a flow chart diagram illustrating defining states and setting state parameters in accordance with an aspect of the present invention. At 400, interface users can define one or more states of busy-ness or availability, if desired. The states 400 can be employed to enable users to generally define atypical or other context settings whereby the user is or is not in the defined state. For example, the states can be defined as Busy Level 1, Level 2, Level 3 and so forth, wherein a respective state is defined by the user to be true or false by one or more selected or defined context settings and is illustrated at 410. Some of the selected context settings can include user presence information, calendar, activity, time of day and day of the week, for example. Respective context settings can then be associated with a plurality of different indications or configurations that define the context. For example, the calendar setting could include "any calendar setting", critical meeting, giving a presentation, out of the office and so forth. The context states can be defined such that if any of the context settings are true for the actual state, then the defined state is true. For example, if Busy Level 2 is defined as in the office, on any calendar setting, on any day of the week, during the hours of 8 to 12, and the activity is conversation, then if any of listed conditions are true, then Busy Level 2 state is also true, wherein the state of Busy Level 2 can be employed to alter communications decisions regarding interactions between the contactors and contactees. This is illustrated at 420, wherein the context settings at 410 are applied in a disjunctive manner. It is to be appreciated however, that the context settings can also be applied in a conjunctive manner (e.g., only if all the context settings are true or active, then my state is Busy Level X, X being an integer). Conjunctive application of context settings is illustrated at 430.

Figure 6:
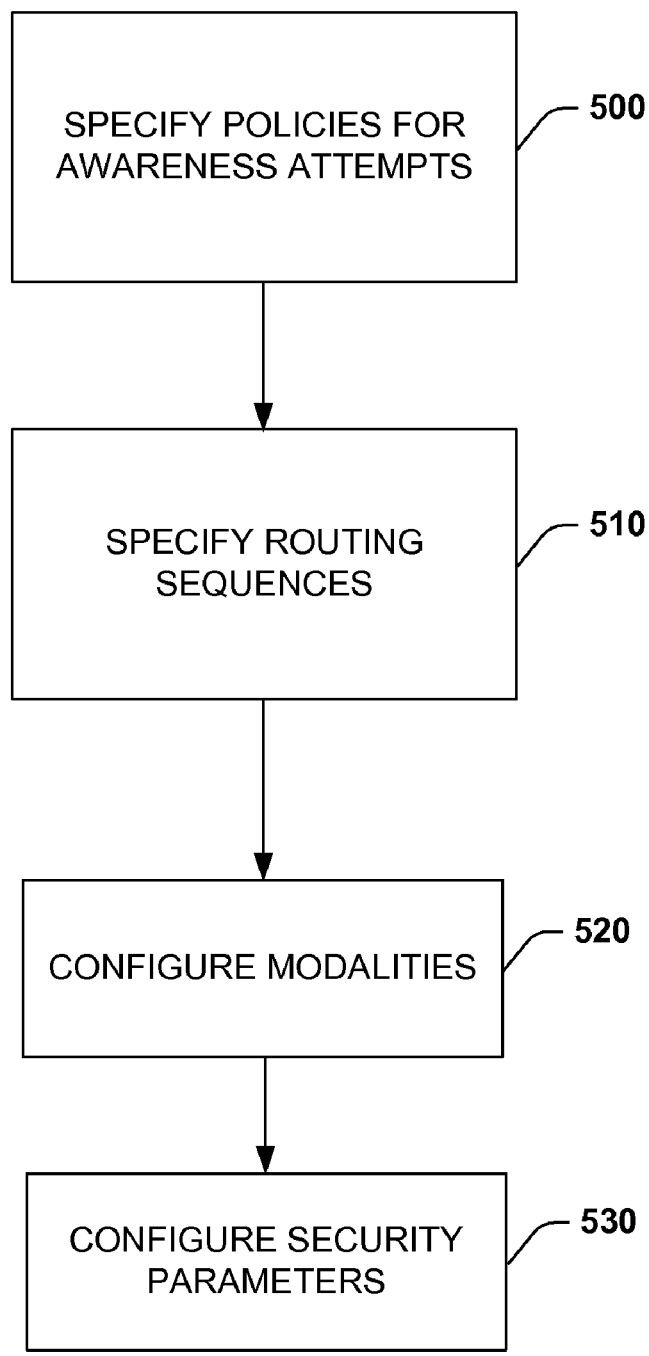
FIG. 6 is a flow chart diagram illustrating various configurations in accordance with an aspect of the present invention.

FIG. 6 is a flow chart diagram illustrating various configurations in accordance with an aspect of the present invention. At 500, communications policies can be specified via the user interface relating to awareness or communications attempts by respective contactors and/or contactees. For example, this can include defining policies that facilitate more immediate communications or to cause such activities as journaling or displaying communications attempts by a respective party. As an example, a default policy can be to only log an attempted communication from a party whereas a configuration can be provided to also notify and display an attempt at communications with or from a contactor and/or contactee. At 510, routing sequences for communications can be specified. This can include selecting a plurality of various context settings and best effort routing for communications channels that can be employed with respect to the context settings and include applying the context settings in a disjunctive manner or a conjunctive manner. In addition, conditions can be set based upon a selected channel of communication. For example, based on selected context settings such as a calendar, presence, time of day or day of the week, if any of the selected contexts are determined to be true, and if the communications are by phone from the contactor, then route the communications in order of a selected list of contact options such as an office phone, cell phone, voice mail, home phone, e-mail, hotel phone, pager and so forth. At 520, one or more communications modality settings can be configured. This can include display options for selected devices such as "If I only have my cell phone available," then direct to my cell phone display a notification of a communications attempt and forward the actual message to my e-mail.

Other settings can include format and/or compression settings that control the amount information that is displayed from a communications. In addition, lists of display and/or communications options can be exchanged between contactors and contactees regarding the most preferred contacting medium or modality, wherein the list is arranged in descending order of preference, for example. At 530, one or more security parameters can be configured. This can include limiting information that is provided to unknown or un-trusted contactors relating to the contactee. For example, rules or policies can be defined such that if a contactor is not configured in a selected grouping, then no information is shared regarding ability to communicate or information relating to current user context. More refined policies can consider sharing portions of contactee information with potential individuals or groups that can communicate with the contactee at a possible time in the future.

Figure 7:
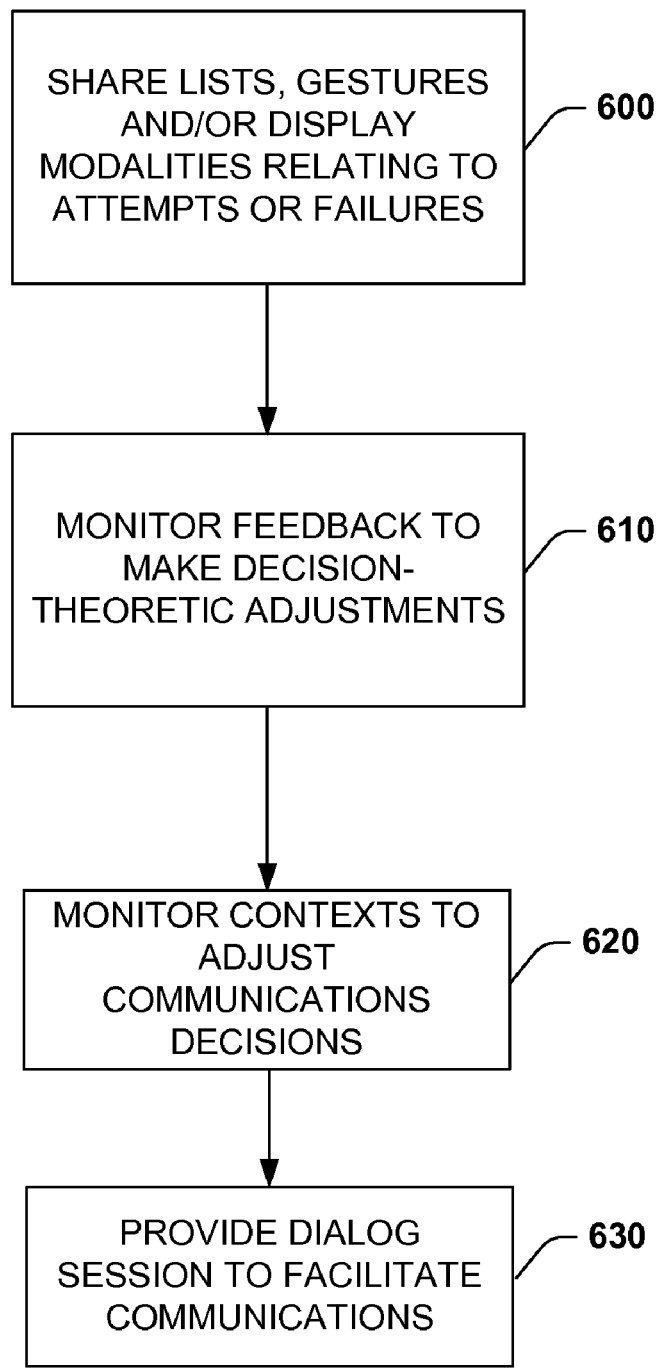
FIG. 7 is a flow chart diagram illustrating dynamic aspects of a communications system in accordance with an aspect of the present invention.

FIG. 7 is a flow chart diagram illustrating dynamic aspects of a communications system in accordance with an aspect of the present invention. At 600, one or more lists, gestures, and/or display modalities can be shared between contactors and contactees when communications are attempted or have subsequently failed. As described above, this can include sharing information relating to a present or future ability to communicate and information regarding preferences for the communication (e.g., presently I prefer to communicate with e-mail, but in 1 hour a phone conversation, e-mail, or voice mail is fine). In this manner, a cross-device experience can be shared between parties regarding potential communications or why further communications are not possible. At 610, user feedback can be monitored to make decision-theoretic or other type adjustments in the communications system. This can include altering, changing or inferring communications preferences based upon past or present actions or associated context of the user. At 620, user contexts can be monitored to adjust communications decisions. For example, if is determined that the user is engaged in a multi-level dialog in their office (sensed from microphone on desk top computer), it is possible to divert present attempts to communicate based on the inferred focus of the user's attention and/or selected policy that is described in more detail below. At 630, one or more dialog sessions (e.g., pop-up window asking questions with dialog box for user input) can be provided as feedback to the user to further facilitate configuration and communications in accordance with the present invention.

FIGS. 8-51 illustrate a graphical user interface that can be employed to configure and adjust a plurality of parameters that are related to what has been described above. This can include encoding preferences about people or groups, contexts and policies to facilitate communications between contactors and contactees. In addition, context settings can be abstracted in relation to communications senders or the sender's relationship to a user, by time of day, age or freshness of a project or task, by a users location and/or according to activity patterns or tasks. This can also include a plurality of other settings and configurations as are described in more detail below.

Figure 8:
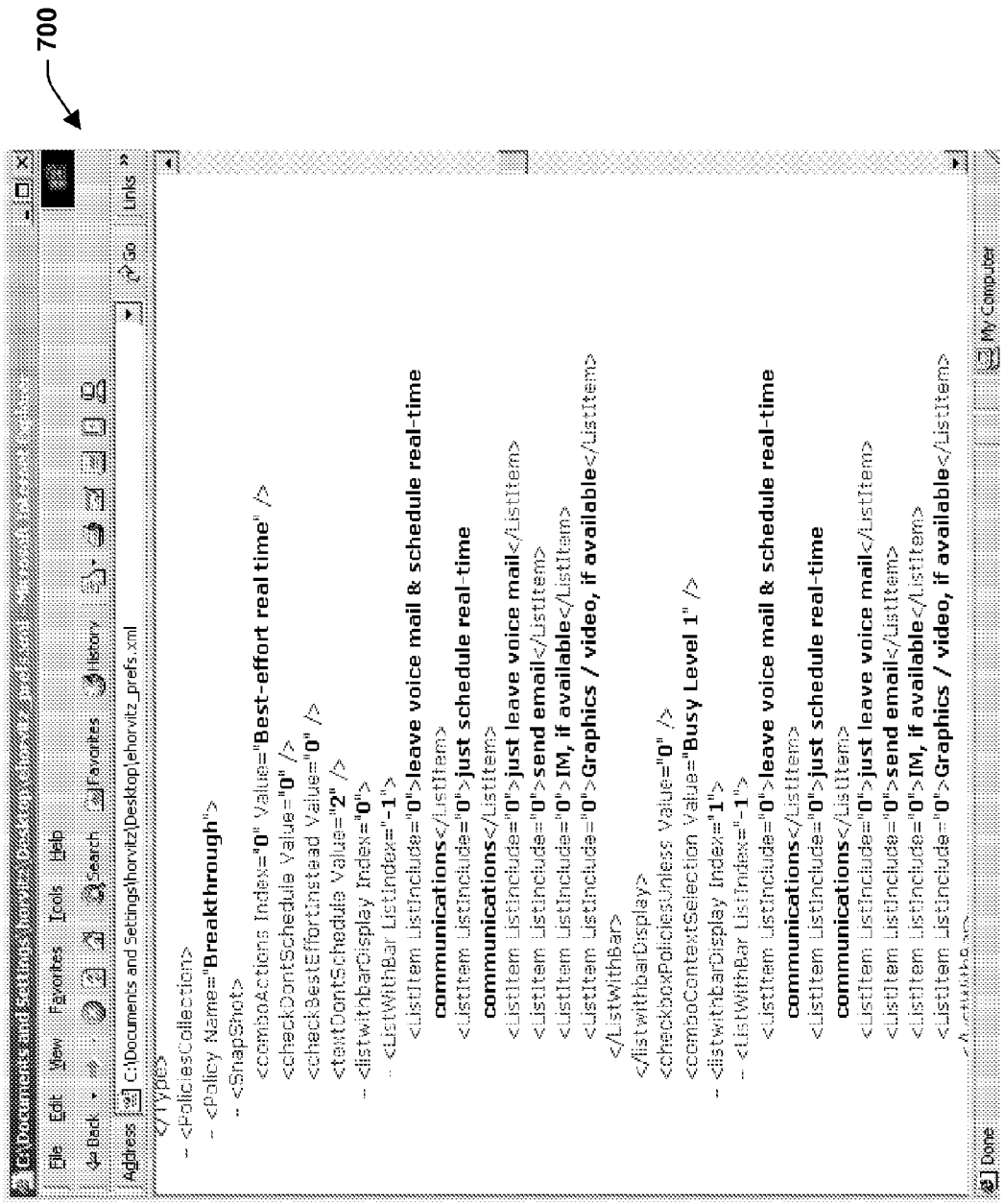
FIG. 8 is a diagram illustrating an XML configuration file in accordance with an aspect of the present invention.

FIG. 8 is a graphical user interface display illustrating an XML configuration file 700 in accordance with an aspect of the present invention. The XML file 700 includes a human/computer readable encoding of the people, contexts and communications preferences that are selected by a user (e.g., groups, policies, contexts, awareness, and notifications settings selected by the user of the interface). As described above, the XML file 700 can be sent to a subsequent system such as a contact manager to facilitate communications between parties based upon the selected settings.

Figure 9:
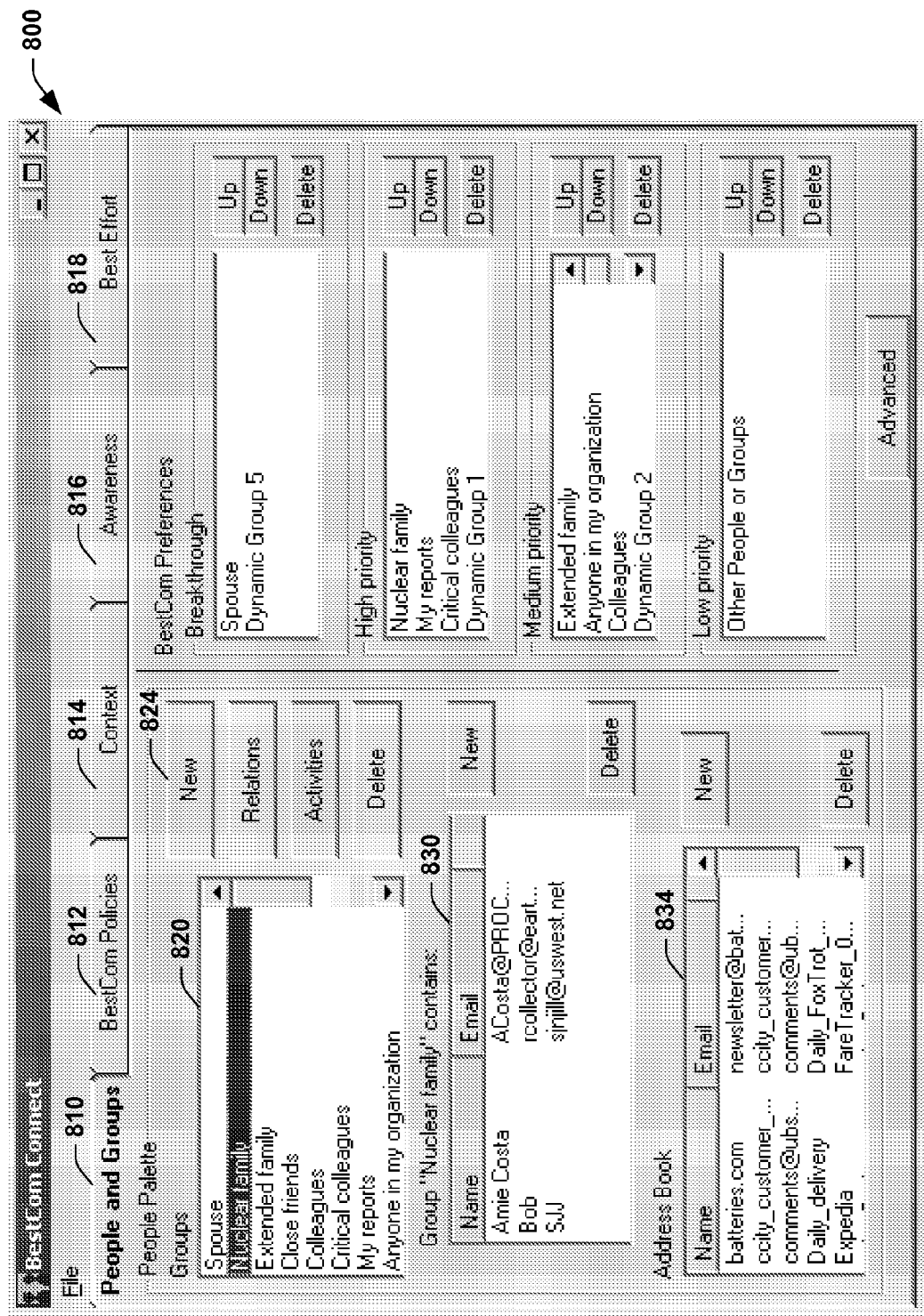
FIG. 9 is a diagram illustrating a graphical user interface to configure a communications system in accordance with an aspect of the present invention.

FIG. 9 is a diagram illustrating a graphical user interface 800 to configure a communications system in accordance with an aspect of the present invention. The interface 800 includes tabs 810 through 818 for selecting various configuration options of the present invention. For example, if the people and groups tab 810 is selected, one or more communications groups can be configured at 820, wherein new groups can be configured via a new button input 824. As illustrated some of the possible groups include spouses, friends, family, colleagues, reports and organizational people. An address field 830 can be provided that includes address information of one or more selected individuals from the groups at 820, wherein an address book 834 can be provided to facilitate look-up of the address information.

Figure 10:
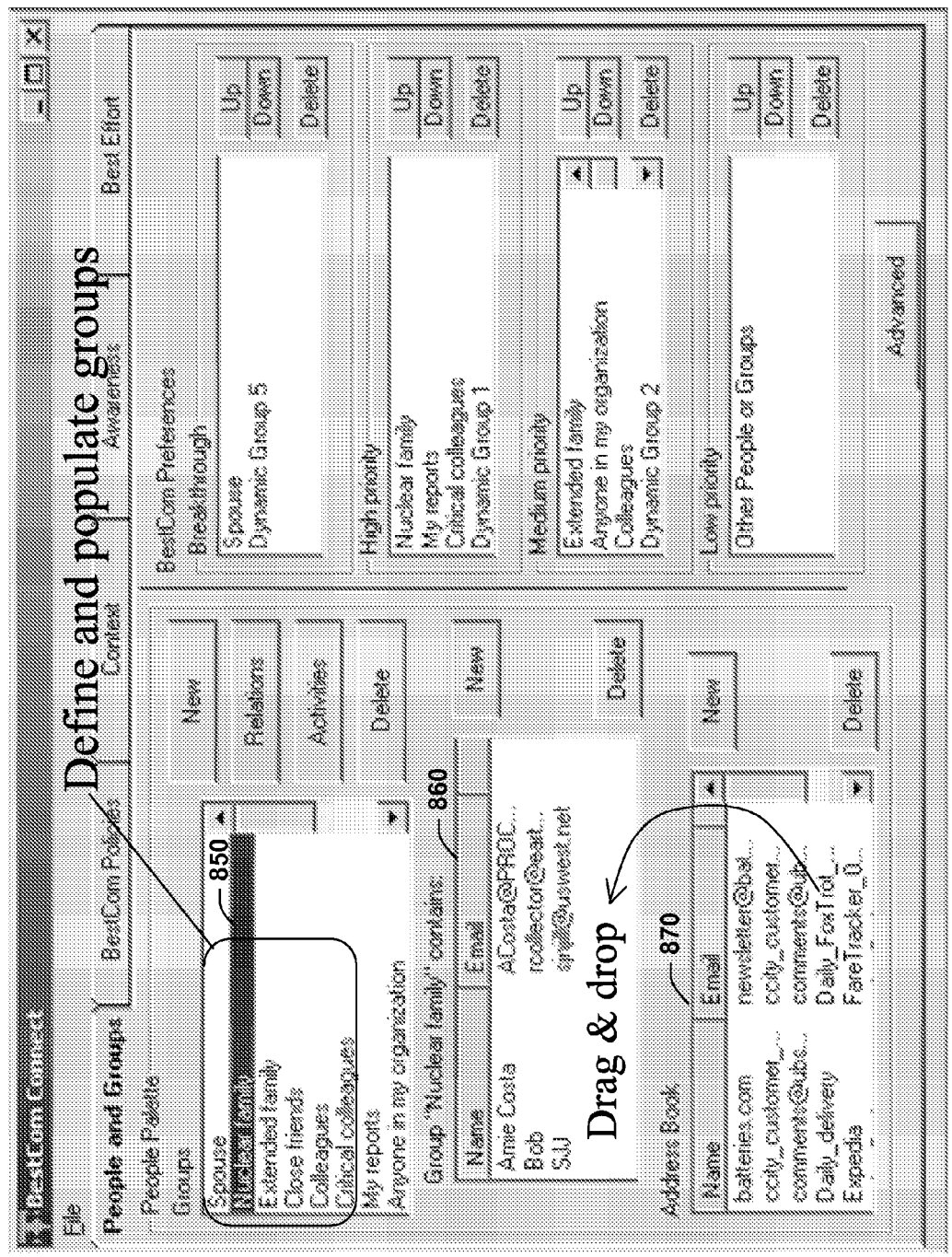
FIG. 10 is a diagram illustrating a graphical user interface to define and populate groups in accordance with an aspect of the present invention.
Figure 11:
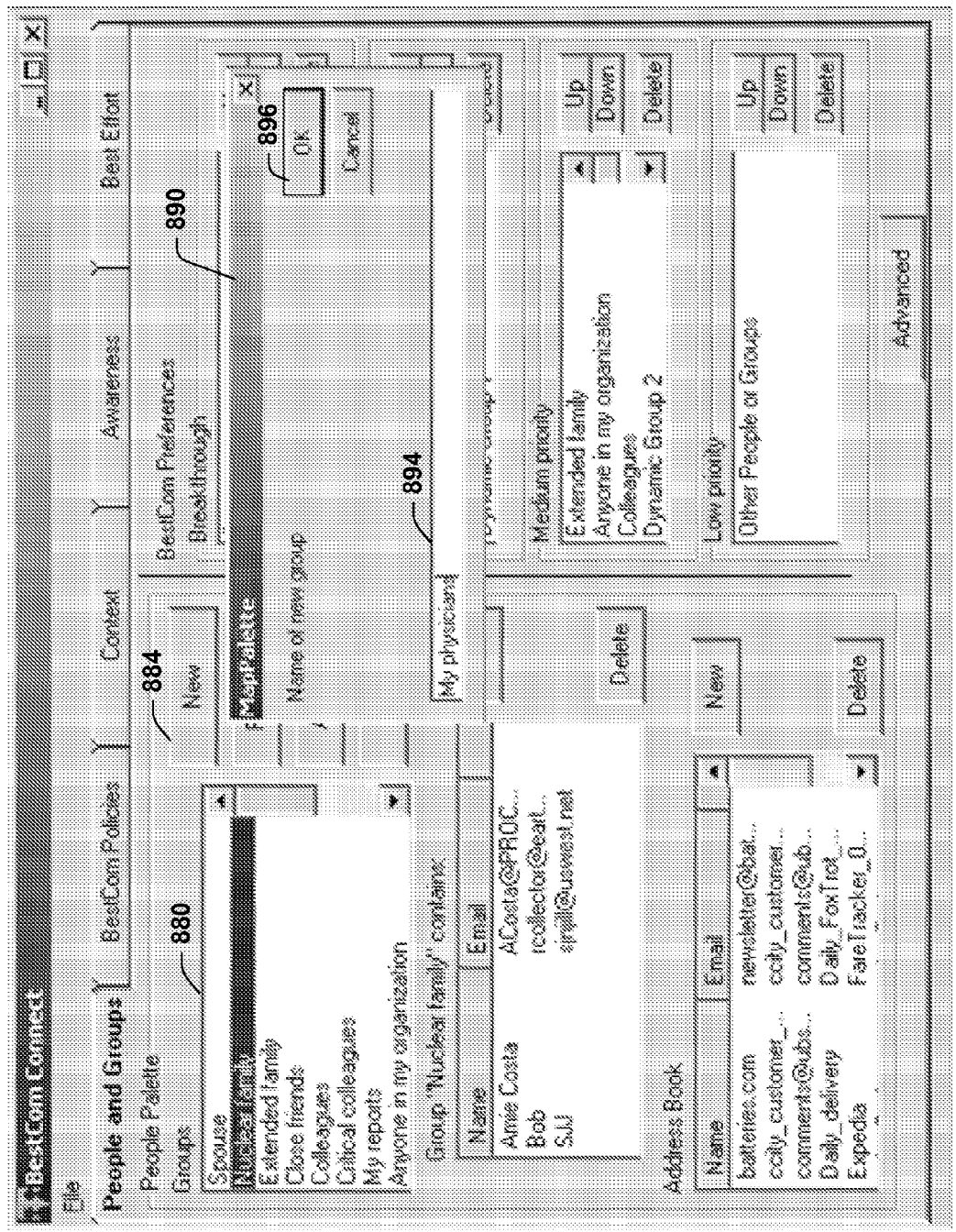
FIG. 11 is a diagram illustrating a graphical user interface to further define and populate groups in accordance with an aspect of the present invention.

FIGS. 10 and 11 are diagrams illustrating a graphical user interface to define and populate groups in accordance with an aspect of the present invention. For example, a nuclear family is selected at 850, wherein the addresses of the family are illustrated at 860. As illustrated, other members of the nuclear family can be added to the nuclear family at 860 by dragging and dropping a selected address from the address book at 870. FIG. 11 is a diagram illustrating adding a new group to the groups at 880. For example, if a new button is selected at 884, a selection palate 890 is displayed, wherein the user types or speaks the name of a new group at 894 (e.g., my physicians), and subsequently selects OK at 896 to complete the addition of the new group at 880. It is to be appreciated that a plurality of such groups having a plurality of associated definitions can be similarly added.

Figure 12:
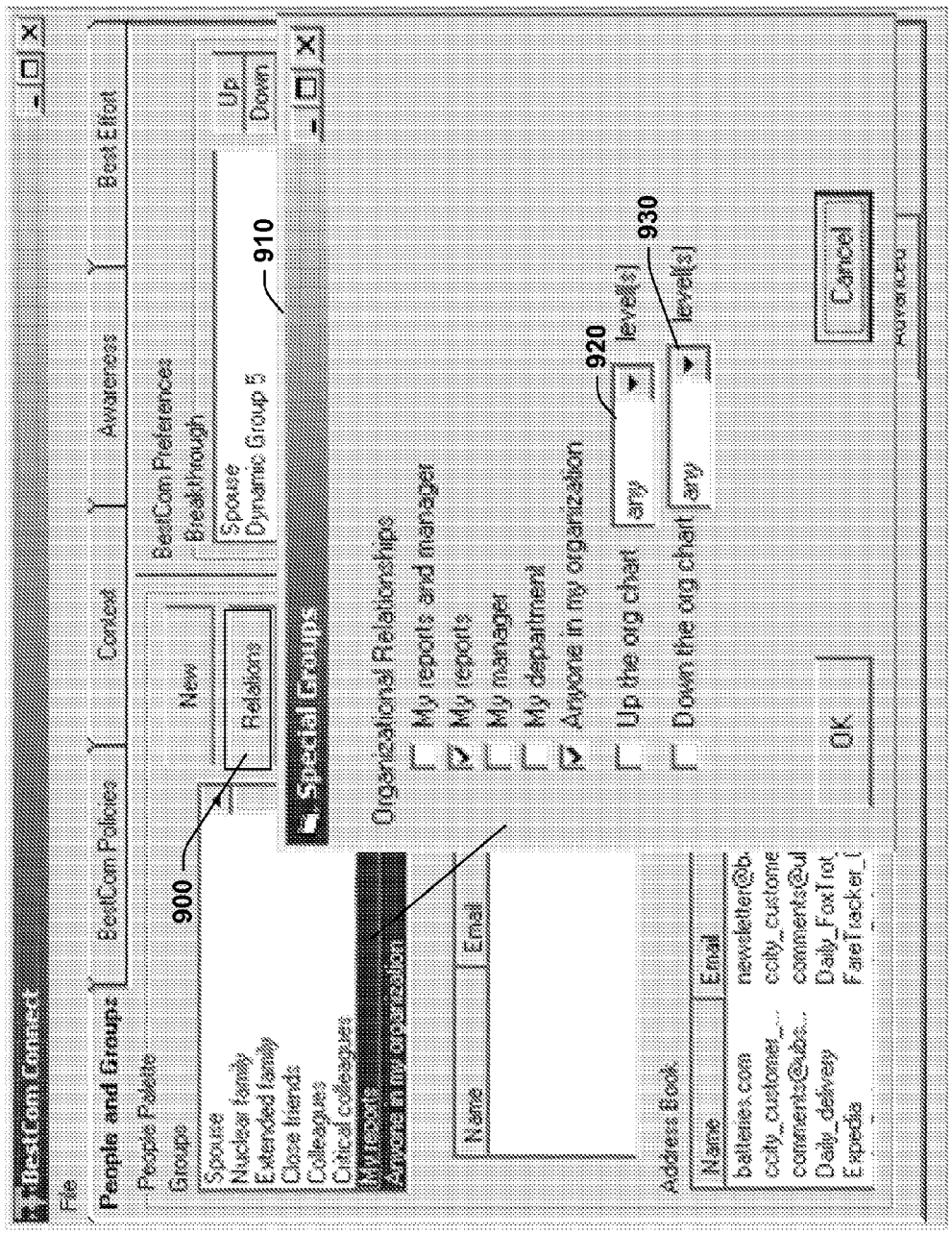
FIG. 12 is a diagram illustrating a graphical user interface to define relationships in accordance with an aspect of the present invention.

FIG. 12 is a diagram illustrating a graphical user interface to define groups by relationships in accordance with an aspect of the present invention. This can include selecting a relationship input at 900, wherein a selection pane 910 is then provided. As illustrated, the selection pane 910 includes selections for such categories of relationships as my reports and manager, my reports, my manager, my department, anyone in my organization, up the org chart and down the org chart. Thus, groups can be defined according to the relationship to the interface user at a higher level of abstraction. At 920 and 930, additional inputs can select an organizational level (e.g., person two tiers above me, or three tiers below me) at which a user defines a relationship with another person or group at different tiers of an organization.

Figure 13:
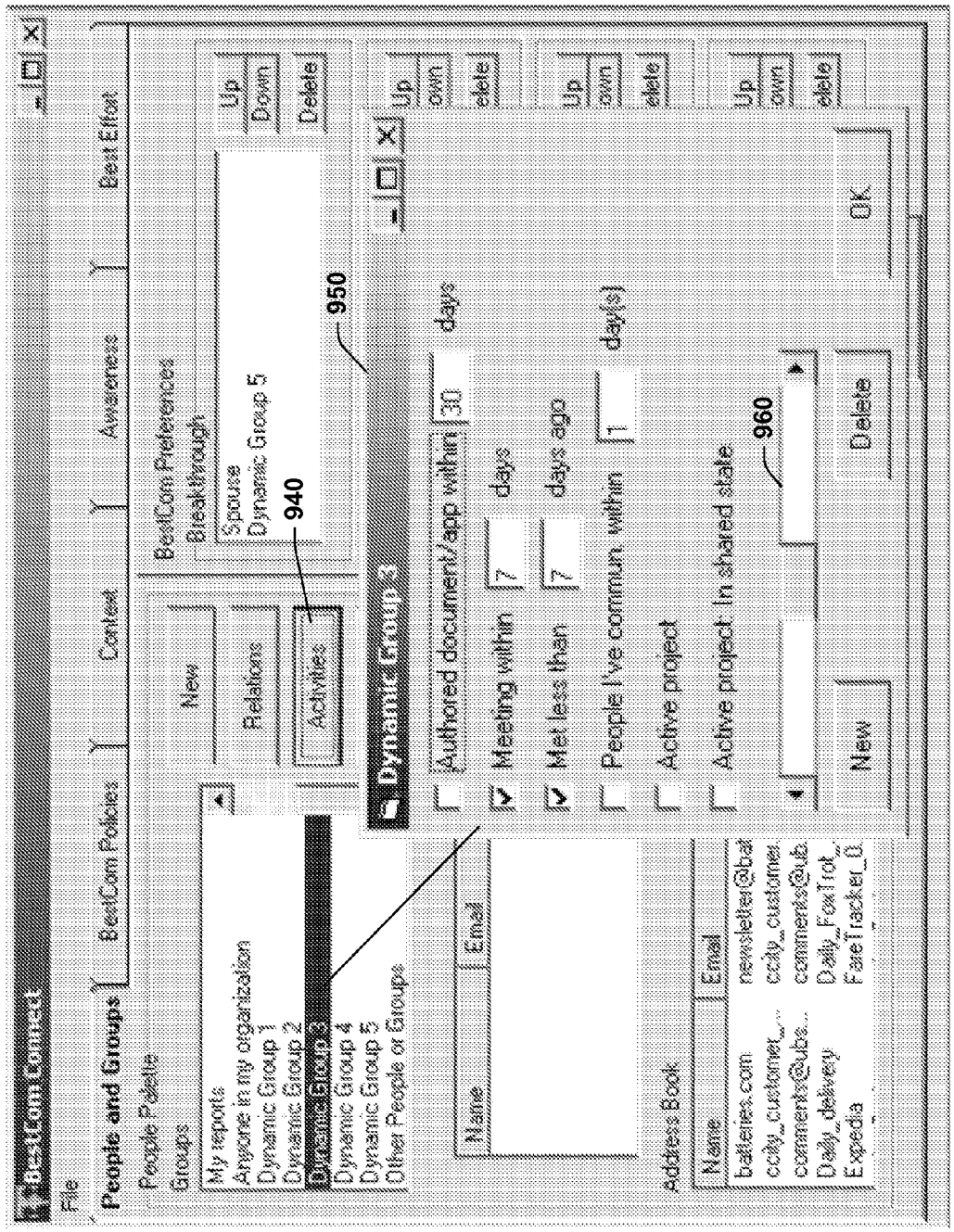
FIG. 13 is a diagram illustrating a graphical user interface to define groups in a dynamic manner, based on a sensed situation or state in accordance with an aspect of the present invention.

FIG. 13 is a diagram illustrating a graphical user interface to define dynamic groups in accordance with an aspect of the present invention. An activities input 940 can be selected, wherein a selection pane 950 is provided to define a dynamic groups of potential contactors. As can be appreciated a plurality of such groups can be defined. For example, a dynamic group 3 is illustrated as being configured in FIG. 13. Various selection options include enabling communications with those people who have authored a document or application within a selected timeframe such as days or hours. Other selections at 950, include adding people who have met with the user within a selected time frame (e.g., meeting within 7 days, met less than 7 days ago, people I have communicated within a selected timeframe). Another option can include communicating with people that are involved on an active project or on an active project that is involved in a shared manner with another activity or project. An adjustment slider 960 can also be provided to adjust one or more of the selected timeframes in the selection pane 950.

Figure 14:
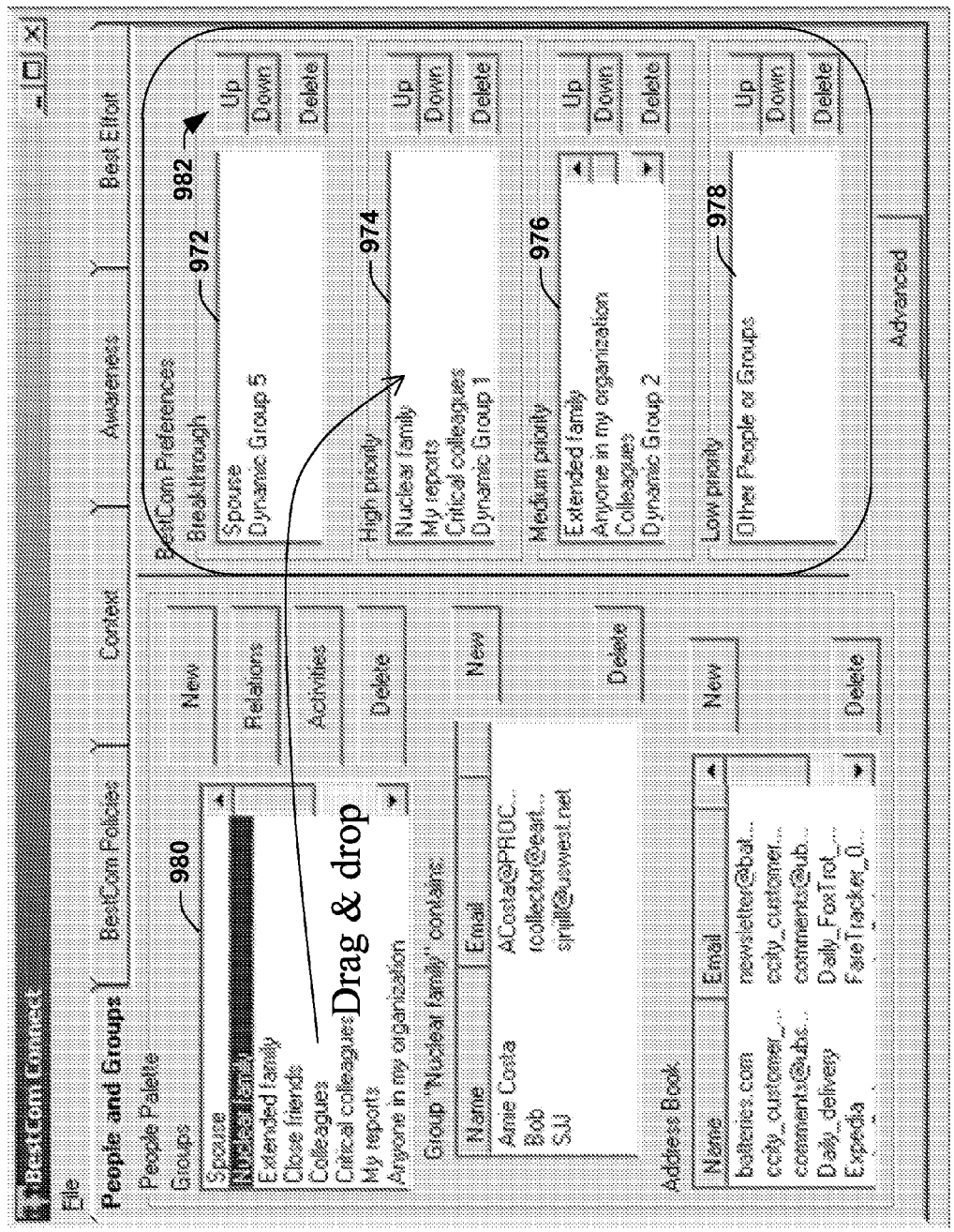
FIG. 14 is a diagram illustrating a graphical user interface to assign groups to policies via drag and drop action in accordance with an aspect of the present invention.

FIG. 14 is a diagram illustrating a graphical user interface to assign groups to policies via drag and drop action in accordance with an aspect of the present invention. One or more policy display/configurations 972-978 are provided that control how and when communications are established between parties. For example, a breakthrough policy is displayed at 972 that include the highest priority of rules and policies for establishing communications to selected groups such as a spouse or dynamic group 5, for example. Lower priority categories for establishing communications such as high priority 974, medium priority 976 and low priority 978 can be similarly provided. Groups can be added to a policy category by simply dragging and dropping a selected group from the groups at 980 into a selected policy or preference category at 972 through 978. Other adjustments such as up, down, and delete adjustments illustrated at 982 can be provided to move groups up or down between policy categories or to delete a group from a selected category, if desired.

Figure 15:
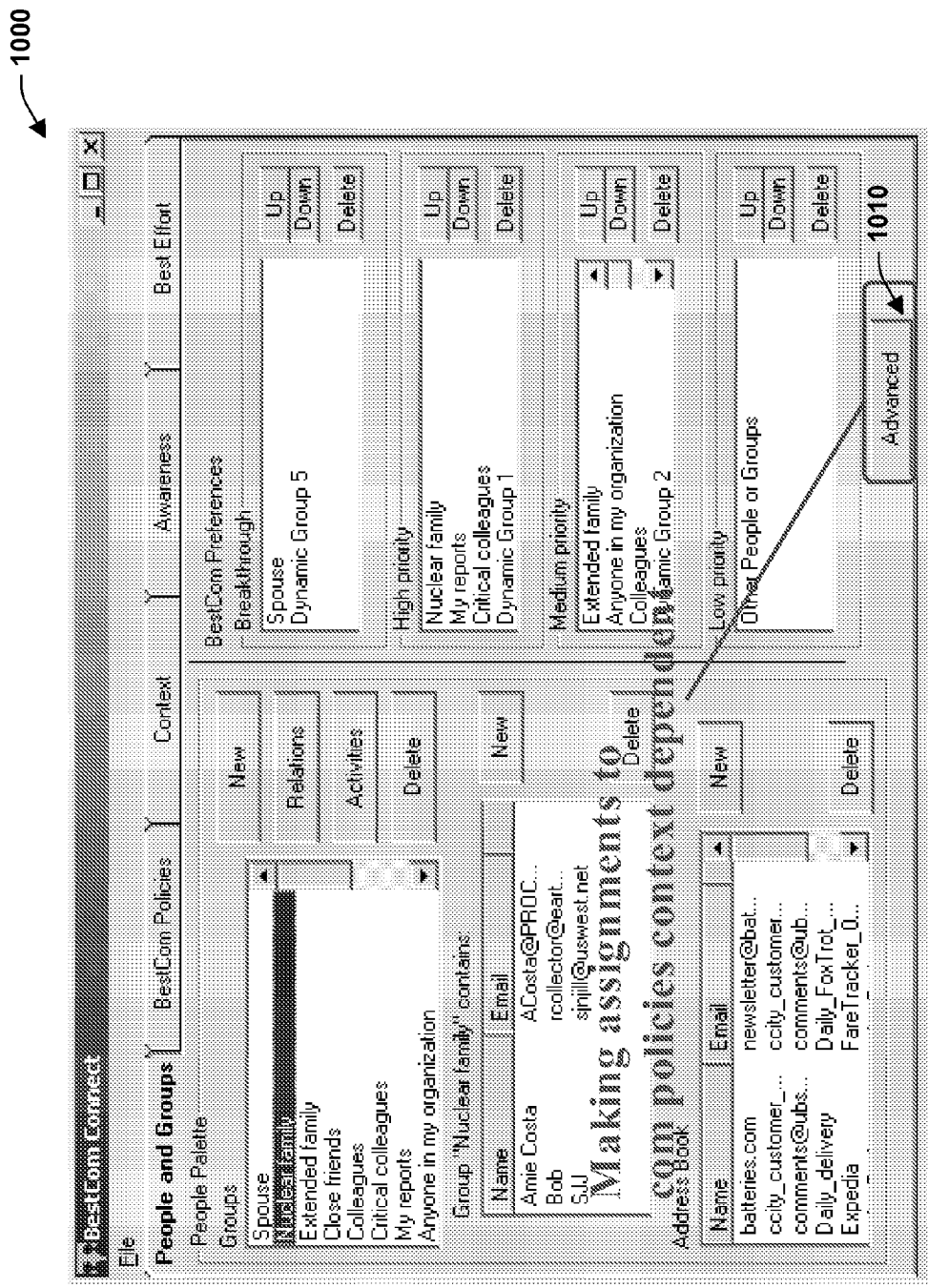
FIGS. 15-17 are diagrams illustrating the functionality of a graphical user interface to further make the assignment of groups, people, dynamic projects, or situations to policies dependent on the time of day and day of week, to show an example of one of several ways that such assignments of people and groups to policies can be made a function of other variables.
Figure 16:
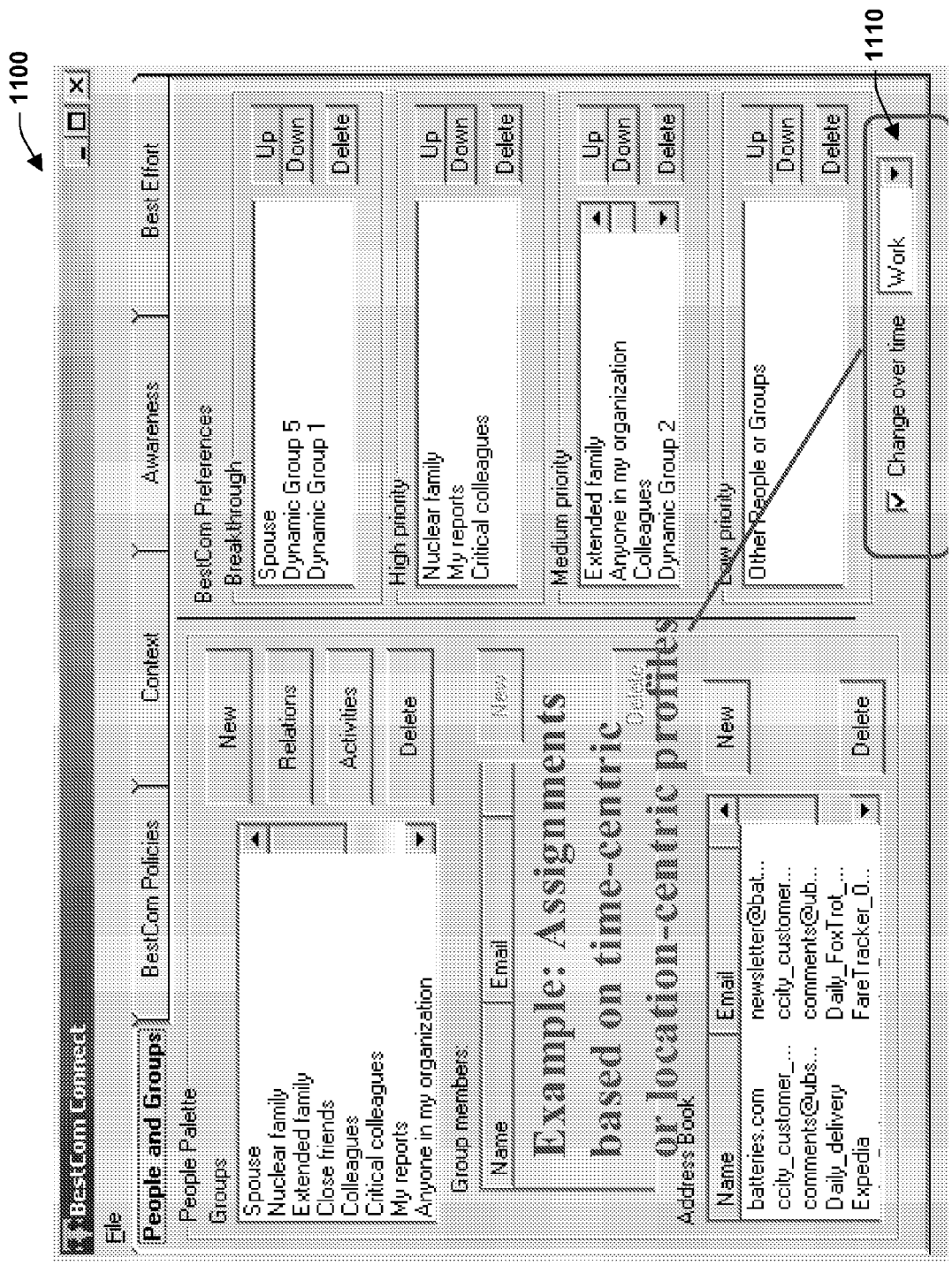
Figure 17:
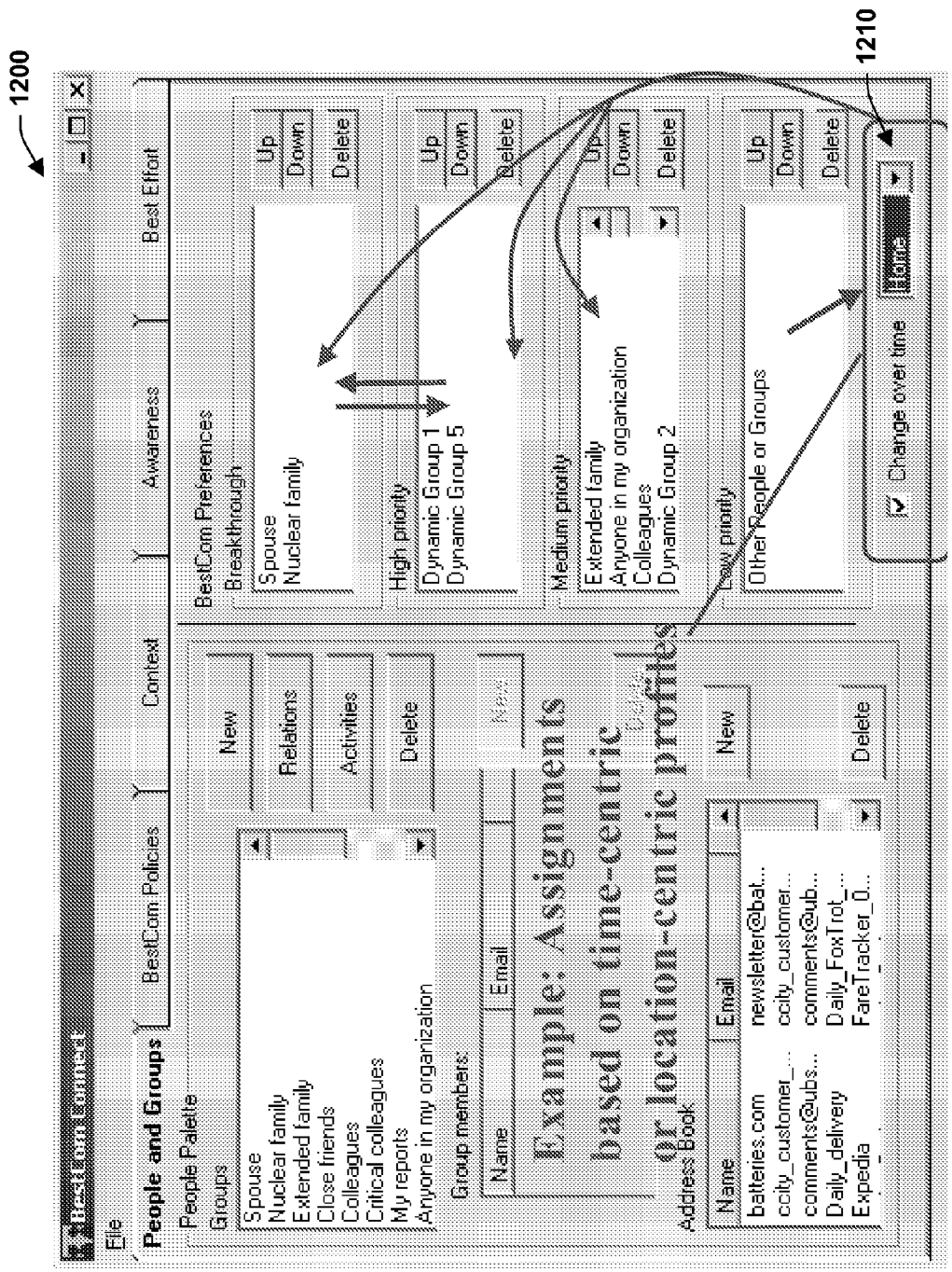

FIGS. 15-17 are diagrams illustrating the functionality of a graphical user interface to further make the assignment of groups, people, dynamic projects, or situations to policies dependent on the time of day and day of week, to show an example of one of several ways that such assignments of people and groups to policies can be made a function of other variables.

FIG. 15 is a diagram 1000 illustrating making assignments to communications policies context dependent in accordance with an aspect of the present invention. An advanced button 1010 can be selected to enable various profiles of communications options depending on a selected context. For example, FIG. 16 is a diagram 1100 illustrating making assignments to communications policies time-centric or location-centric profiles, wherein a work profile is selected at 1110 which enables different groups and/or communications settings than illustrated in FIG. 15. FIG. 17 is a diagram 1200 illustrating making assignments to communications policy change with a different context such as via a home context illustrated at 1210.

Figure 18:
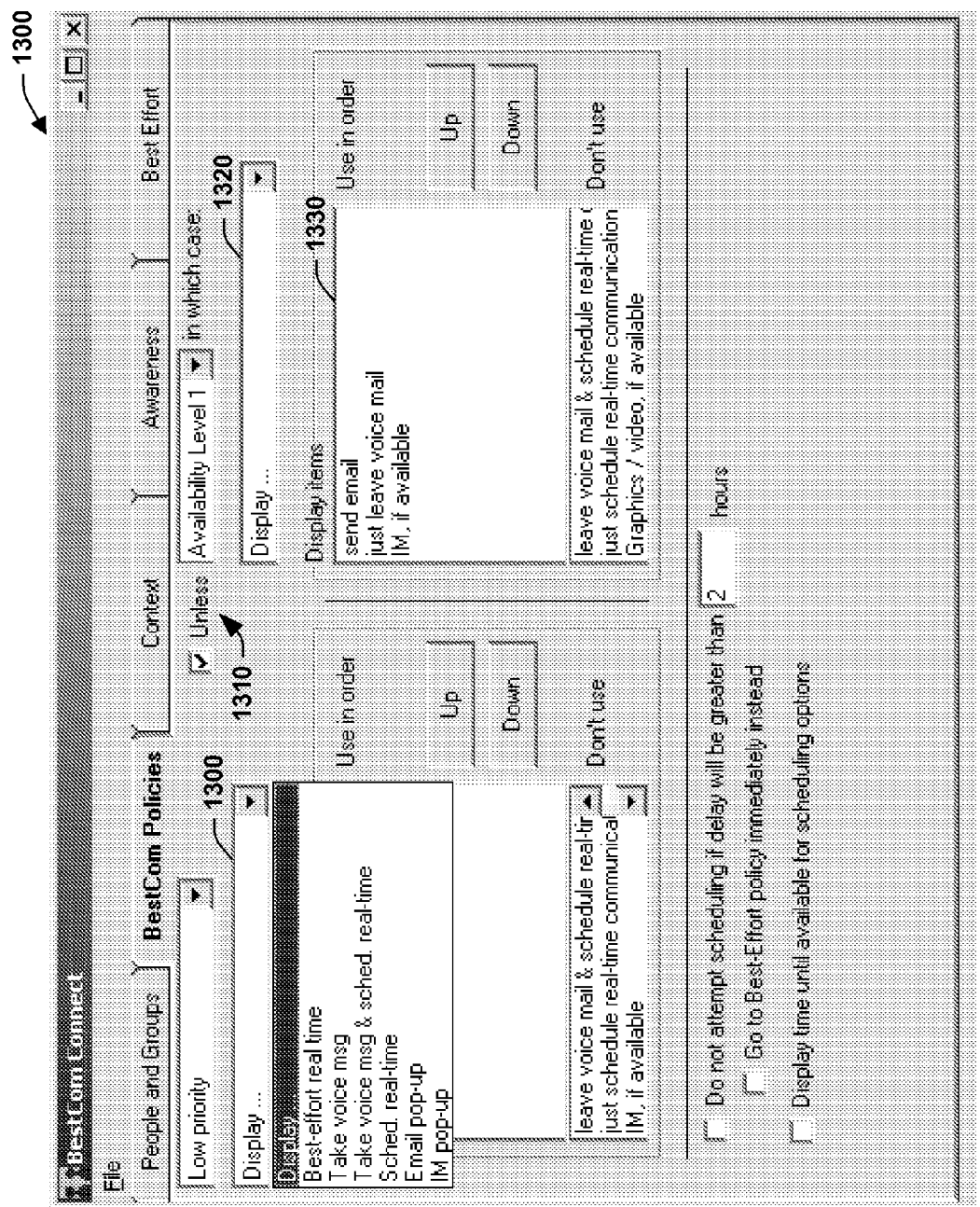
FIGS. 18-22 are diagrams illustrating a graphical user interface to configure policies in accordance with an aspect of the present invention.
Figure 19:
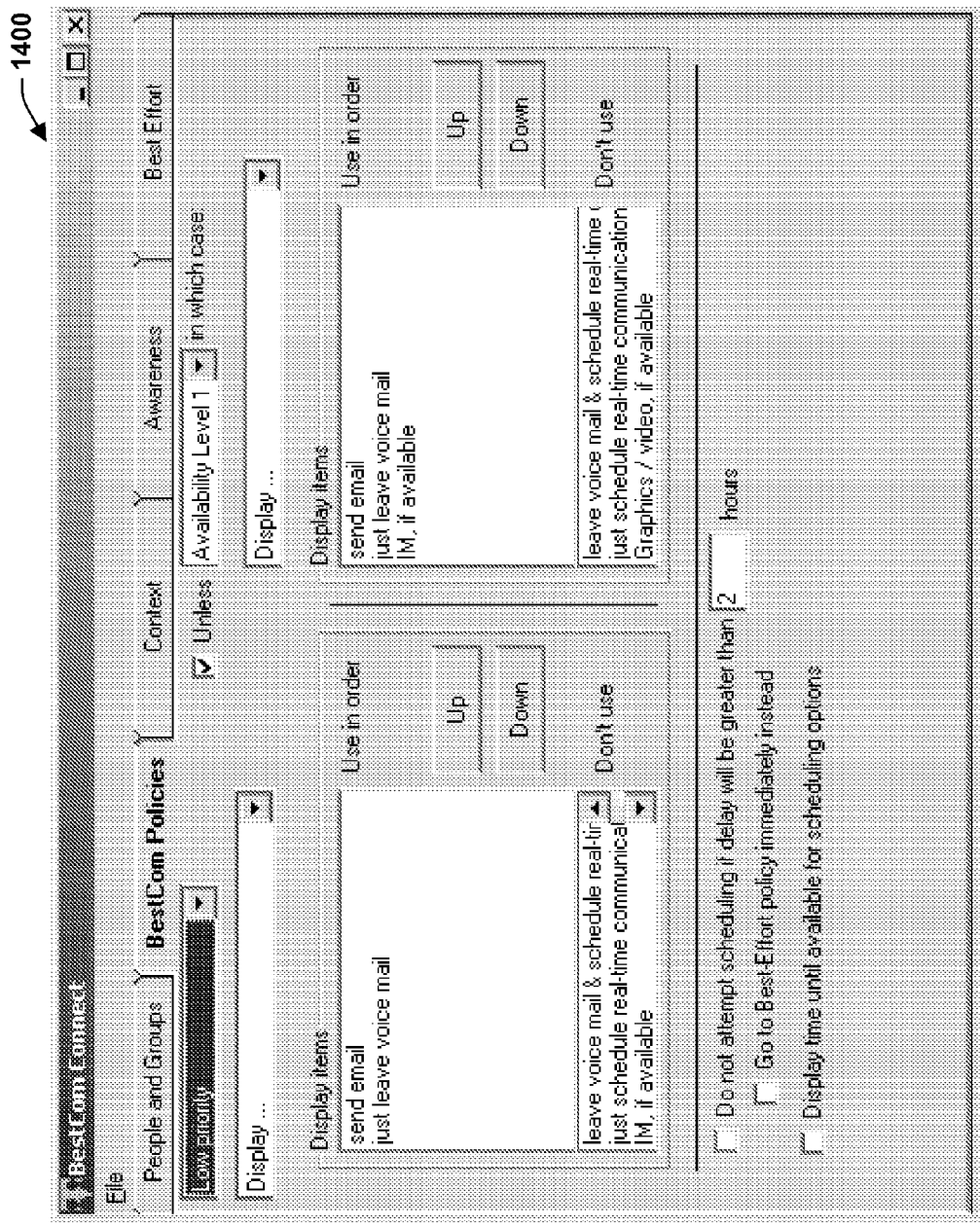

A low priority policy configuration is illustrated in FIG. 18. For example, some of the policy selections for communicating to the user at low priority are illustrated at 1300, wherein communications options can be selected from display, best-effort for real time communications, take a voice message, schedule an interview or phone conversation, display, and an e-mail pop-up, for example. Other communications options can include a policy setting at 1310 that includes a selection for a user-defined state. In other words, low priority selections for communications are to be in effect unless an availability level 1 or other selected availability is detected. The options for the alternative policy at 1310 are illustrated at 1320 and 1330, wherein a display configuration is selected for example, and associated display items (sent to contactor display output) are sending an e-mail and leaving a voice mail, for example. It is to be appreciated from the various options that a plurality of customized policies can be configured. FIG. 19 is a diagram 1400 illustrating a configured policy setting after the user has selected desired policies for communications at low priority.

Figure 20:
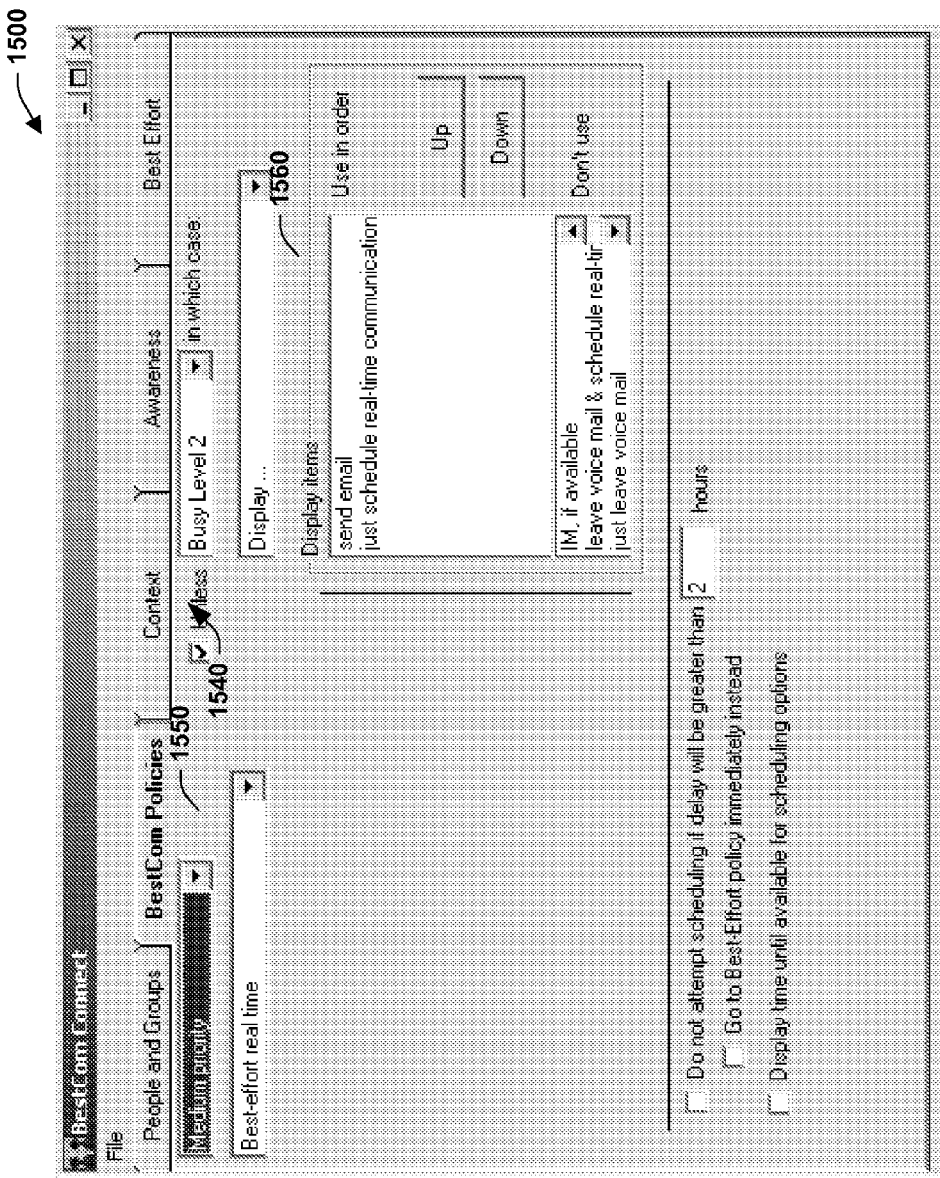
Figure 21:
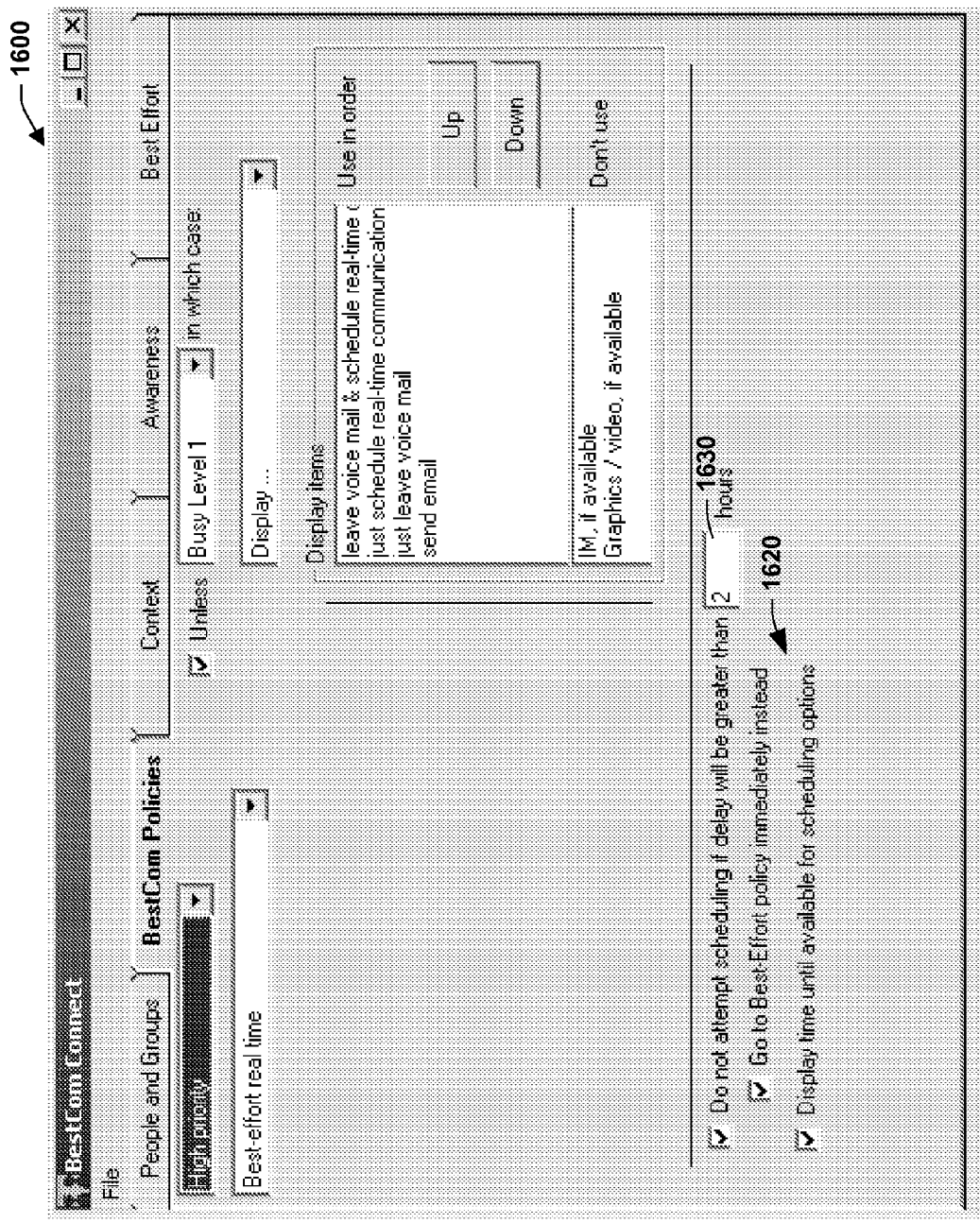
Figure 22:
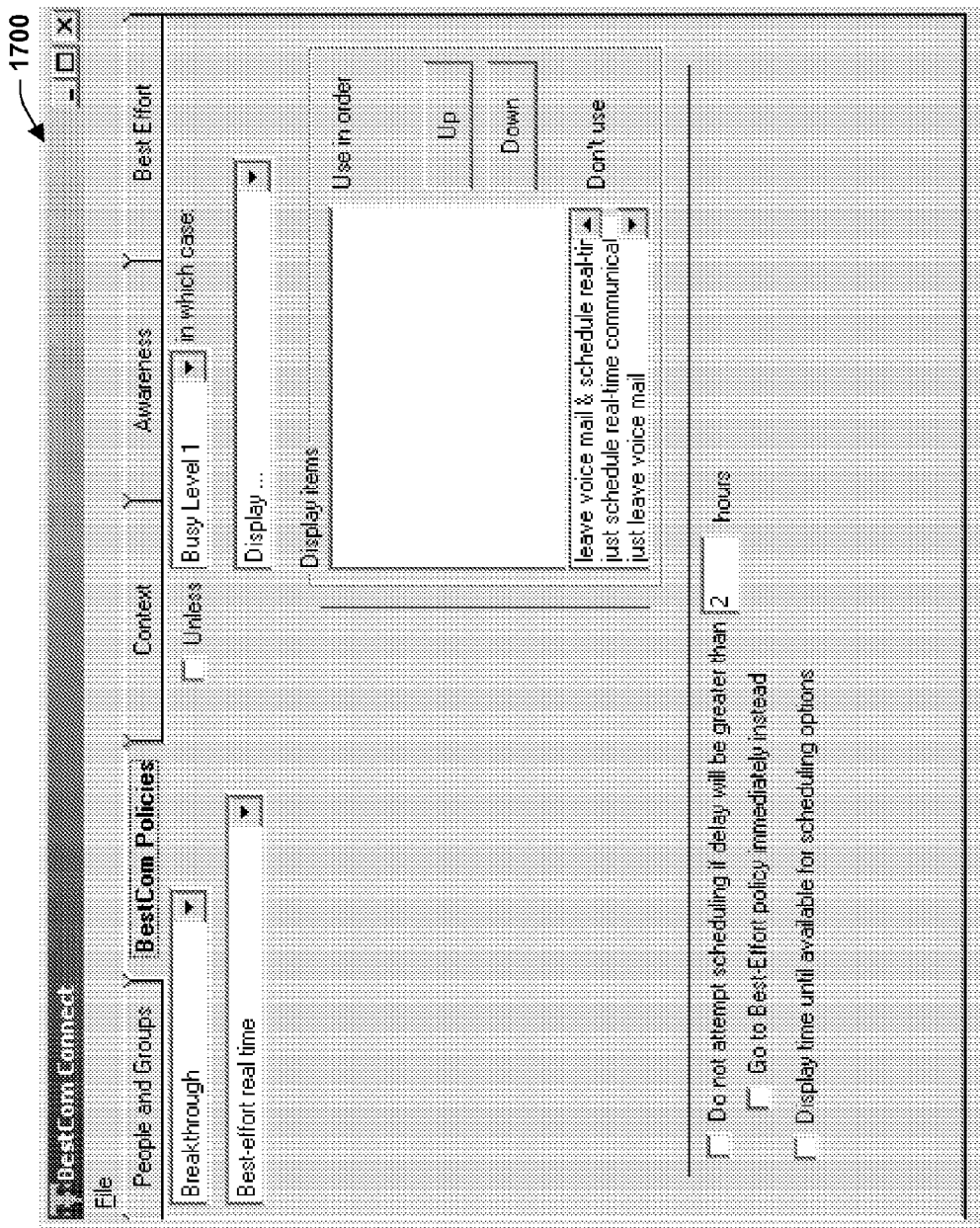

FIGS. 20 and 21 illustrate exemplary settings for medium and high priority policies. As can be appreciated, one or more of the policy options described above could also be selected for these policy settings. FIG. 20 illustrates a different selection at 1540 that indicates "an unless policy option configured for Busy Level 2" as opposed to an availability level described above. In other words, if Busy Level 2 is determined as an active state, a best effort real time communications as illustrated at 1550 is bypassed in favor of the options selected at 1560. FIG. 21 illustrates other policy selection options illustrated at 1620. These options include for example, do not attempt scheduling if a delay is greater than a selected timeframe at 1630. Another option is to go to a best effort communications policy immediately. Still another option is to display an amount of time available for other scheduling options. FIG. 22 is a diagram 1700 illustrating an exemplary breakthrough policy setting for communications.

FIGS. 23-29 are diagrams illustrating a graphical user interface to configure contexts in accordance with an aspect of the present invention.

Figure 23:
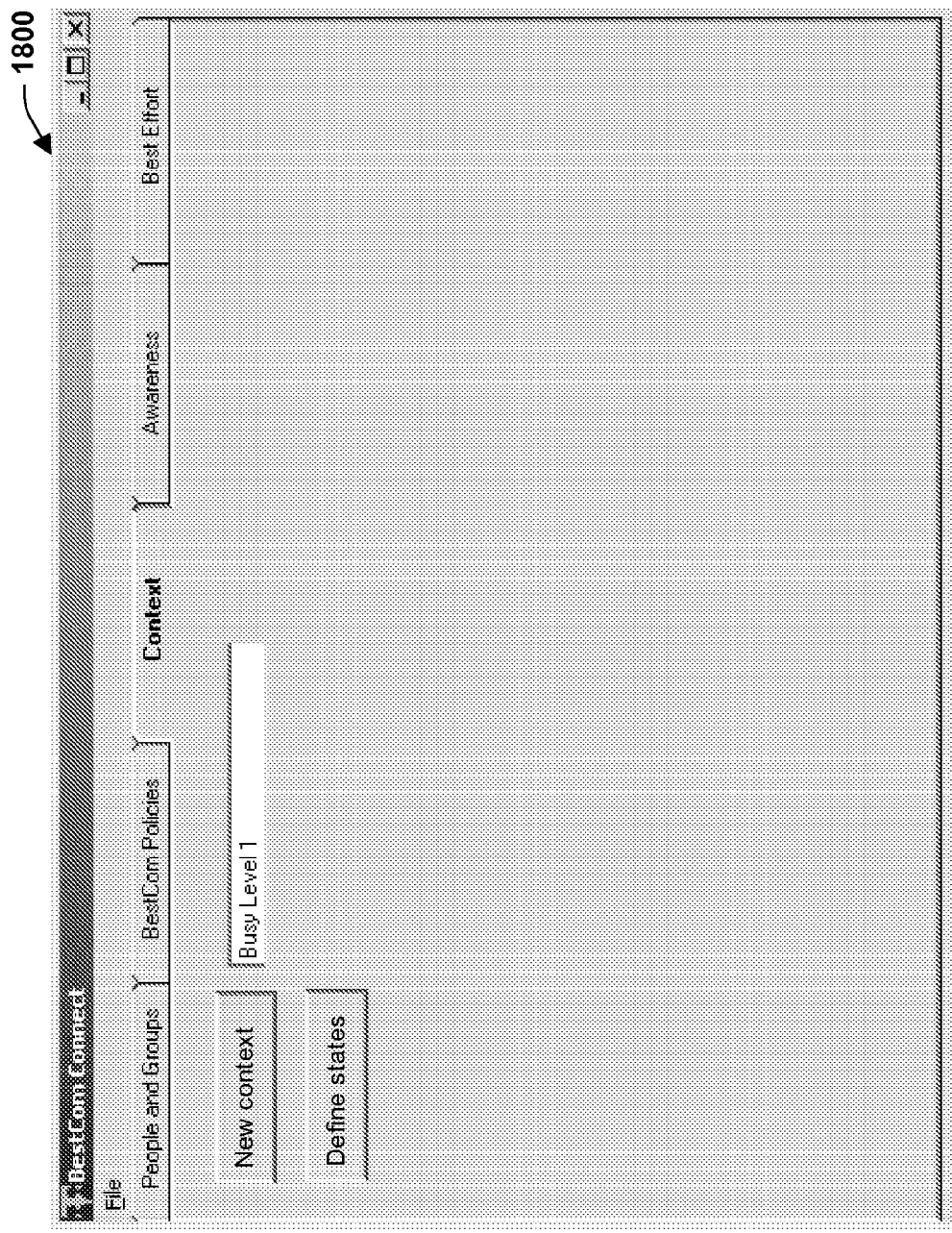
FIGS. 23-29 are diagrams illustrating a graphical user interface to define and configure contexts in accordance with an aspect of the present invention.

FIG. 23 is a diagram 1800 illustrating a graphical user interface to allow users to define new contextual states in accordance with an aspect of the present invention.

Figure 24:
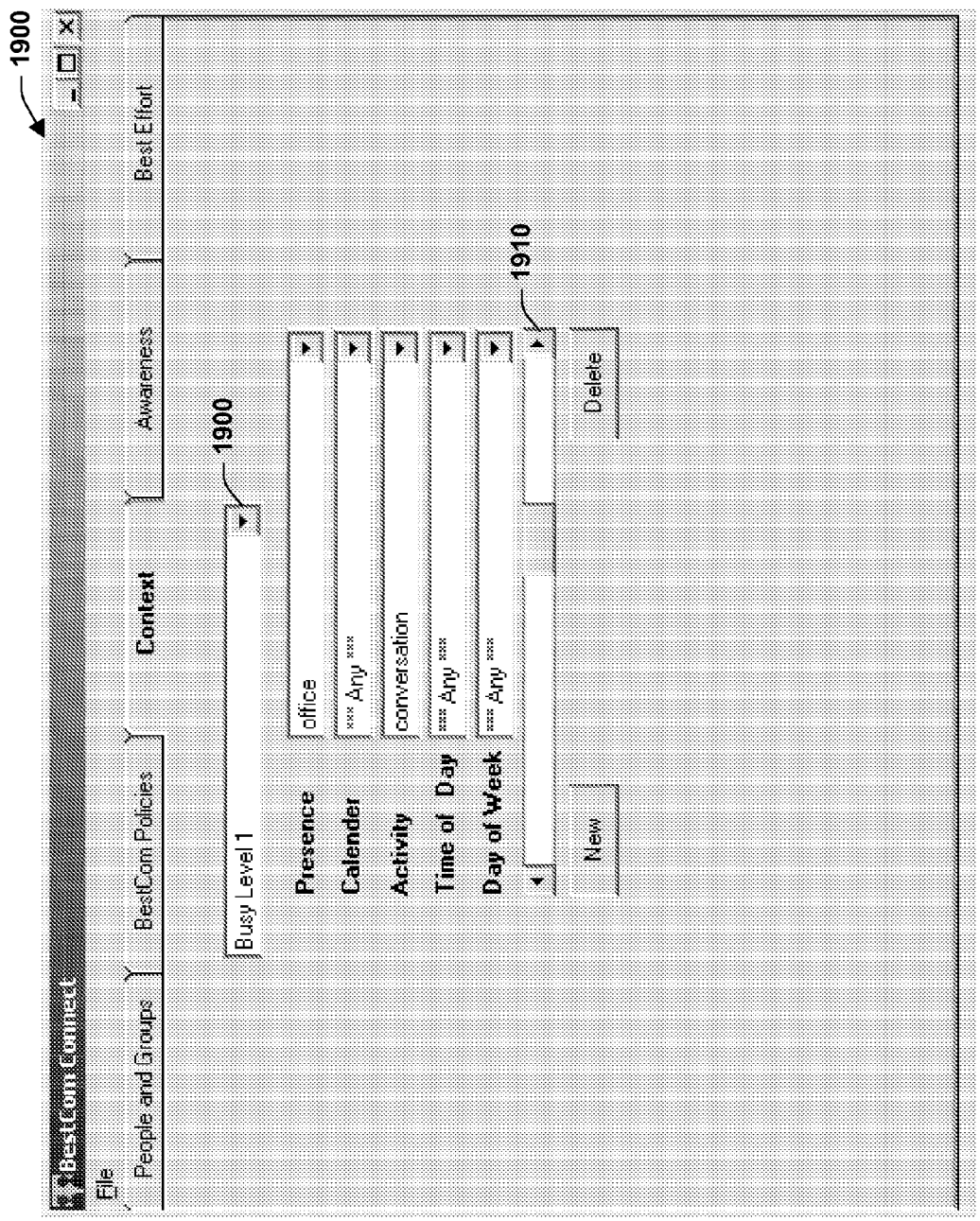
Figure 25:
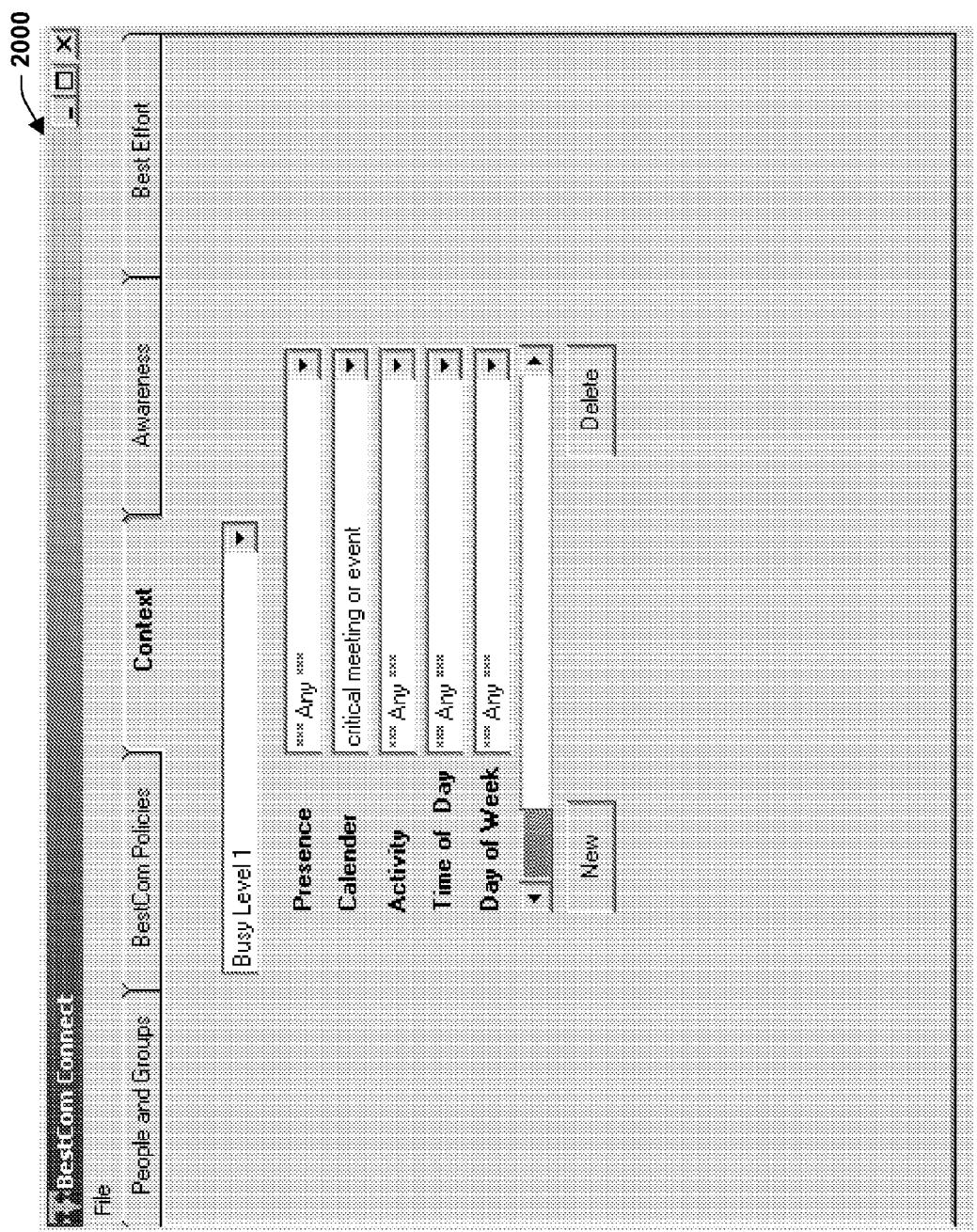
Figure 26:
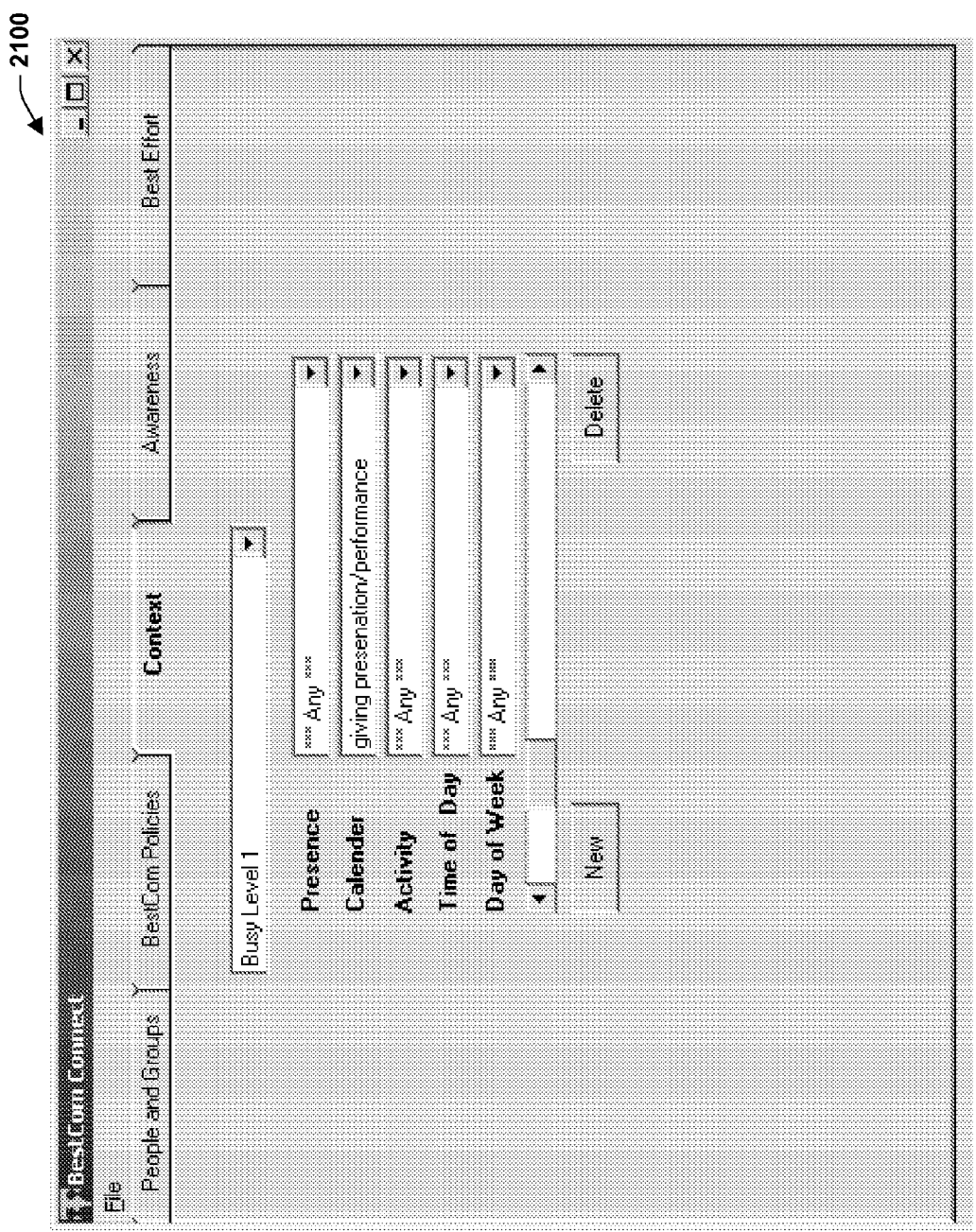
Figure 27:
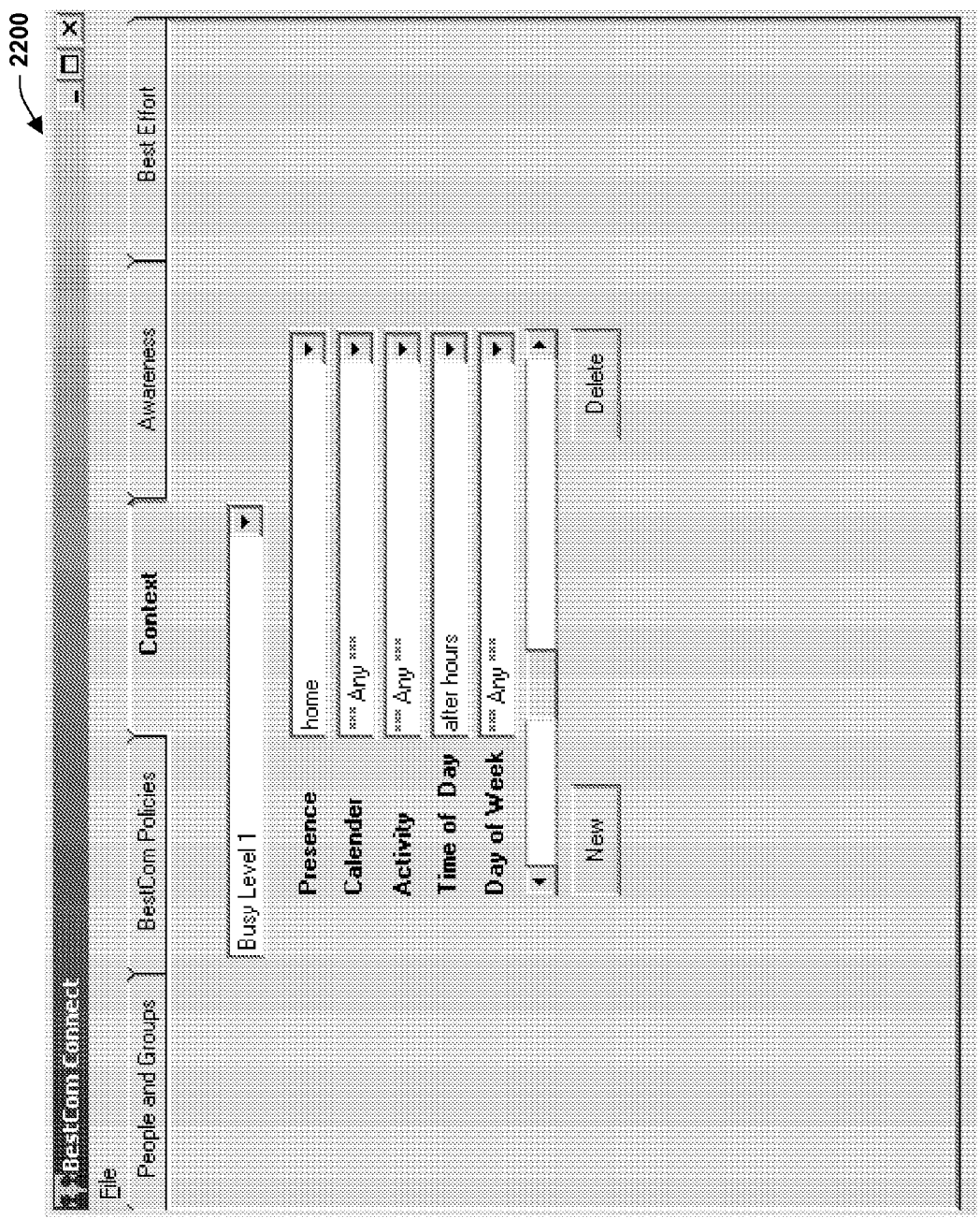
Figure 28:
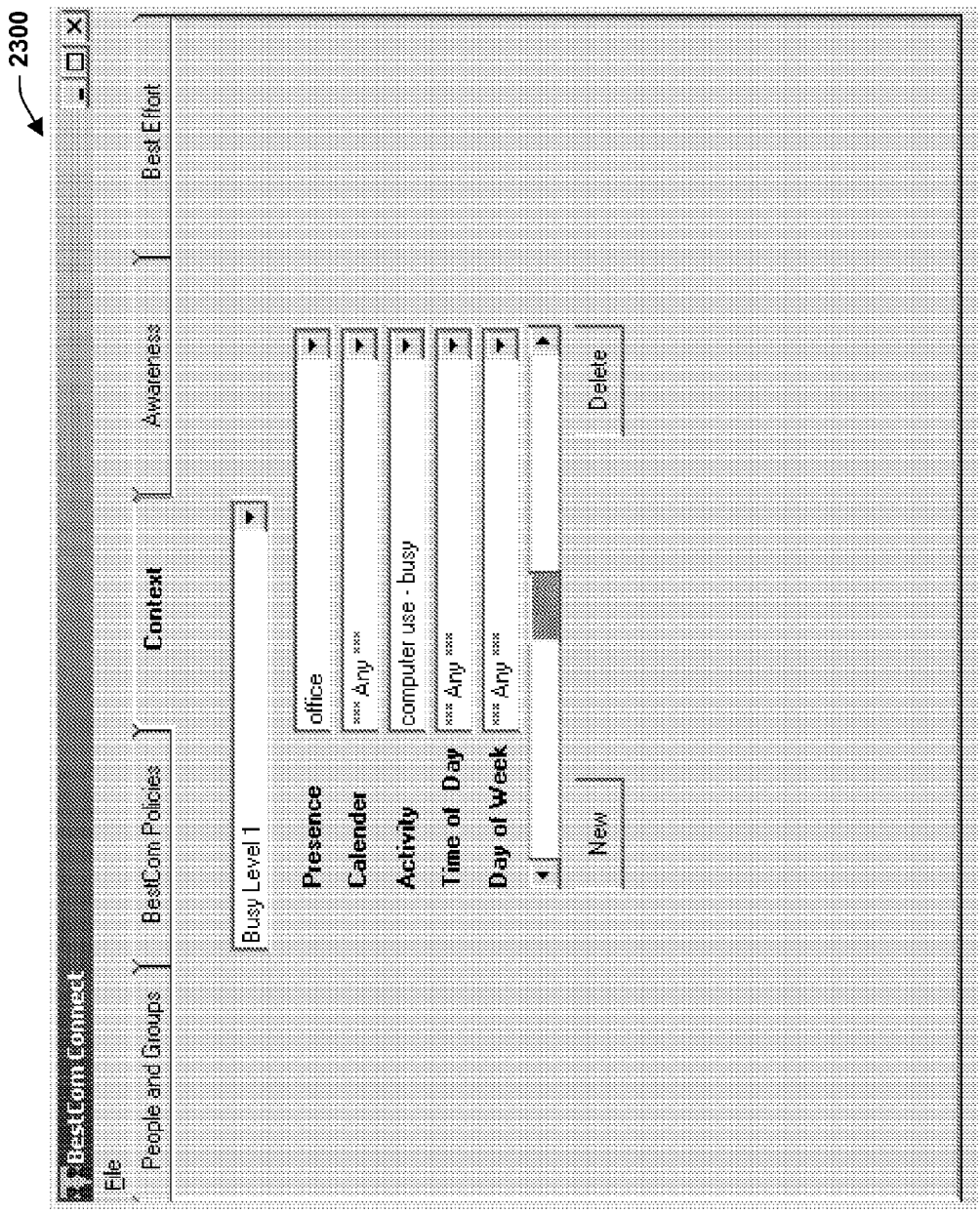
Figure 29:
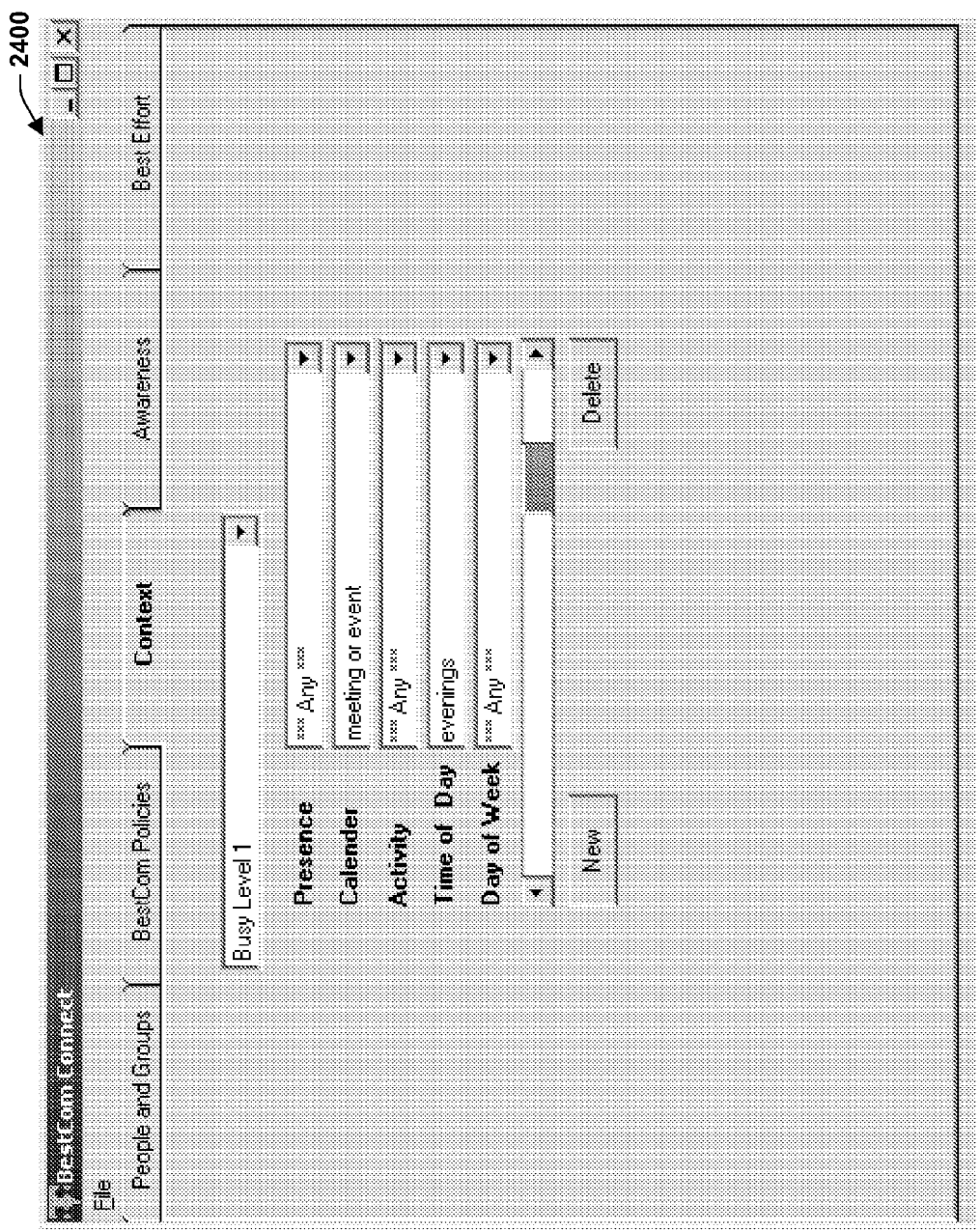

Contexts can be in terms of busy-ness levels, availability levels and/or other context states, wherein an exemplary context state is illustrated as Busy Level 1 at 1900 in FIG. 24. Context settings can relate to a users presence, calendar, activity, time of day, day of week or other setting such as a holiday. Presence settings can include any, office, home, and work, for example, whereas activity settings can include conversation, any, computer use/busy or other setting. The calendar information along with providing date selections can also include such settings as critical meeting, events, giving a presentation and so forth, whereas time of day can include specific settings (specified during selected timeframes) and general settings such as after hours. An adjustment slider 1910 can also be provided to facilitate configuration (e.g., adjust context selections up or down) of one or more of the context settings. FIGS. 25 and 26 illustrate an interface 2000 and 2100 having different calendar settings, whereas FIGS. 27, 28, and 29 illustrate interfaces 2200-2400 having different presence selections of home, office, and any, respectively. As can be appreciated, a plurality of such selections can be provided defining one or more other various contexts.

Figure 30:
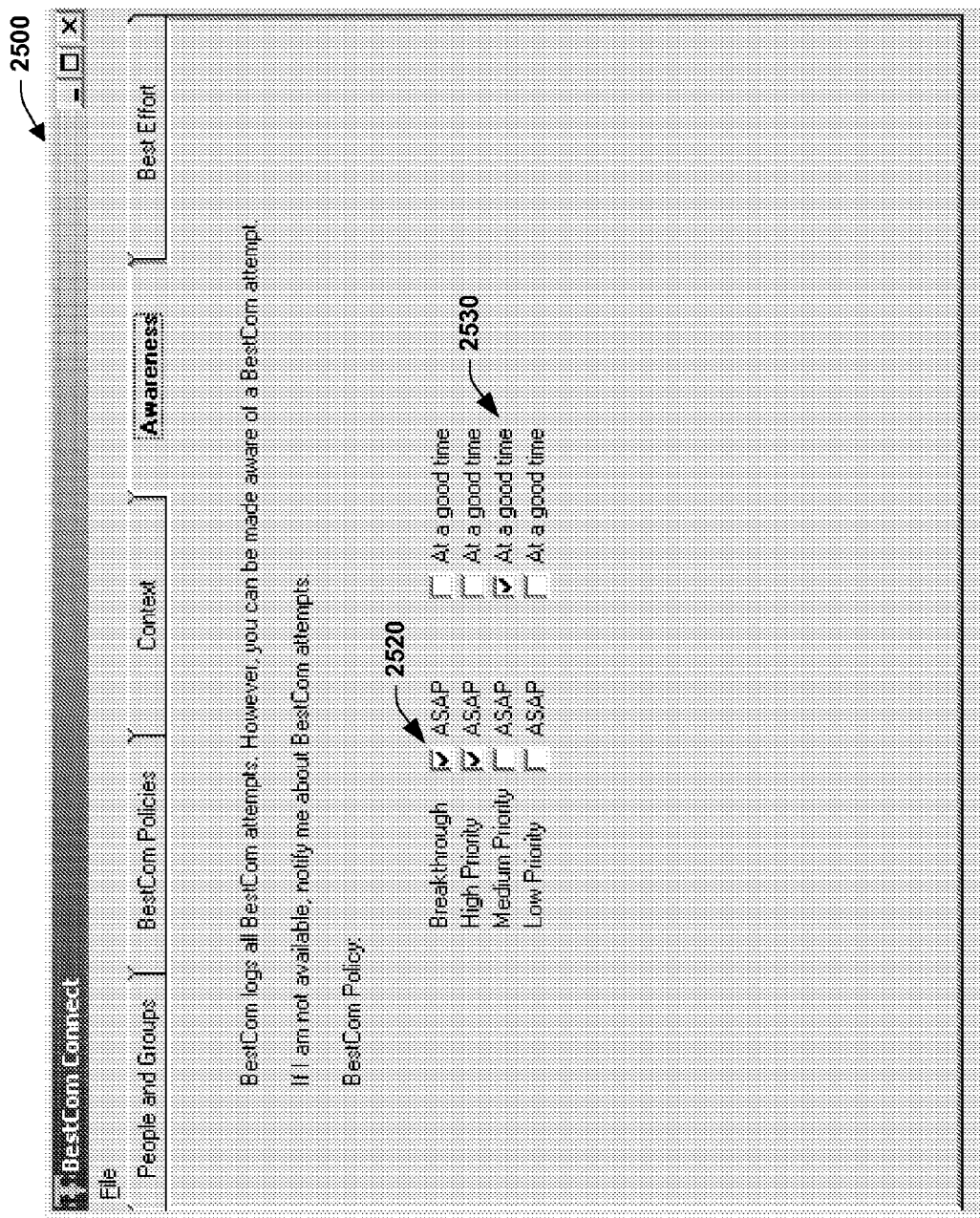
FIG. 30 is a diagram illustrating a graphical user interface to configure awareness attempts in accordance with an aspect of the present invention.
Figure 31:
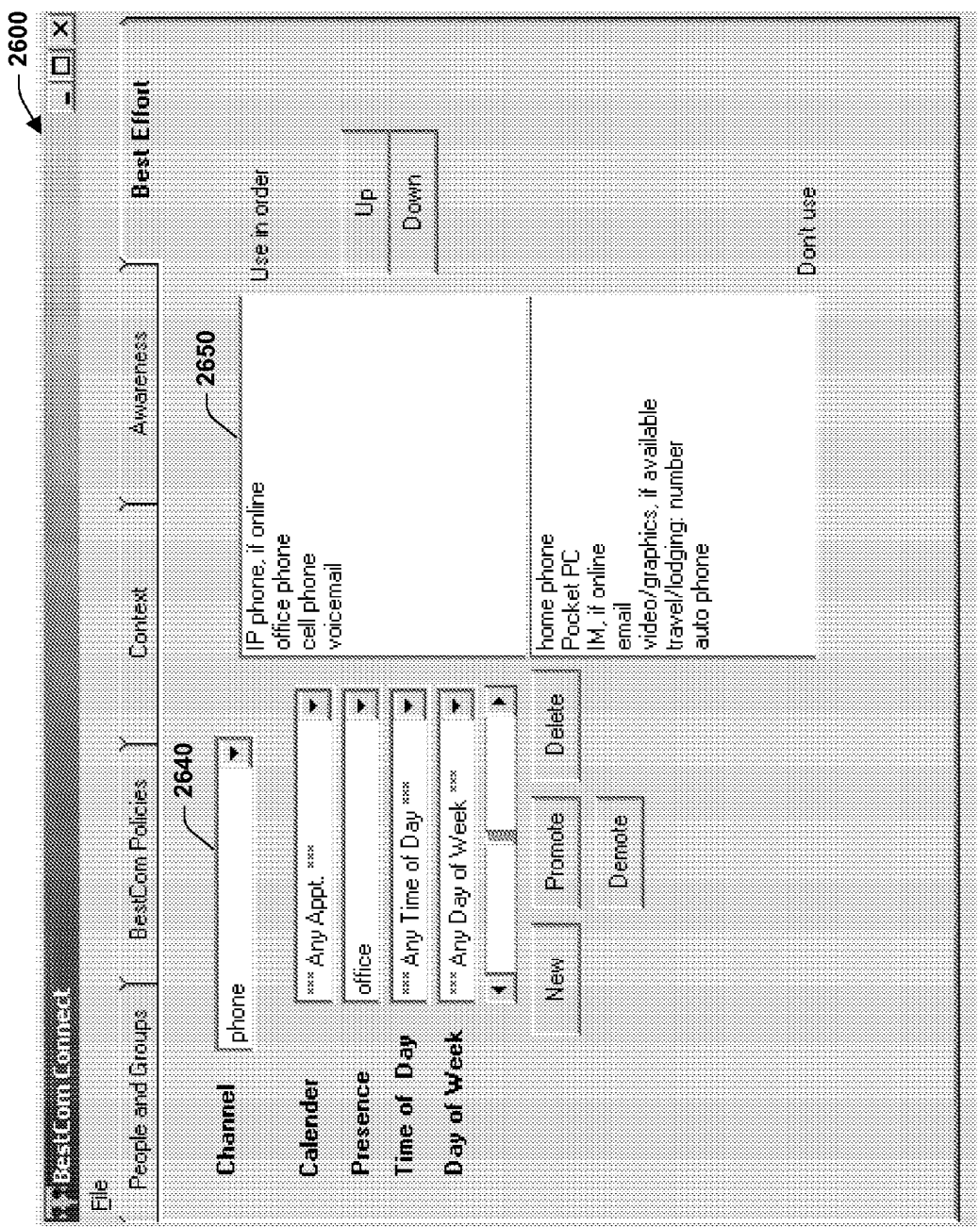
FIGS. 31-34 are diagrams illustrating a graphical user interface to define routing sequences in accordance with an aspect of the present invention.
Figure 32:
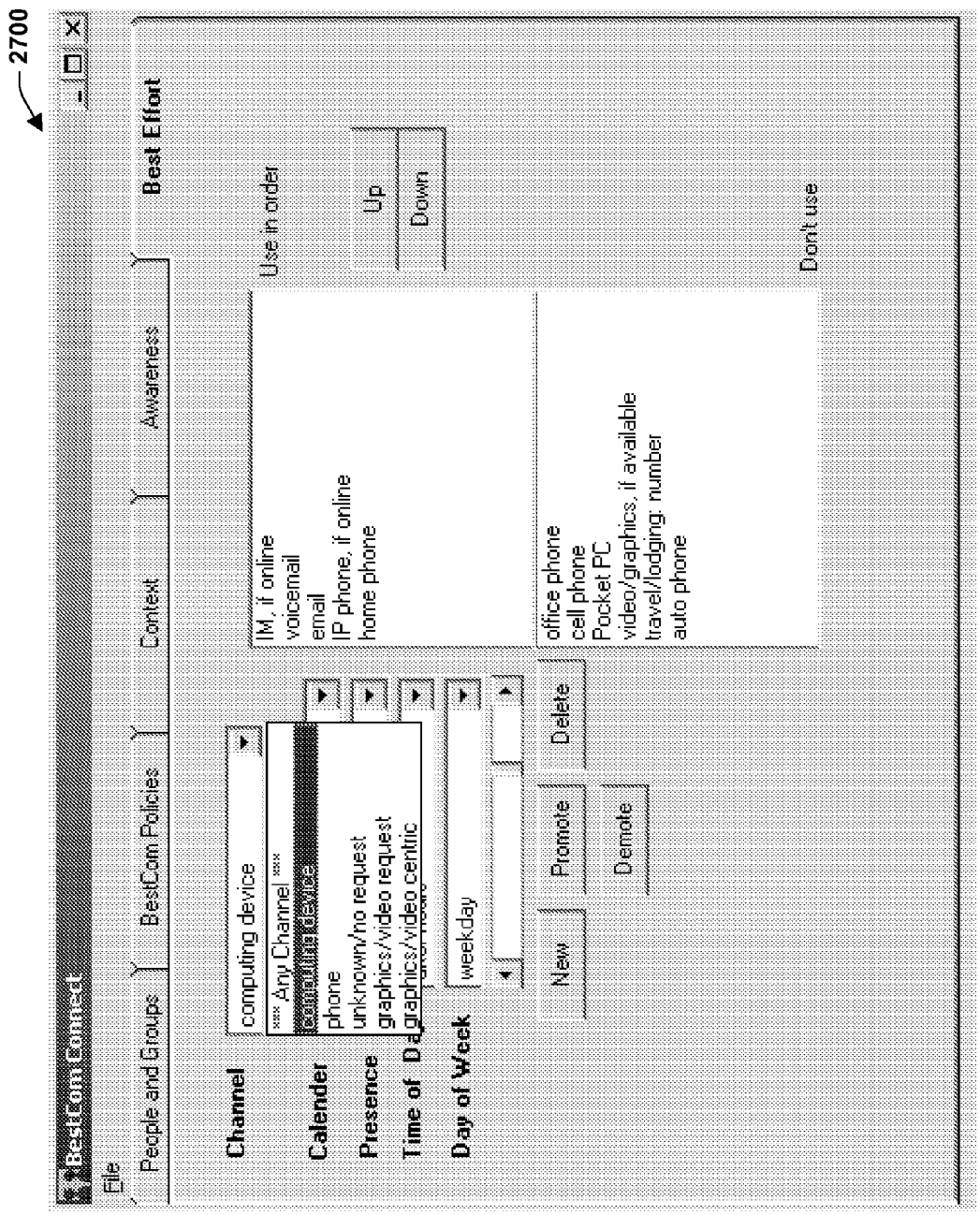
Figure 33:
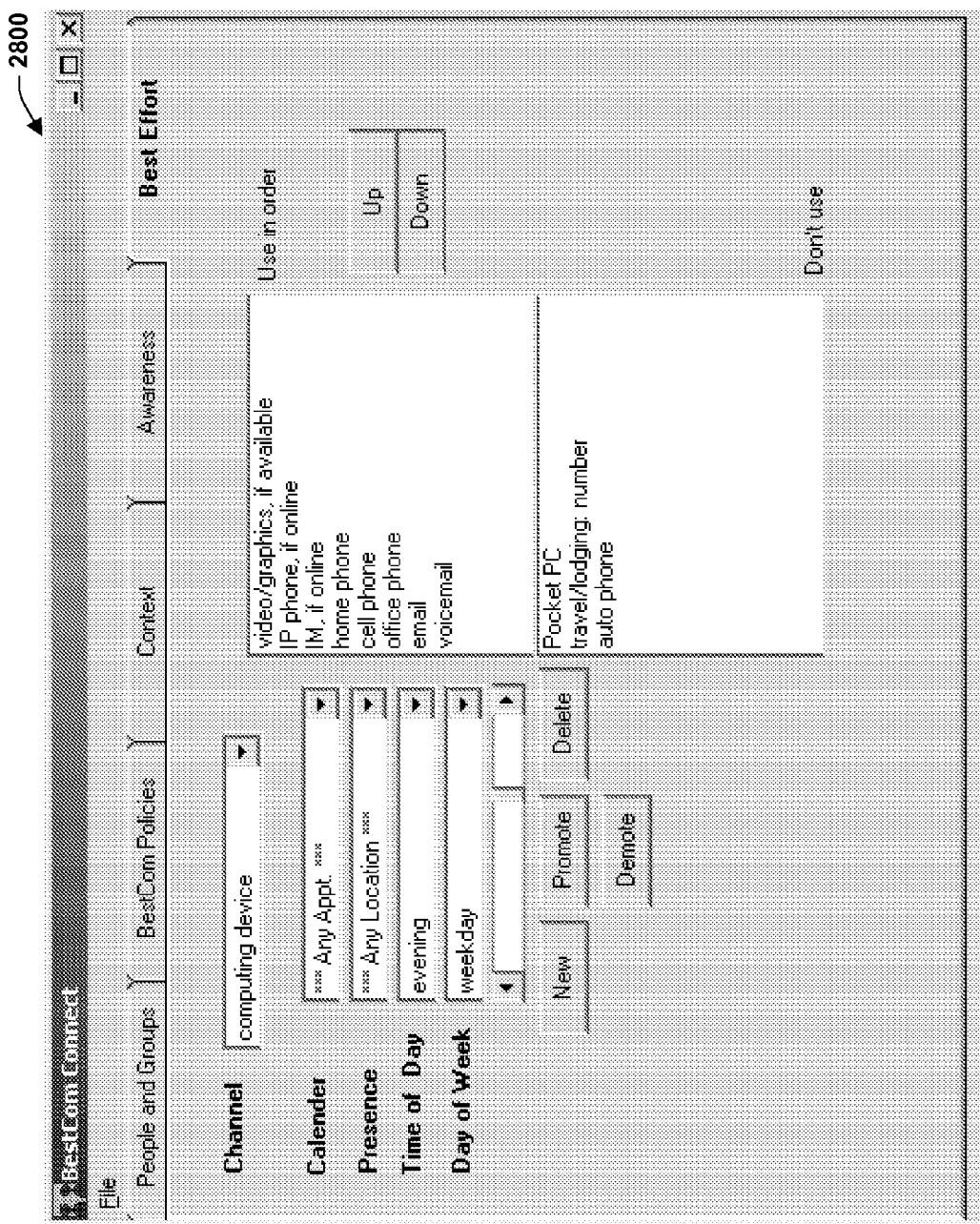
Figure 34:
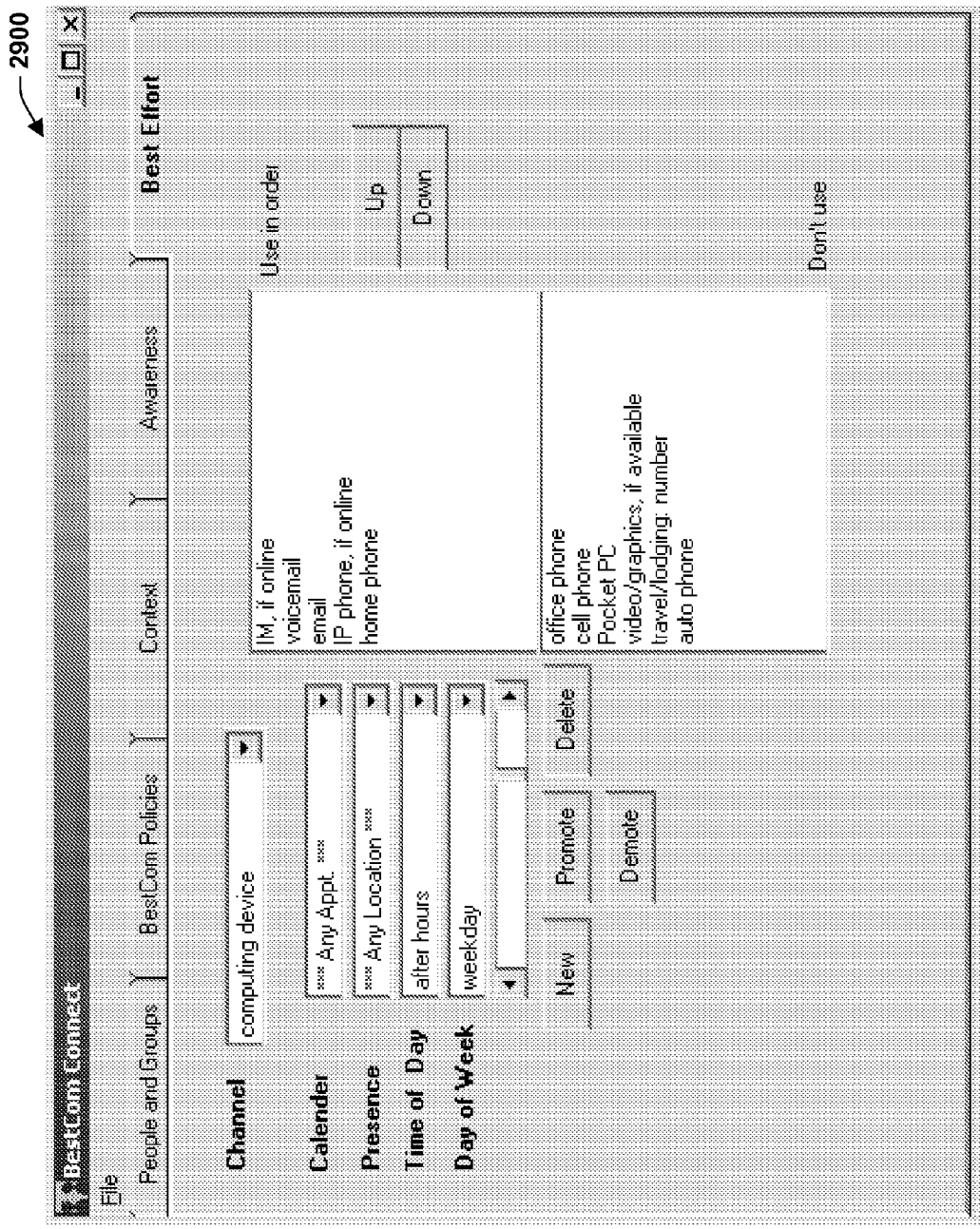

FIG. 30 is a diagram 2500 illustrating a graphical user interface to configure awareness attempts in accordance with an aspect of the present invention. These adjustments include selecting options for notifying users regarding communications attempts from other parties. For example, a default can be to log all communications attempts in an electronic journal. Another option is to notify users given selected policy considerations regarding any communications attempt associated with the selected policy. For example, selection options are illustrated at 2520, wherein exemplary selections for breakthrough and high priority policies are selected. When selected, people and groups attached to the breakthrough and high priority communications policies cause a notification of their communications attempts to the user of the interface. Another option is to defer a notification from people or groups until a more suitable time (e.g., defined by context states described above) and as illustrated at 2530 for medium priority policies.

FIGS. 31-34 are diagrams illustrating a graphical user interface to define routing sequences for a selected communications channel in accordance with an aspect of the present invention. The sequences can be employed with a best effort policy to communicate with the contactee. For example, a communications channel can be selected at 2640 (e.g., phone, computer) in FIG. 31. Context settings such as calendar, presence, time of day, and day of the week can be configured that are associated with the selected channel. A best effort communication options are then configured at 2650. In other words, if a best effort policy is in effect such as, a high priority setting configured to employ best effort communications, then the list of options for communicating with the user are those at 2650. As illustrated, some of the best effort communications options include a phone, office phone, cell phone, and voice mail. Other non-selected options include a home phone, pocket PC, e-mail, video graphics if available, travel/lodging number, and an automobile phone. Thus, if any of the available communications options are selected under a best effort policy, the user can be contacted in descending order from top to bottom, if desired, (other sequences can be employed) on the list of options selected at 2650 when a best effort communications policy is in effect (determined by people or groups attached to a best effort policy setting and the associated contexts specified by the user).

Figure 35:
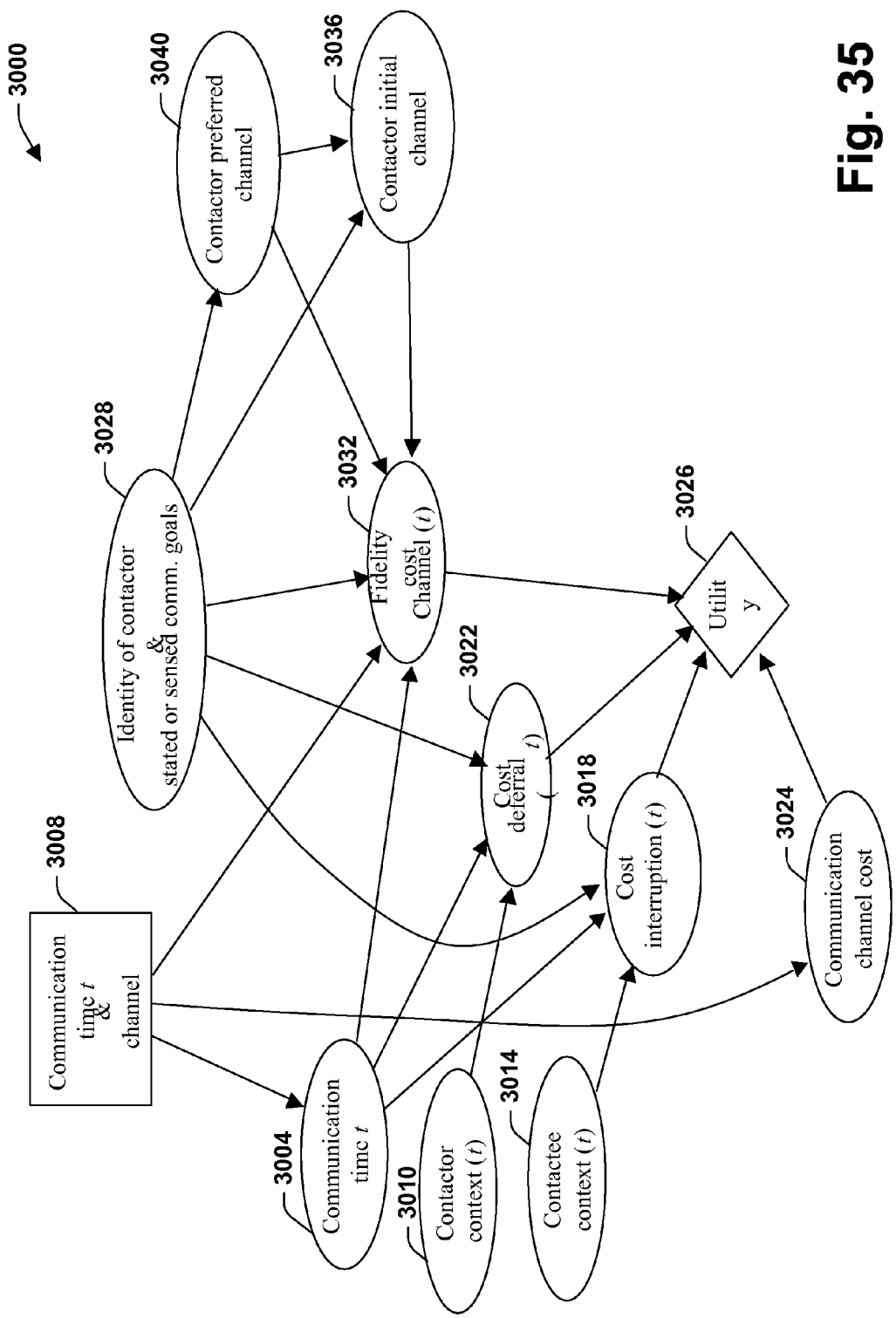
FIG. 35 displays an influence diagram capturing one formulation of a cost—benefit analysis approach to controlling the timing and modality of communications.

FIG. 35 represents an influence diagram 3000 capturing in more general form the decision problem associated with the present invention. Influence diagrams are well known in the decision science community as providing a representation, in a graphical manner, of a decision model, capturing key variables, actions, and preferences, under uncertainty. The influence-diagram model includes key random variables (oval nodes), actions (square node), and the overall value of the outcome of actions (diamond-shaped node). Influence diagram processing algorithms can be employed to identify the action with the highest expected utility, given the uncertainties and certainties about the variables. However, the decision models more generally represent a maximum utility decision problem, and can be solved in a variety of ways, beyond the use of special influence diagram processing algorithms.

FIG. 35 depicts a basic decision model 3000 for making expected value decisions about communications, considering the time of the communication at 3004 and 3008, the context of the contactor and contactee at different times at 3010 and 3014. The context of the contactor and contactee influences the cost of interruption at 3018 and the costs of deferral at different future times at 3022, which in turn, together with the cost of the use of the communication channel at 3024, include the utility of different communication channels at 3026 and time for the communications. The cost of deferral 3022 is influenced by the identity of the contactor and the stated or sensed communication goals at 3028. The identity and goals also influences the cost associated with the fidelity of the communication channel at 3032. The model 3000 also considers the influence of the contactors initial channel of contact at 3036 and the contactor's preferred channel at 3040.

Figure 36:
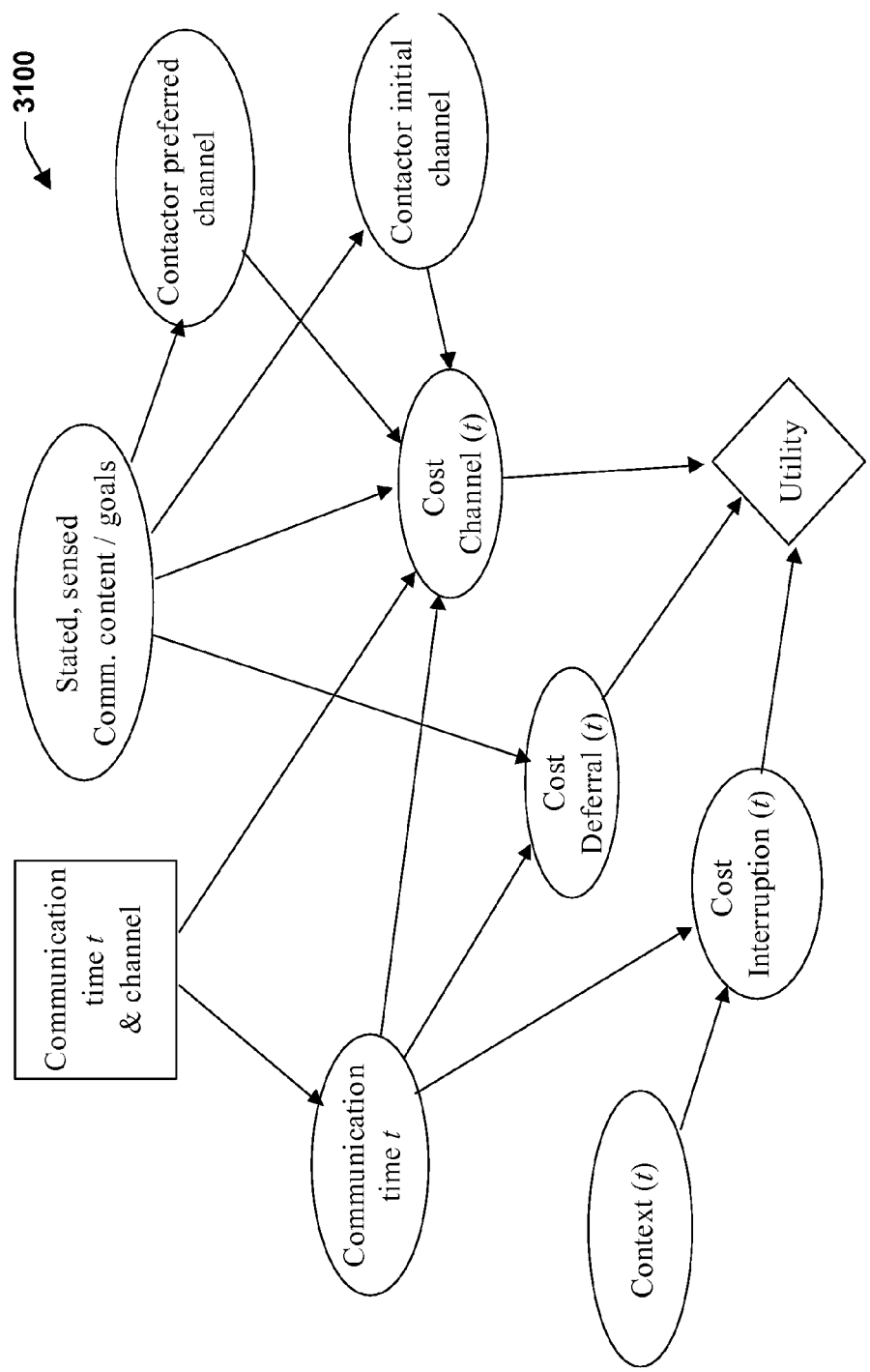
FIG. 36 illustrates an alternative model for controlling timing and modality of communication.

User interfaces as described herein are provided to users, making available parameters to set or modify the preferences in terms of the costs and values represented in the utility variable 3026. User interfaces can also provide for the specification of the allowable actions captured in the decision node, as well as for setting key uncertainties, such as prior probabilities and conditional probabilities or their approximations. FIG. 36 is an influence diagram 3100 to facilitate communications in accordance with an alternative aspect of the present invention.

Figure 37:
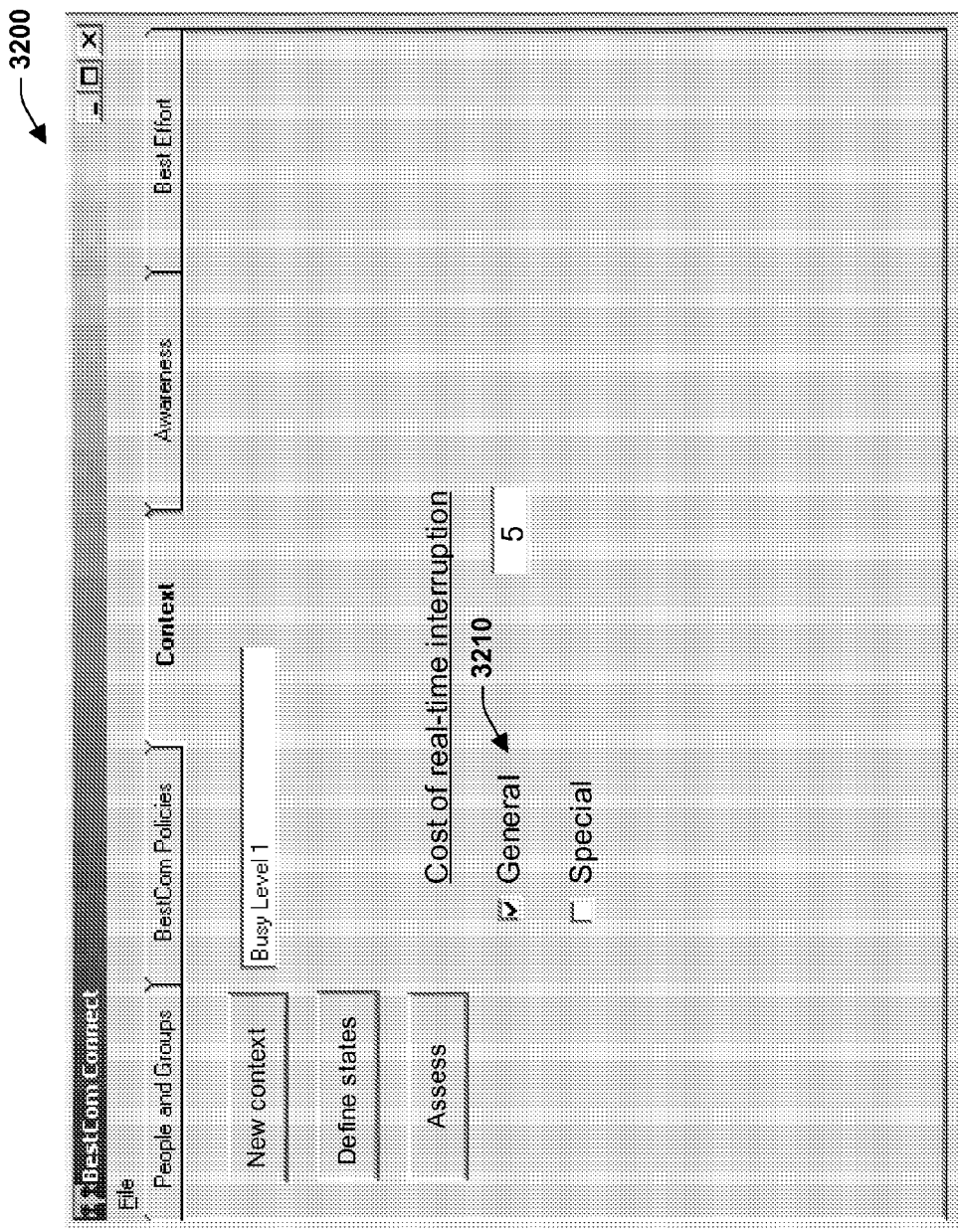
FIGS. 37-39 are diagrams illustrating a graphical user interface allowing users to assess and encode the costs of interruption associated with an incoming communication based on the contactee's context in accordance with an aspect of the present invention.
Figure 38:
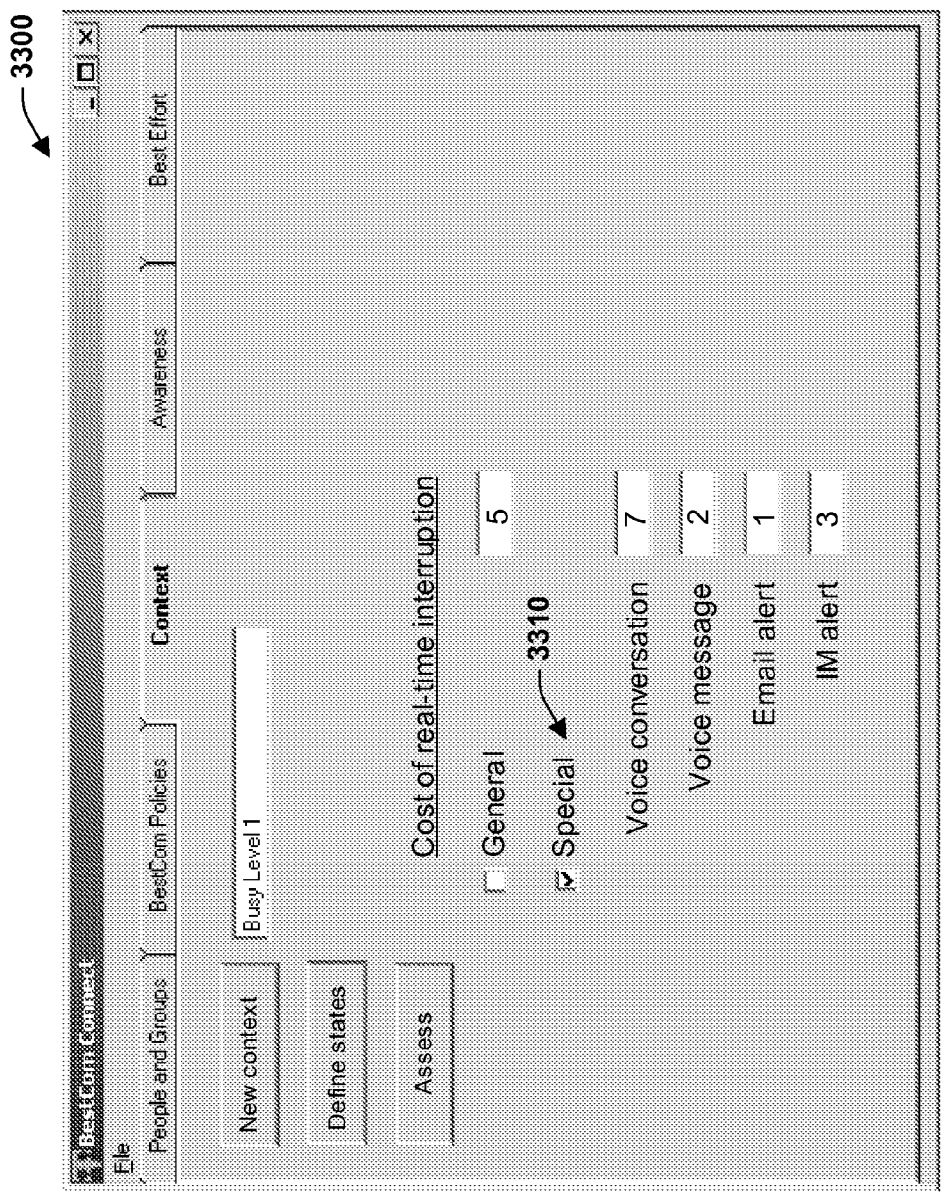
Figure 39:
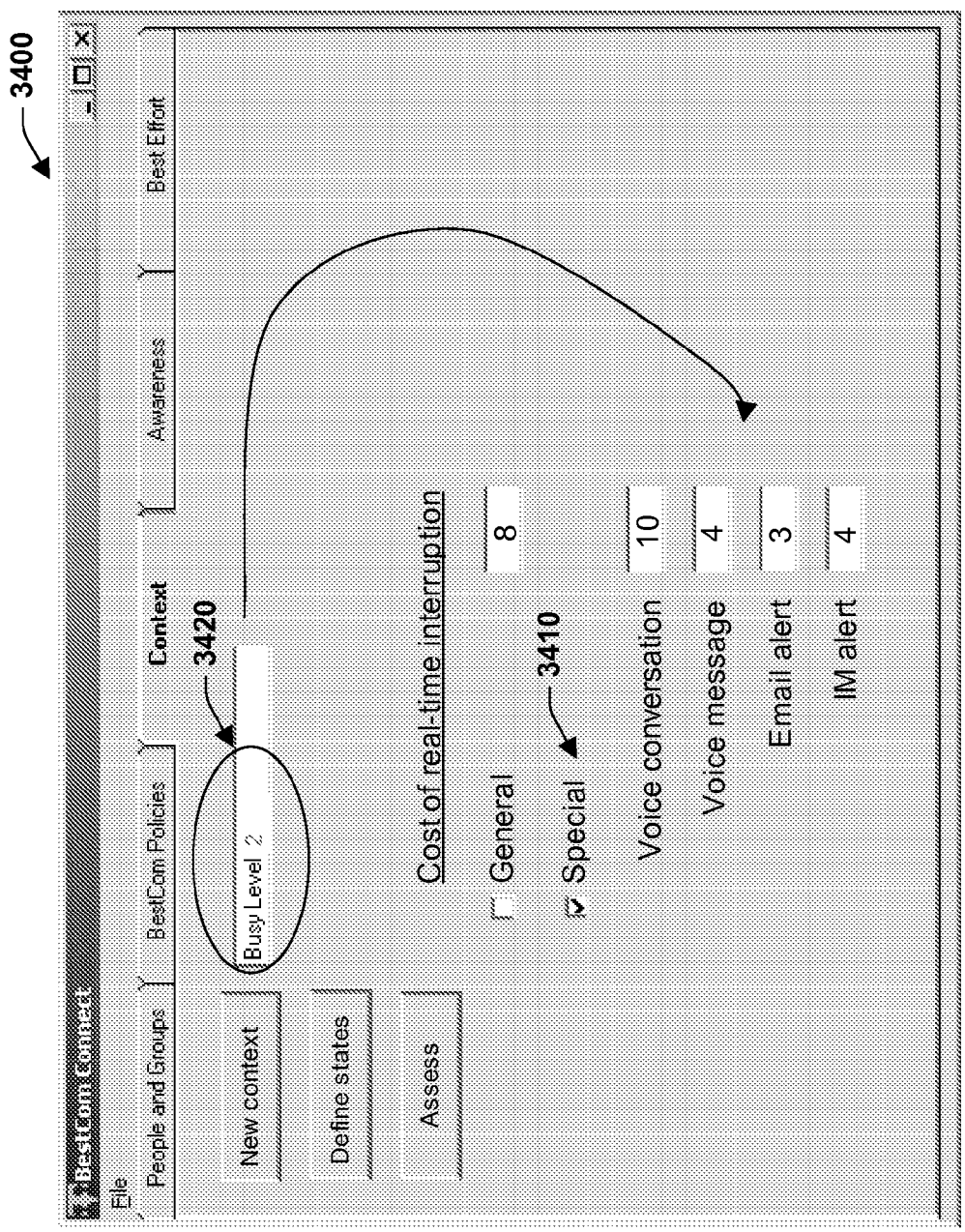

FIGS. 37-39 are diagrams illustrating a graphical user interface 3200-3400 allowing users to assess and encode the costs of interruption associated with an incoming communication based on the contactee's context in accordance with an aspect of the present invention. FIG. 37 is a diagram 3200 illustrating encoding interruption costs via a general selection 3210. FIG. 38 is a diagram 3300 illustrating encoding interruption costs via a special selection 3310, wherein costs can be assigned to communications modalities such as a voice conversation, a voice message, an e-mail alert, and an instant messenger alert, for example. FIG. 39 is a diagram 3400 illustrating encoding interruption costs via a special selection 3410 for an alternative state at 3420 (e.g., Busy Level 2).

Figure 40:
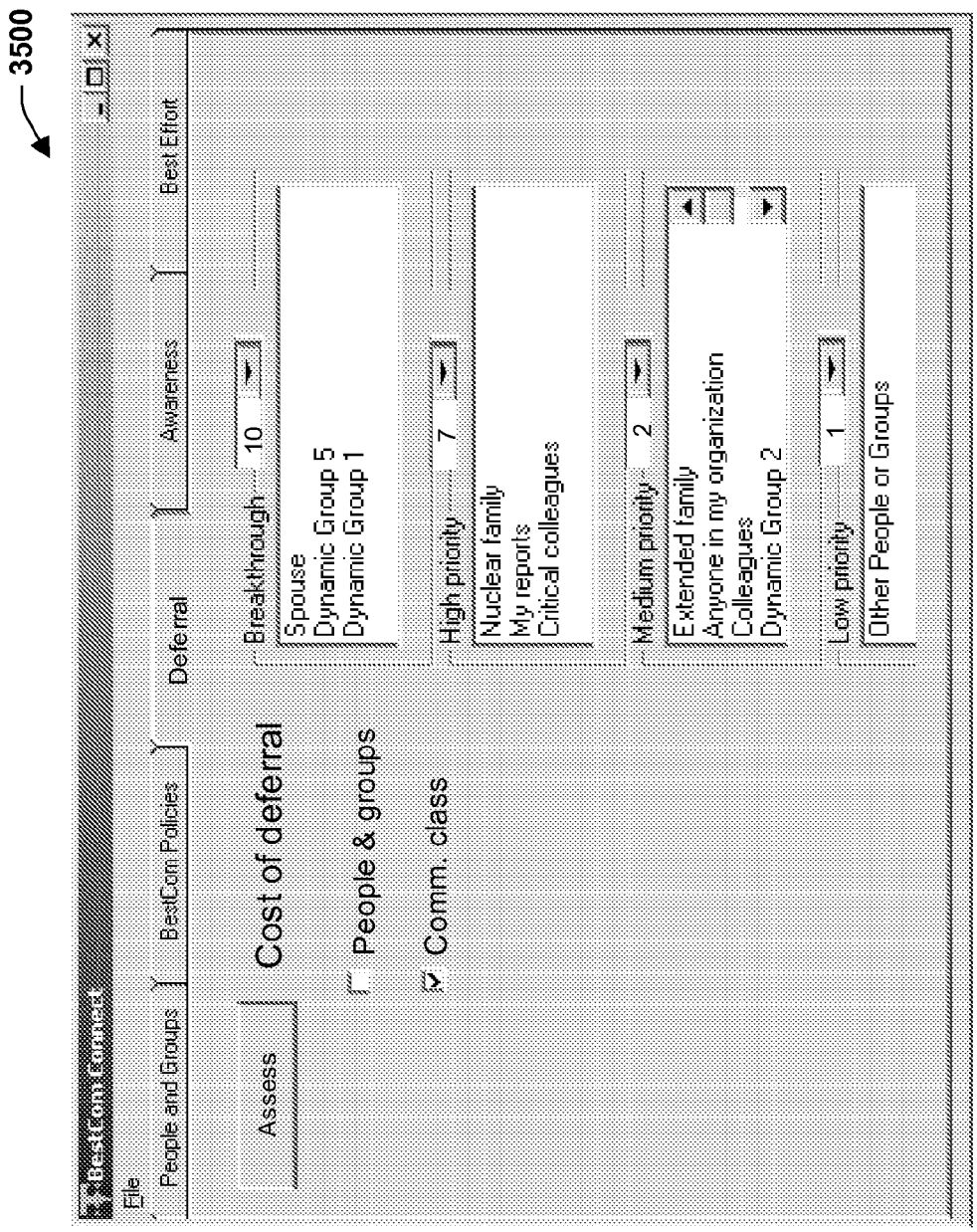
FIGS. 40-41 are diagrams illustrating a graphical user interface to assign the cost of deferring an incoming call based on classes, people or groups in accordance with an aspect of the present invention.
Figure 41:
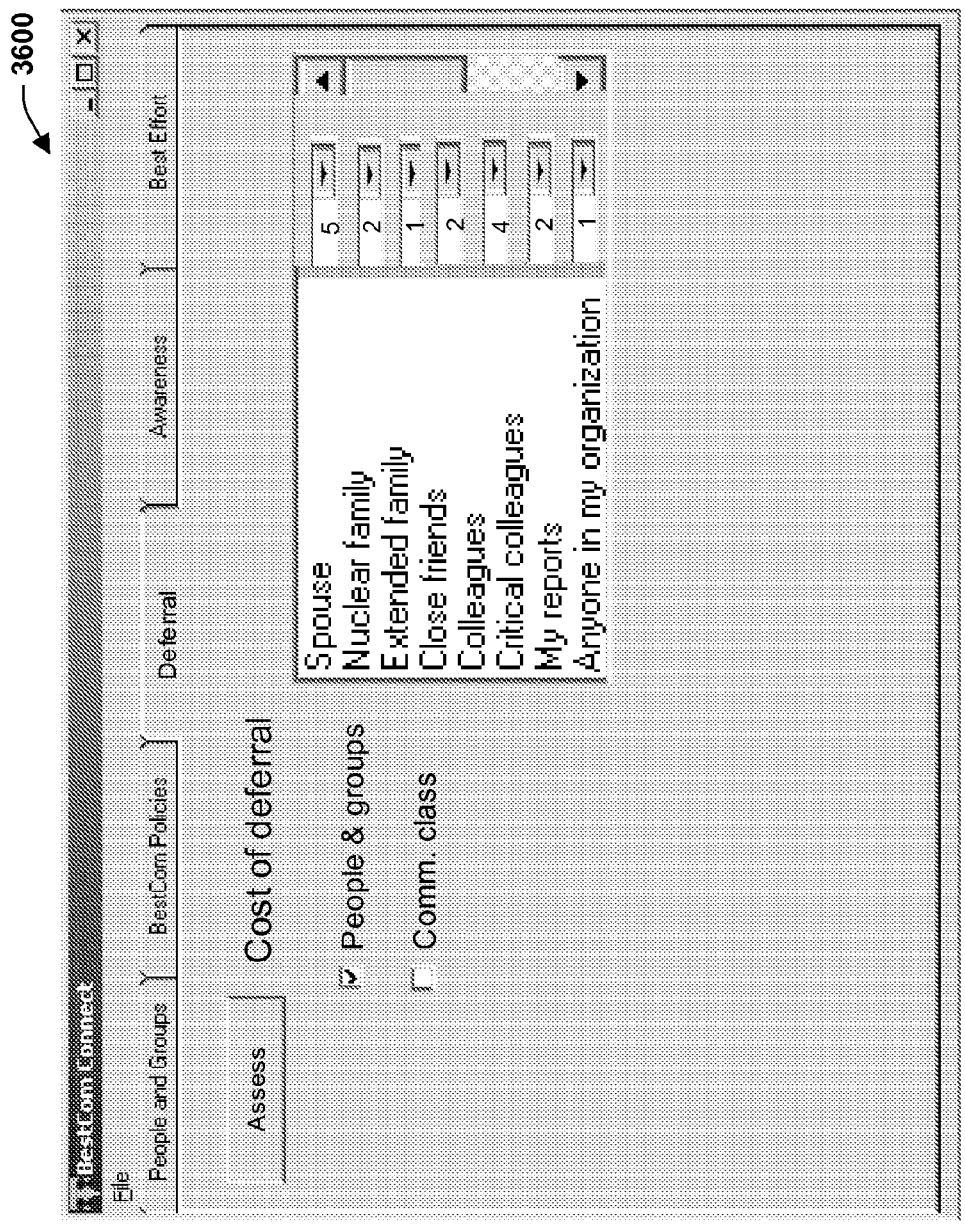

FIGS. 40-41 are diagrams 3500 and 3600 illustrating a graphical user interface to assign the cost of deferring an incoming call based on people or groups in accordance with an aspect of the present invention. The user interface 3500 illustrates assigning a cost of deferral to a communication class (e.g., Breakthrough 10, High Priority 7, Medium priority 2, and Low Priority 1). The user interface 3600 illustrates assigning a cost of deferral to people and groups (e.g., Spouse 5, Nuclear Family 2, Extended Family 1).

Figure 42:
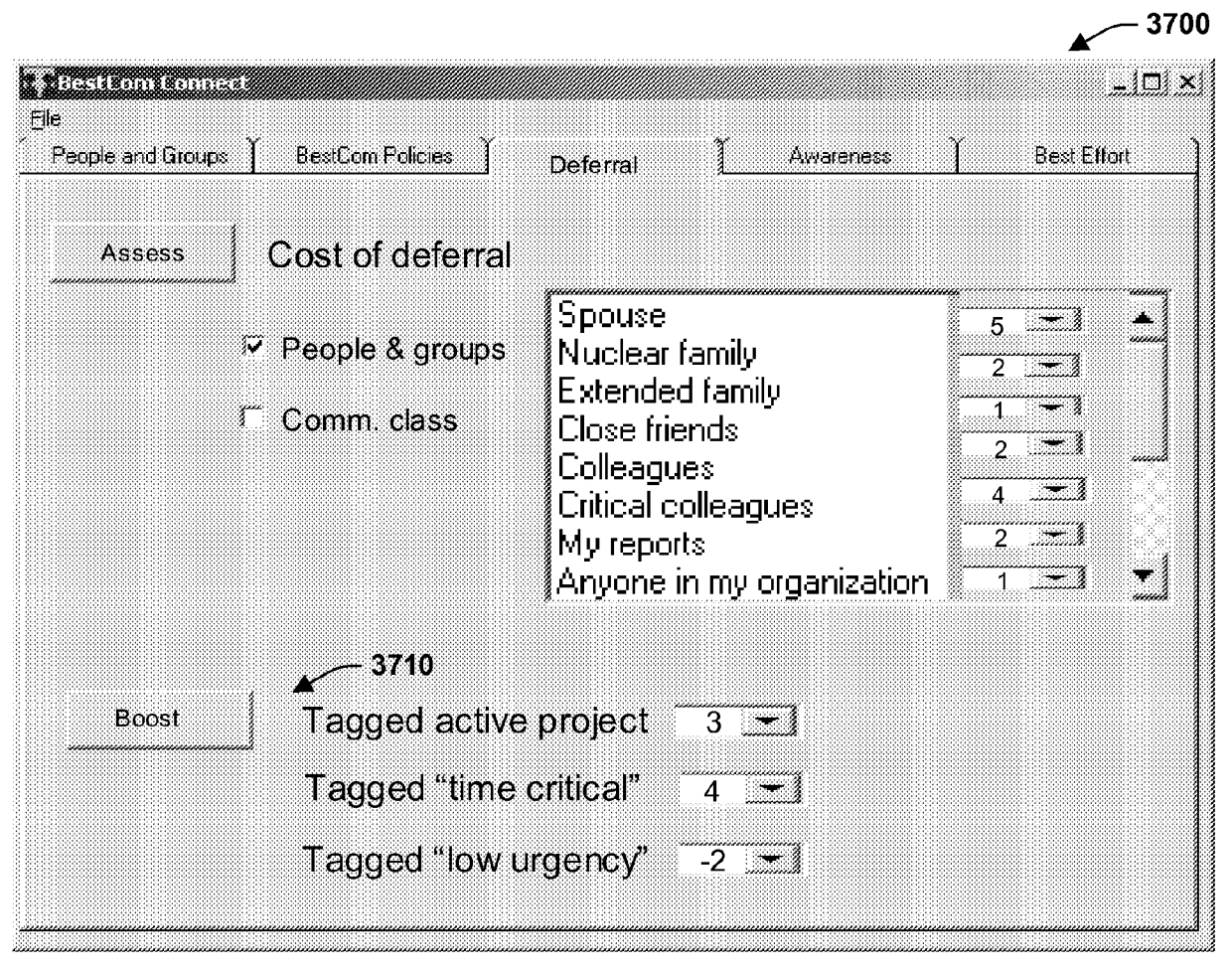

FIG. 42 is a diagram 3700 illustrating a graphical user interface demonstrating how additional cost can be added or subtracted for additional properties of people and/or communications. In this aspect of the present invention, a boost value 3710 may be added or subtracted from communications that are tagged according to various designations. For example, a communications that is tagged as an active project can be assigned a boost value of 3 (or other number), whereas a time critical communications can be assigned a value of 4 (or other number). A communications tagged as low urgency in this example can be assigned a negative number, if desired, which reduces the cost of deferring low urgency communications until a later time.

Figure 43:
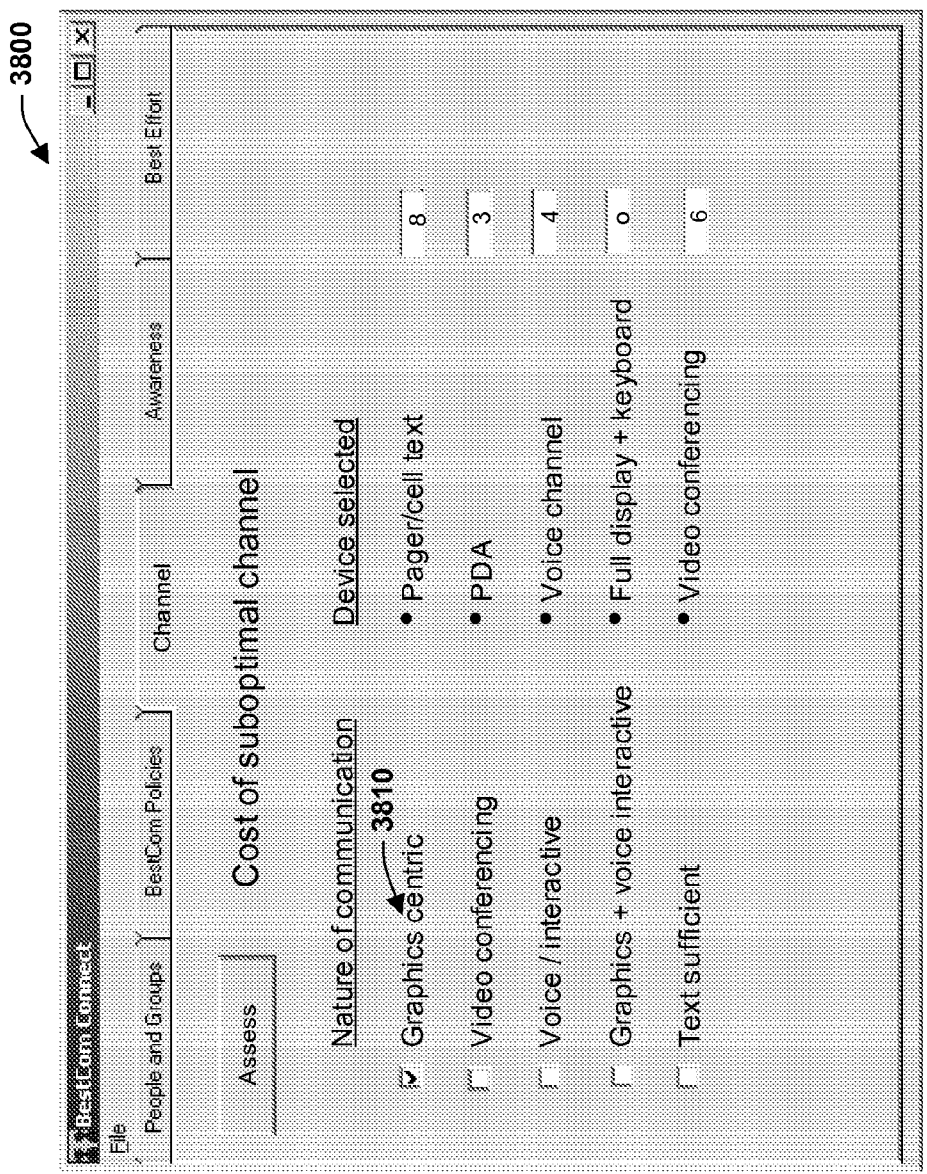
FIG. 43 and FIG. 44 are diagrams illustrating a graphical user interface to assess the cost associated with selecting a suboptimal modality or channel of communication given the fundamental properties of the core content of the communication.
Figure 44:
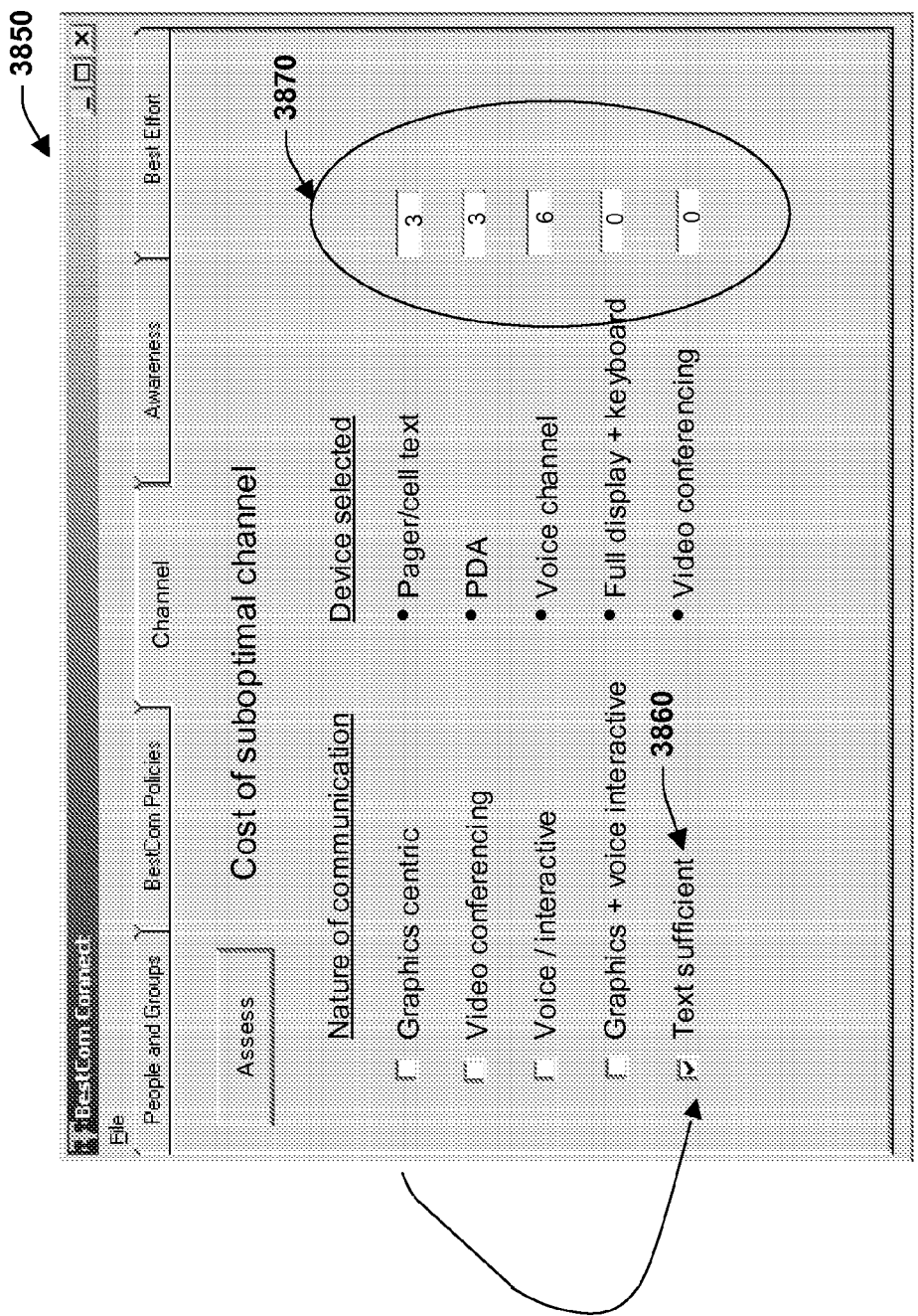

FIG. 43 and FIG. 44 are diagrams 3800 and 3850 illustrating a graphical user interface to assess the cost associated with selecting a suboptimal modality or channel of communication given the fundamental properties of the core content of the communication. For example, given the nature of a respective communication (e.g., graphics centric, video conferencing, voice/interactive, and so forth), varying costs can be assigned to various communications modalities in view of the nature of communications. In the interface 3800, a graphics centric selection is indicated at 3810, having varying costs associated with employment of devices such as a Pager/cell text, PDA, voice channel, full display and keyboard, and video conferencing. In this example, a full display is assigned the lowest cost given the graphics centric communications. In the interface 3850, a text sufficient selection is indicated at 3860, wherein differing values may be assigned at 3870. It is to be appreciated that other options may be provided for the nature of communications and/or devices selected, and that some modalities may be set to similar values in view of a differing communications nature, depending on desires of the user selecting such values and ever changing capabilities of communications devices.

Figure 45:
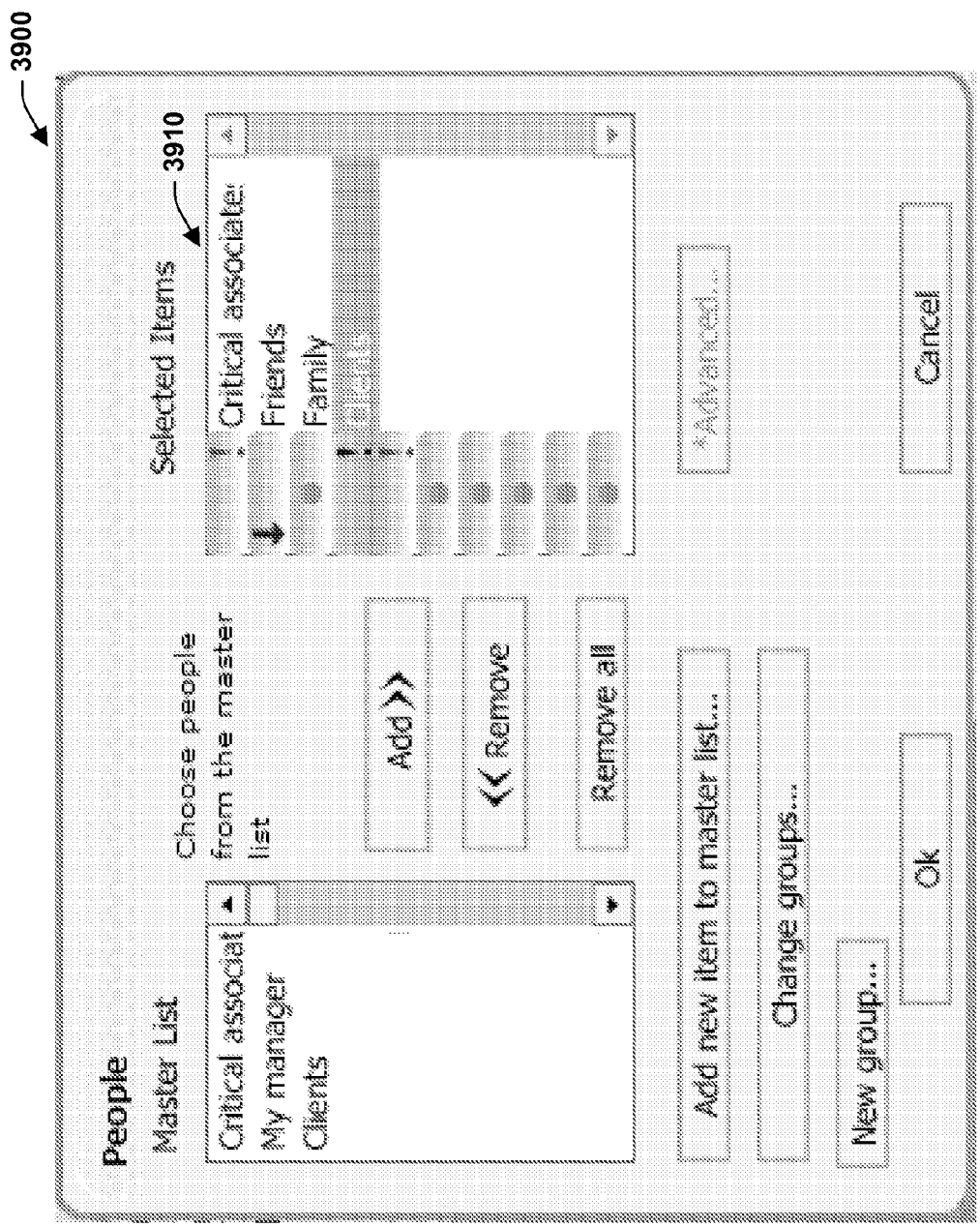
FIG. 45 is a diagram illustrating a graphical user interface depicting an alternate manner for assigning priority in accordance with the present invention.
Figure 46:
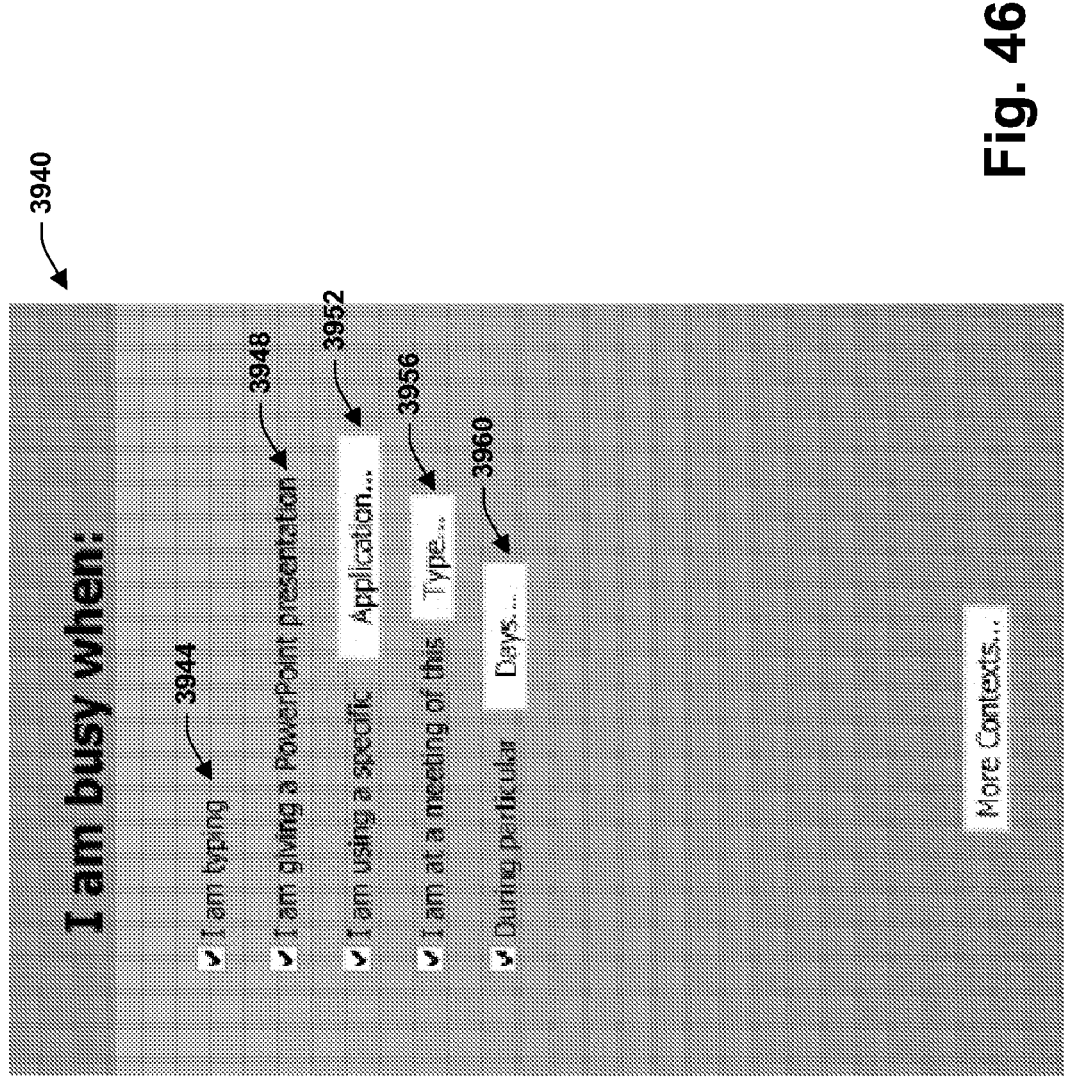
FIGS. 46-50 are diagrams illustrating a graphical user interface depicting alternative aspects of defining context in accordance with the present invention.
Figure 47:
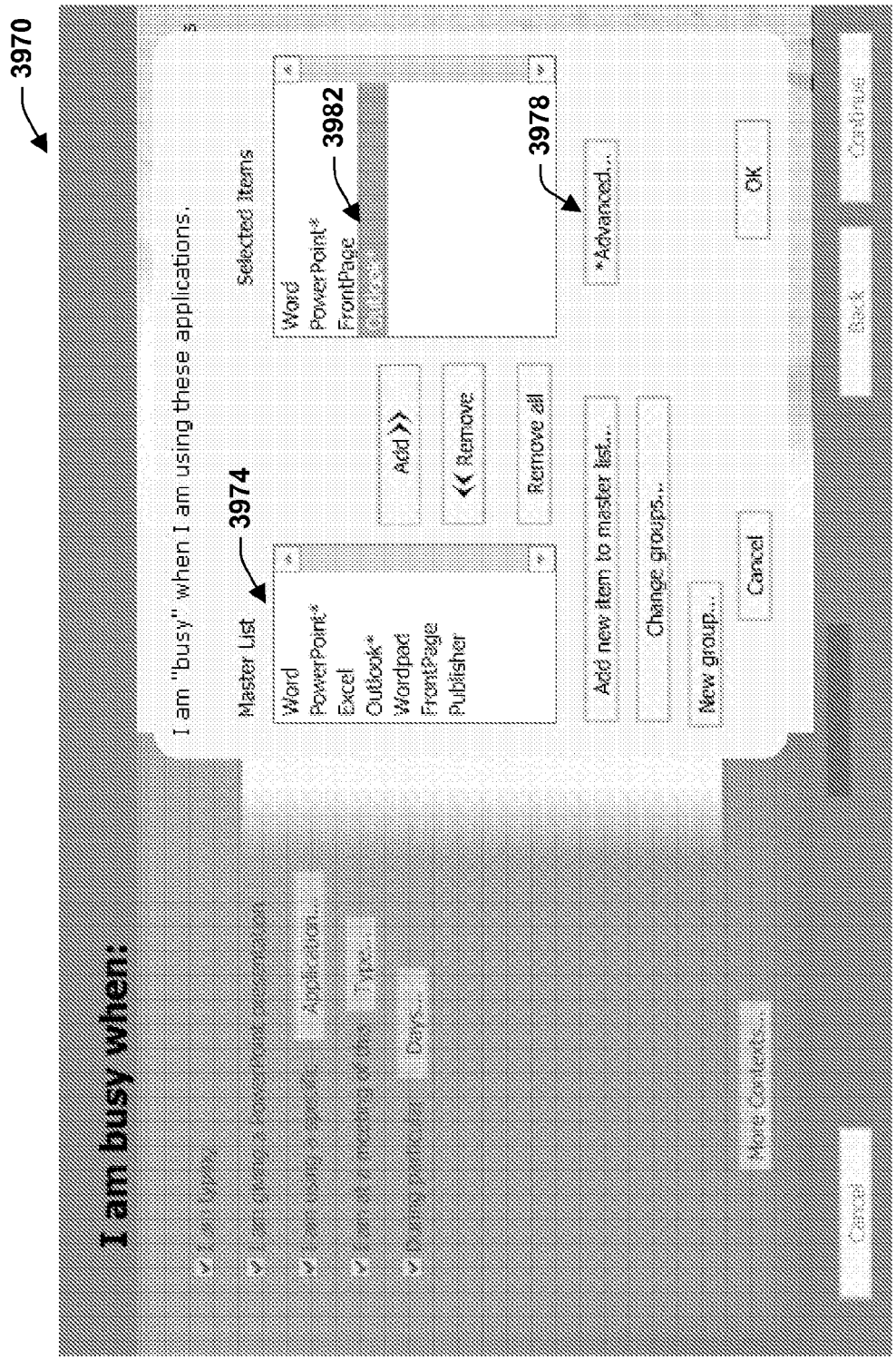
Figure 48:
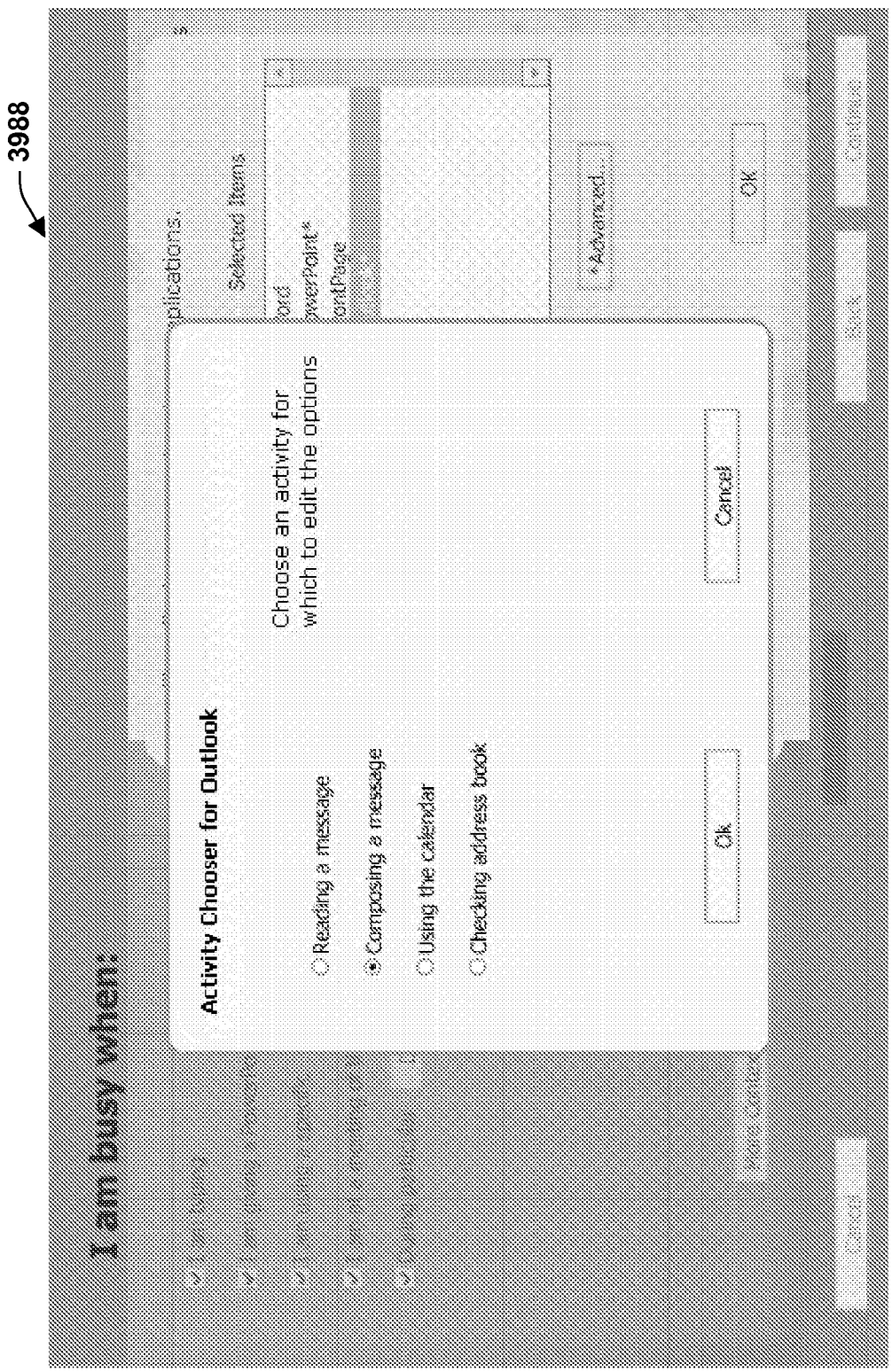

FIG. 45 is a diagram illustrating a graphical user interface 3900 depicting an alternative manner for assigning priority in accordance with the present invention. In this aspect of the present invention, rather than assign single people and groups to communication policies as in the connect examples above, selection options can be provided for assigning low, med, high priority as illustrated at 3910 (e.g., via symbols such as (!), arrows—up or down, dots, or other measures, such as assigning a scalar value of cost of deferred communications by time to groups or other categories. FIGS. 46-50 are diagrams illustrating a graphical user interface depicting alternative aspects of defining context in accordance with the present invention. In FIG. 46, a user interface 3940 includes providing one or more selection options for defining a state of busy, the selection options including at least one of a typing option at 3944, giving a presentation option at 3948, using an application option at 3952, in a meeting at 3956, and options for during a selected time period at 3960. It is to be appreciated that other options can be similarly provided. If selecting the application option 3952, a user interface 3970 such as depicted in FIG. 47 is displayed, wherein a state of busy can be defined in accordance with a type of application selected which can be provided on a master list 3974. Furthermore, an advanced button 3978 can be provided to further refine busyness states within a selected application. For example, if a calendar application is selected at 3982, an interface 3988 such as depicted in FIG. 48 is provided, wherein other busy states include at least one of reading a message, composing a message, using a calendar, and perusing an address book, for example.

Figure 49:
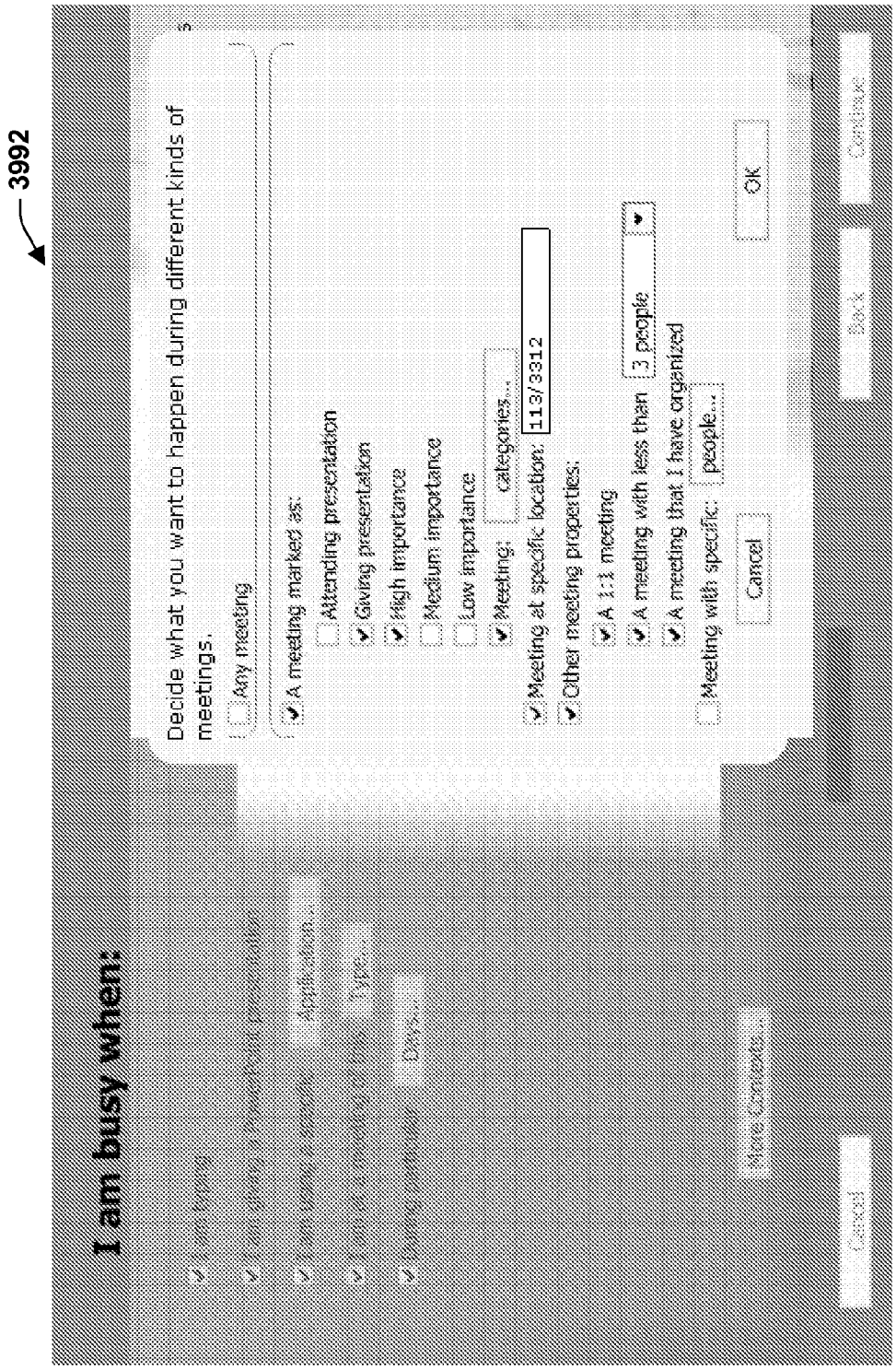
Figure 50:
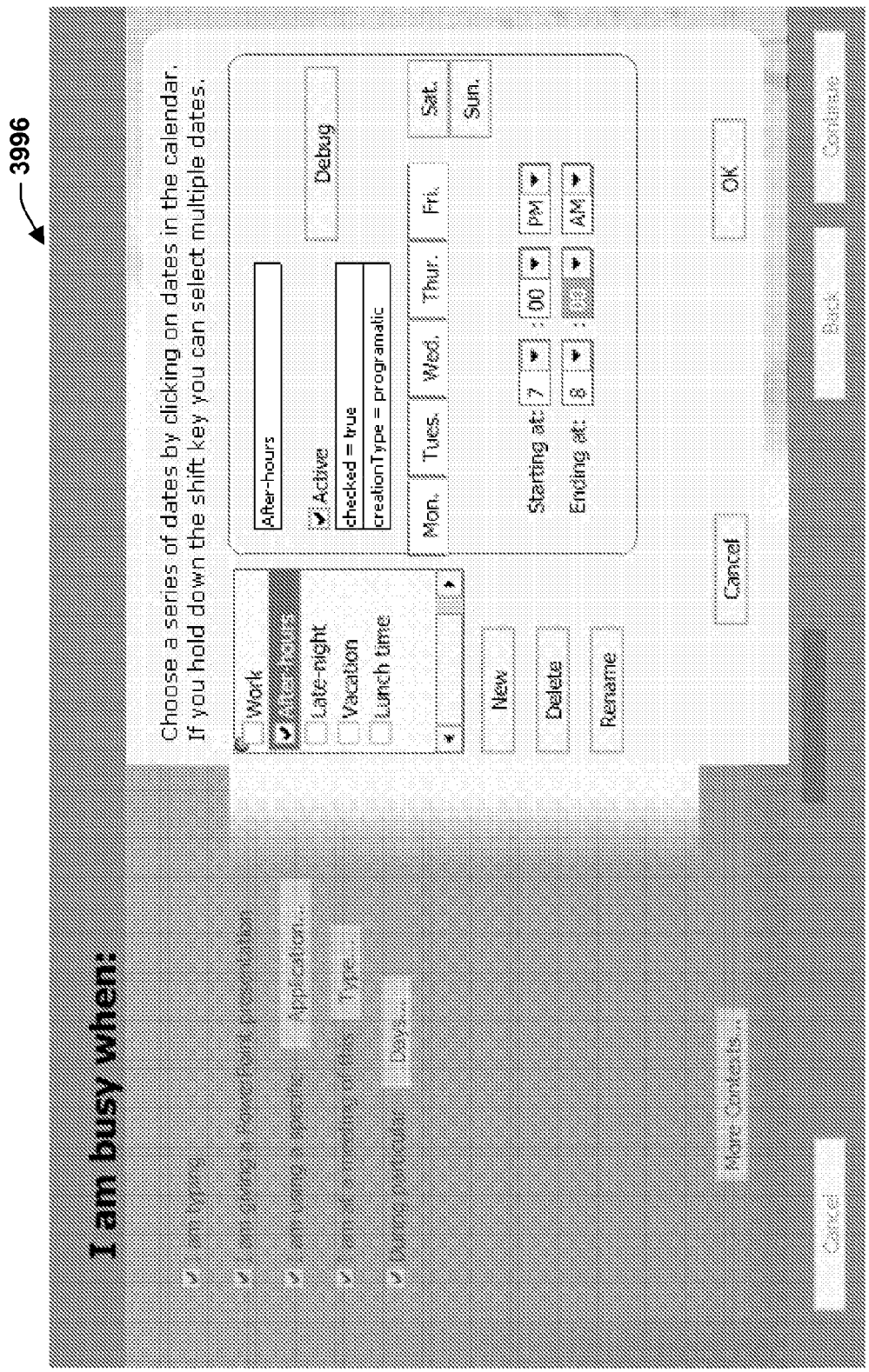

If the meeting selection option 3956 is selected from FIG. 46, then an interface 3992 is provided as illustrated in FIG. 49. The interface 3992 includes such options as presentation settings, importance settings, category settings, location settings, meeting properties settings, a meeting with specific setting, and global settings such as any meeting. If the during particular selection option 3960 is selected from FIG. 46, then an interface 3996 is provided as illustrated in FIG. 50. The interface 3996 can include such context settings as a work setting, an after hours setting, a late-night setting, a vacation setting, a lunch setting, an active setting, a calendar setting and a time setting, for example.

Figure 51:
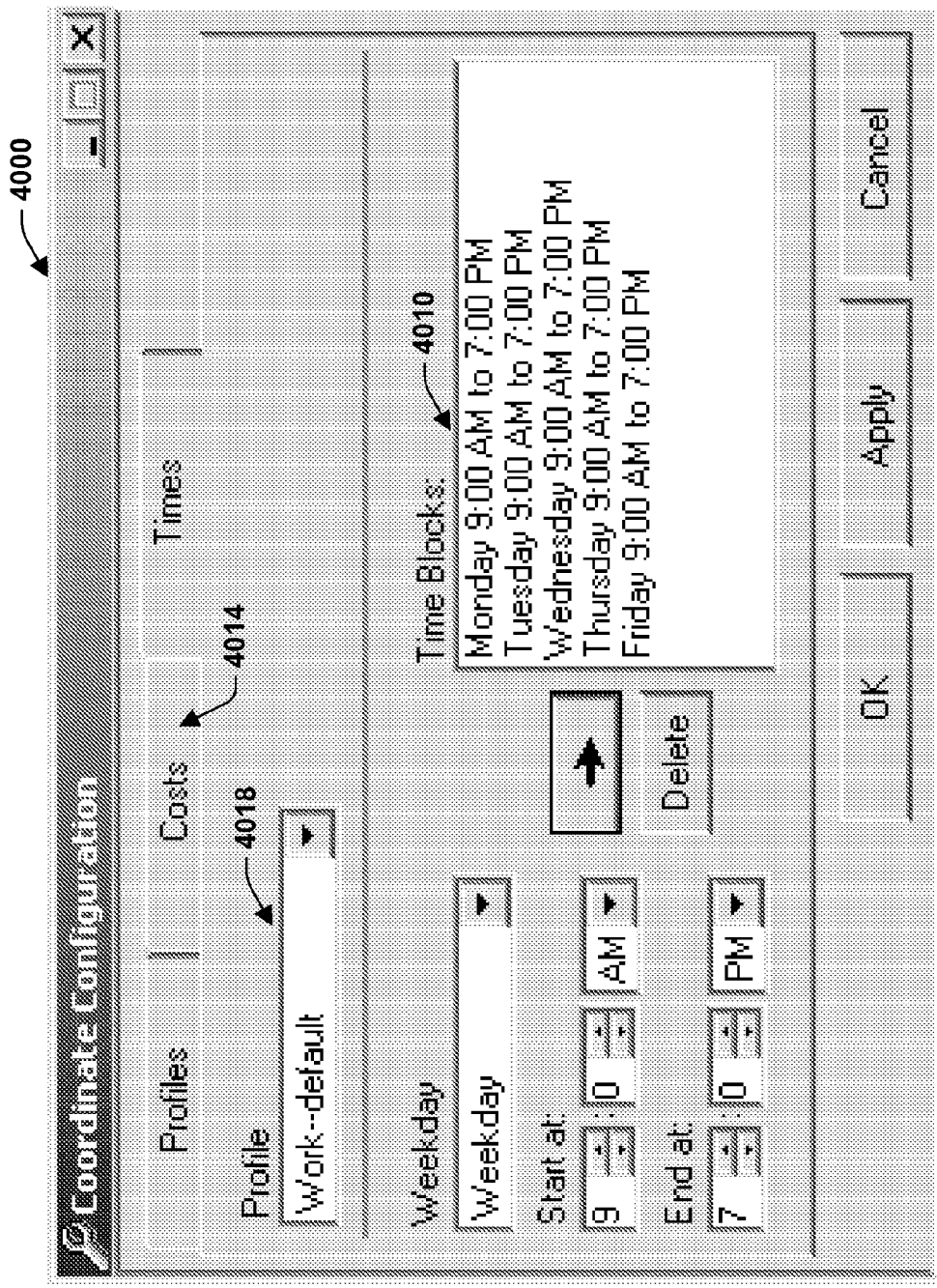
FIG. 51 is a diagram illustrating a graphical user interface for defining profiles during various time segments in accordance with the present invention.

FIG. 51 is a diagram illustrating a graphical user interface 4000 for defining profiles during various time segments in accordance with the present invention. The interface 4000 includes such aspects a segmenting periods of time at 4010, assigning similar or differing costs to the periods of time at 4014, and/or associating the time segments in accordance with one or more profiles selected at 4018 (e.g., home, work, default, and so forth). As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers.

It is to be appreciated that various aspects of the present invention may employ representations of deterministic policies specified as functions or rules that take as arguments contextual information, details about the nature of the participants, and the content or task at hand. The present invention may also employ technologies associated with facilitating inference and decision making under uncertainty and optimization of expected utility and/or minimization of expected costs. Thus, statistical inference may be performed with models constructed by hand, from data with machine learning methods, or by a mixture of machine learning and human assessment. Such models can be used in conjunction with deterministic policies where depending on the context, an inferential rule or deterministic rule is used. A variety of machine learning systems/methodologies (e.g., Bayesian learning methods that perform search over alternative dependency structures and apply a score (such as the Bayesian Information Criteria, etc.) methods, Bayesian classifiers and other statistical classifiers, including decision tree learning methods, support vector machines, linear and non-linear regression, and neural network representations, and so forth) may be employed to build and update inferential models.

Figure 52:
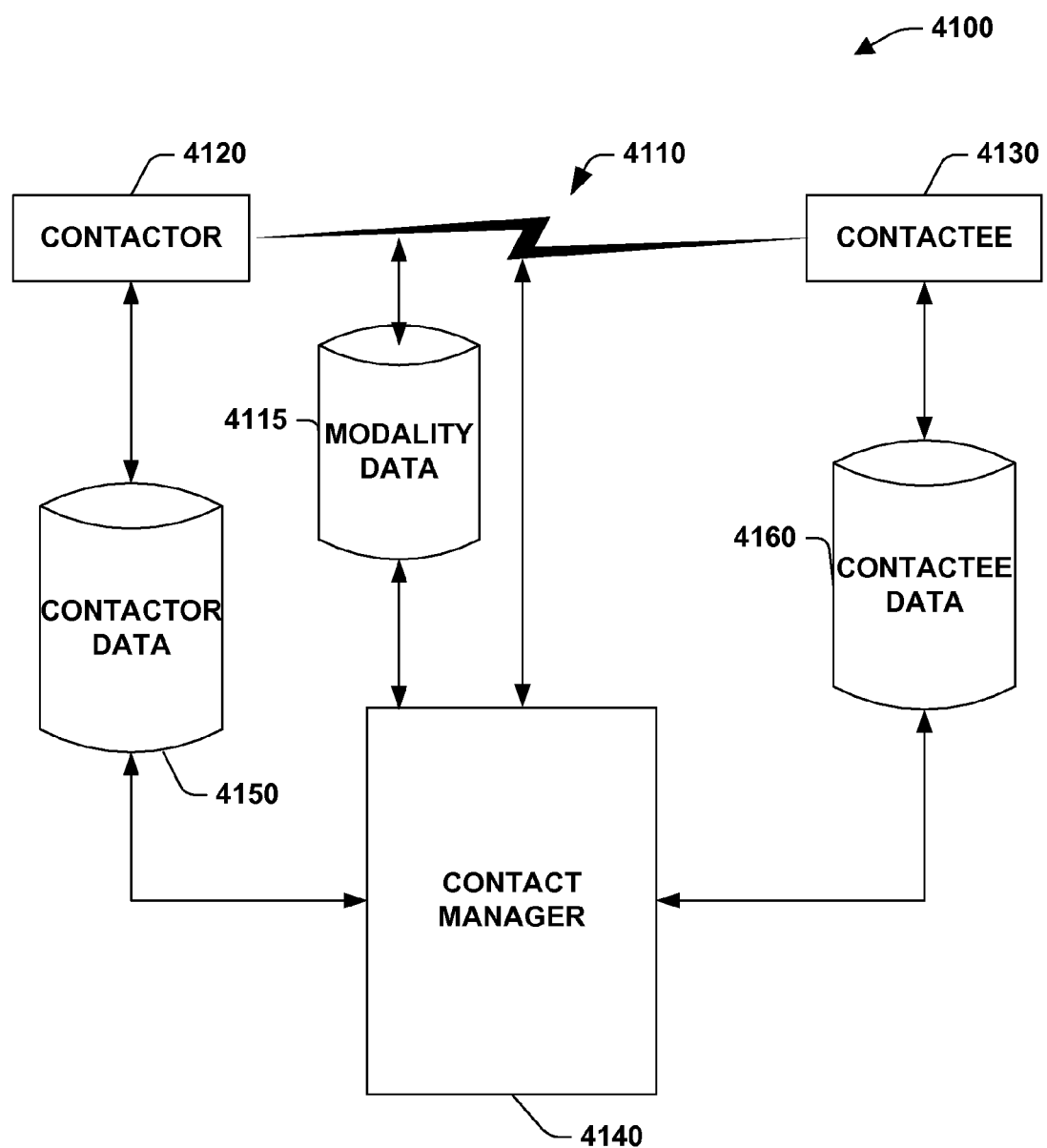
FIG. 52 is a schematic block diagram illustrating a system for identifying an optimal communication based on the preferences, capabilities, contexts and goals of the parties to engage in the communication, in accordance with an aspect of the present invention.

Referring now to FIG. 52, a system 4100 for identifying an optimal communication modality based on the preferences, context, capabilities and goals of the parties to engage in the communication is illustrated and can be employed with the user interface described above. The system 4100 facilitates establishing a communication 4110 between a contactor 4120 and a contactee 4130. While one contactor 4120 and one contactee 4130 are illustrated, it is to be appreciated that the system 4100 may be employed to identify optimal communication modalities between two or more communicating parties. It is to be further appreciated that a party to the communication 4110 may be a human or may be an electronic process.

The communication 4110 may be achieved through a variety of modalities including, but not limited to, telephone modalities, computer modalities, hardcopy fax modalities, paging modalities and personal modalities, for example. Data concerning the modalities may be stored in a communication modality data store 4115. The communication modality data store 4115 can hold information including, but not limited to, modalities available, cost for communication using that modality, likelihood modality will become available, modality capacity and modality reliability, for example. The system 4100 may consider modalities that are currently available to establish the communication 4110 and may also consider predictions concerning modalities that may become available to establish the communication 4110. For example, a computer may not be currently available, because it is turned off, but it may become available later, when the user of the computer arrives at work and turns it on. The telephone modalities can include, but are not limited to POTS telephony, cellular telephony, satellite telephony and Internet telephony. The computer modalities can include, but are not limited to email, collaborative editing, instant messaging, network meetings, calendaring and devices employed in home processing and/or networking.

The personal modalities can include, but are not limited to videoconferencing, messengering and face-to-face meeting. Data concerning a current modality (e.g., a phone that is busy) may be analyzed, as may data concerning the likelihood that the modality may become available (e.g., phone will no longer be busy). Identifying the optimal communication may, therefore, include considering the benefits of establishing the communication 4110 at a first point in time, with the communication modalities available at that point in time, and considering the costs of delaying establishing the communication 4110 to a second point in time when other communication modalities may be available.

A contact manager 4140 is employed to identify and determine which modalities can be employed for the communication 4110 between the contactor 4120 and the contactee 4130. To facilitate identifying the modalities and to further facilitate determining which of the modalities should be employed for the communication 4110, and at what point in time the communication should be attempted, the contact manager 4140 has access to a contactor data store 4150, a contactee data store 4160 and a modality data store 4115. The contactor data store 4150, the modality data store 4115 and the contactee data store 4160 can store data in data structures including, but not limited to one or more lists, arrays, tables, databases, stacks, heaps, linked lists and data cubes. The contactor data store 4150, the modality data store 4115 and the contactee data store 4160 can reside on one physical device and/or may be distributed between two or more physical devices (e.g., disk drives, tape drives, memory units). Further, the contactor data store 4150, the modality data store 4115 and the contactee data store 4160 may reside in one logical device and/or data structure. Similarly, the contact manager 4140 can be distributed between two or more cooperating processes and/or reside in one physical or logical device (e.g., computer, process).

In one example of the present invention, the contactee data 4160 is not made available to the contactor 4120, while one or more portions of the contactor data 4150 are made available to the contactee 4130. Thus, the privacy of the contactee 4130 may be protected and the identity of the contactor 4120 may be revealed.

The contactor data 4150 may include current state information, predictions concerning future states and costs associated with delaying a communication to points in time associated with the predictions concerning future states. Similarly, the contactee data 4160 may include current state information, predictions concerning future states and costs associated with delaying a communication to points in time associated with the predictions concerning future states. For example, the contactee data 4160 may include information concerning the current attentional status of the contactee 4130 (e.g., in conversation on the phone concerning an assigned task) and may also include information concerning predicted attentional states of the contactee 4130 at one or more future points in time (e.g., 25% likelihood contactee 4130 in same state in five minutes, 50% likelihood contactee 4130 in lower attentional state in ten minutes).

The contact manager 4140 may therefore examine the communication modality data 4115, the contactor data 4150 and the contactee data 4160 when performing processing associated with identifying the modality that will maximize the utility of the communication 4110 between the contactor 4120 and the contactee 4130. While one communication 4110 is illustrated, it is to be appreciated that one or more communication modalities may be employed in methods including, but not limited to, parallel, serial and simultaneous communication between the contactor 4120 and the contactee 4130. By way of illustration, the contactor 4120 and the contactee 4130 may communicate by telephone at the same time that they are sharing a document via collaborative editing over a computer network communication modality.

The contact manager 4140 may examine data (e.g., contactor data 4150, modality data 4115, contactee data 4160)

and find information sufficient to perform deterministic calculations for identifying the optimal modality for the communication 4110. The deterministic calculations may be facilitated by applying one or more preferences based rules based on the sufficient information. By way of illustration, if a first party is attempting to telephone a second party, then the present invention may display the current best possible means, ranked by likelihood, of reaching the second party for real-time telephony given the context of the second party. By way of further illustration, if a contactor listed in a contactee's people class store as a "critical colleague" tries to reach the contactee, and the contactee is not in a meeting, and it is business hours, and the contactee is near a voice-enabled device, and the contactor is using a voice-enabled device, the present invention may route that contactor to the best voice enabled device, unless the contactee is having a conversation with someone.

Tools for displaying and editing such preferences and/or rules would ease the task of creating and managing such rules. In a more sophisticated approach, the present invention directs communications via automated methods that identify communication actions that have the value or highest expected value given uncertainties in variables under consideration. Several formulations of decision problem are feasible, depending on the variables under consideration, the preferences being represented, and the principal agent (or "owner") of the decision.

In a general formulation of the problem, the present invention considers a "communications value function", ƒ, that return a value for each communication modality or subset of modalities under consideration or an ordering over communication modalities in terms of acceptability of the modality or subset of modalities.

Value(Modality)=ƒ(preferences of contactee, preferences of contactor, preferences of organization, context of contactee, context of contactor)

where context of contactee and contactor include the devices that are available, the time of day, tasks and situation at hand for the contactor and contactee, and the like. It is to be appreciated that the context of the contactee and contactor may be stored in one or more formats, including, but not limited to, an XML schema. In one example aspect, the present invention orders the modalities by assigned value and attempts to create a connection or to advise the contactor and/or contactee concerning the best possible connection.

But the contact manager 4140 may discover that incomplete information is available. Thus, the contact manager 4140 may be uncertain concerning certain data points involved in calculations for identifying the optimal modality for the communication 4110. Thus, the contact manager 4140 may be required to reason under this uncertainty. For example, in one example aspect of the present invention, the contact manager 4140 may require a value associated with the attentional state of the contactee 4130. However, for one sample calculation, no such value may be found in the contactee data 4160. Thus, the contact manager 4140 may rely on one or more conditional probabilities associated with the contactee 4130 attentional status based on information like desktop events, ambient noise in the location of the contactee 4130 and gaze tracking when determining the maximum utility.

In general, there may be uncertainty concerning preferences and one or more parameters employed to model a context. In this situation, a probability distribution over the different states of each variable can be inferred and expected values for each modality can be computed. For example, if there is uncertainty concerning aspects of the context of the contactee, the probability distribution (here represented abstractly), given evidence E observed about the context, and sum over the uncertainties can be represented:

Expected value(Modality)=$\Sigma_i ƒ$(preferences of contactee, preferences of contactor, preferences of organization, $p$(context $i$ of contactee|E), context of contactor)

The present invention may order the modalities by assigned expected value and attempt to create a connection or to advise the contactor and/or contactee concerning the best connection.

Considering now more specific examples of the use of expected utility, a particular basic formulation of decision-making under uncertainty in the context of the preferences of the contactor 4120 and/or contactee 4130 is captured by the following Equations:

$$A^* = \underset{j}{\mathrm{argmax}}\, u(A_j, A_k^C, C, context^R, context^C): \qquad \text{Equation 1}$$

where A* is the ideal, selected communication modality for the communication;

$A_j$ represents each of all communication modalities being considered;

$A^C_k$ is the initial communication modality employed by the contactor;

C refers to an identity or group membership of the contactor;

$context^R$ is the known or assumed context of the contactee;

$context^C$ is the known or assumed context of the contactor; and u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

$$A^* = \underset{j}{\mathrm{argmax}} \sum_i p(context_i^R \mid E) u(A_j, A_k^C, C, context_i^R, context^C) \qquad \text{Equation 2}$$

where A* is the ideal, selected communication modality for the communication;

$A_j$ represents each of all communication modalities being considered;

$A^C_k$ is the initial communication modality employed by the contactor;

C refers to an identity or group membership of the contactor $context^R i$ represents each of the contexts being considered for the contactee, representing the situation of the contactee;

$p(context^R i|E)$ represents the probability distribution over the context of the contactee, representing the conditional probabilities that the contactee is in a certain context given the evidence E;

$context^C$ is a known or assumed context of the contactor; and u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

$$A^* = \operatorname*{argmax}_j \sum_i p(context_i^C \mid E) u(A_j, A_k^C, C, context^R, context_i^C) \qquad \text{Equation 3}$$

where A* is the ideal, selected communication modality for the communication;

$A_j$ represents each of all communication modalities being considered;

$A_k^C$ is the initial communication modality employed by the contactor;

C refers to an identity or group membership of the contactor;

$context^C i$ represents each of the contexts being considered for the contactor, representing the situation of the contactor;

$p(context^C i|E)$ represents the probability distribution over the context of the contactor, representing the conditional probabilities that the contactor is in a certain context given the evidence E;

$context^R$ is a known or assumed context of the contactee; and u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

$$A^* = \operatorname*{argmax}_j \sum_i p(context_i^R \mid E) \sum_n p(context_n^C \mid E) u(A_j, A_k^C, C, context_i^R, context_n^C) \qquad \text{Equation 4}$$

where A* is the ideal, selected communication modality for the communication;

$A_j$ represents each of all communication modalities being considered;

$A_k^C$ is the initial communication modality employed by the contactor;

C refers to an identity or group membership of the contactor;

$context^R i$ represents each of the contexts being considered for the contactee, representing the situation of the contactee;

$p(context^R i|E)$ represents the probability distribution over the context of the contactee, representing the conditional probabilities that the contactee is in a certain context given the evidence E;

$context^C n$ represents each of the contexts being considered for the contactor, representing the situation of the contactor;

$p(context^C n|E)$ represents the probability distribution over the context of the contactor, representing the conditional probabilities that the contactor is in a certain context given the evidence E;

u( ) represents a utility function operating on the arguments that provides an encoding of preferences about communications for the recipient or another entity whose preferences are being used to guide the handling of the communications, employed to determine optimal communication actions that maximize the utility of communications between the contactor and the contactee.

It is noted that the above equations can be extended to a consideration of the utility of communications for different times in the future, based on the current contexts of the contactee and contactor or forecasts of the future contexts of the contactee and contactor.

In addition, the encoding of preference information in a parameter representing a cost of delaying a communication as a function of time and at least one of the identity, group memberships, relationships, or contexts of the contactor and contactee can be considered.

Moreover, encoding of preferences about the cost of delaying a communication in a decision-theoretic analysis of the expected utility of the best modality and time for scheduling a communication can be determined.

In another aspect, the encoding of preferences information about a contactee's desire to communicate a stored message with contactors associated with particular identities, groups, and/or contexts to receive can be utilized. This can include information about the preferences of the contactee which is stored that captures preferences about communicating some portion of the present or future context of the contactee. Other extensions include an encoding of preferences about sharing some information about the contactee's context when an analysis or policy indicates that a communication should be rescheduled for a later time.

The extensions can include providing a parameter and encoding enabling contactees to allow contactors associated with particular groups or contexts to override a preference in order to defer a communication to breakthrough a planned deferral of a communication with a gesture. For example, a message can be delivered or played to a contactor such as "I am really busy now, but for you (contactor), if you really think this is important, you can press the pound key to speak with me (contactee) now.

The contactor 4120 and contactee 4130 contexts represent rich sets of deterministic or uncertain variables. The contexts may contain data, including but not limited to, the available modalities for the contactor 4120 and/or contactee 4130 (e.g., is a private voice channel available, are channel and rich desktop available, are television cameras available), information concerning the nature of the location, and content or task of the contactor 4120 and of the contactee 4130. Data associated with automated assessments and/or directly marked indications of urgency or importance in the communications may also be evaluated in identifying optimal communication modalities. The contextual variables can be treated as explicit deterministic or probabilistic factors in the optimization. Thus, the system 4100 can, in various example aspects, account for the preferences, contexts and capabilities of the contactor 4120 and/or the contactee 4130 where information concerning the contexts may be incomplete, thus requiring reasoning under uncertainty to identify the likely optimal communication modality.

Figure 53:
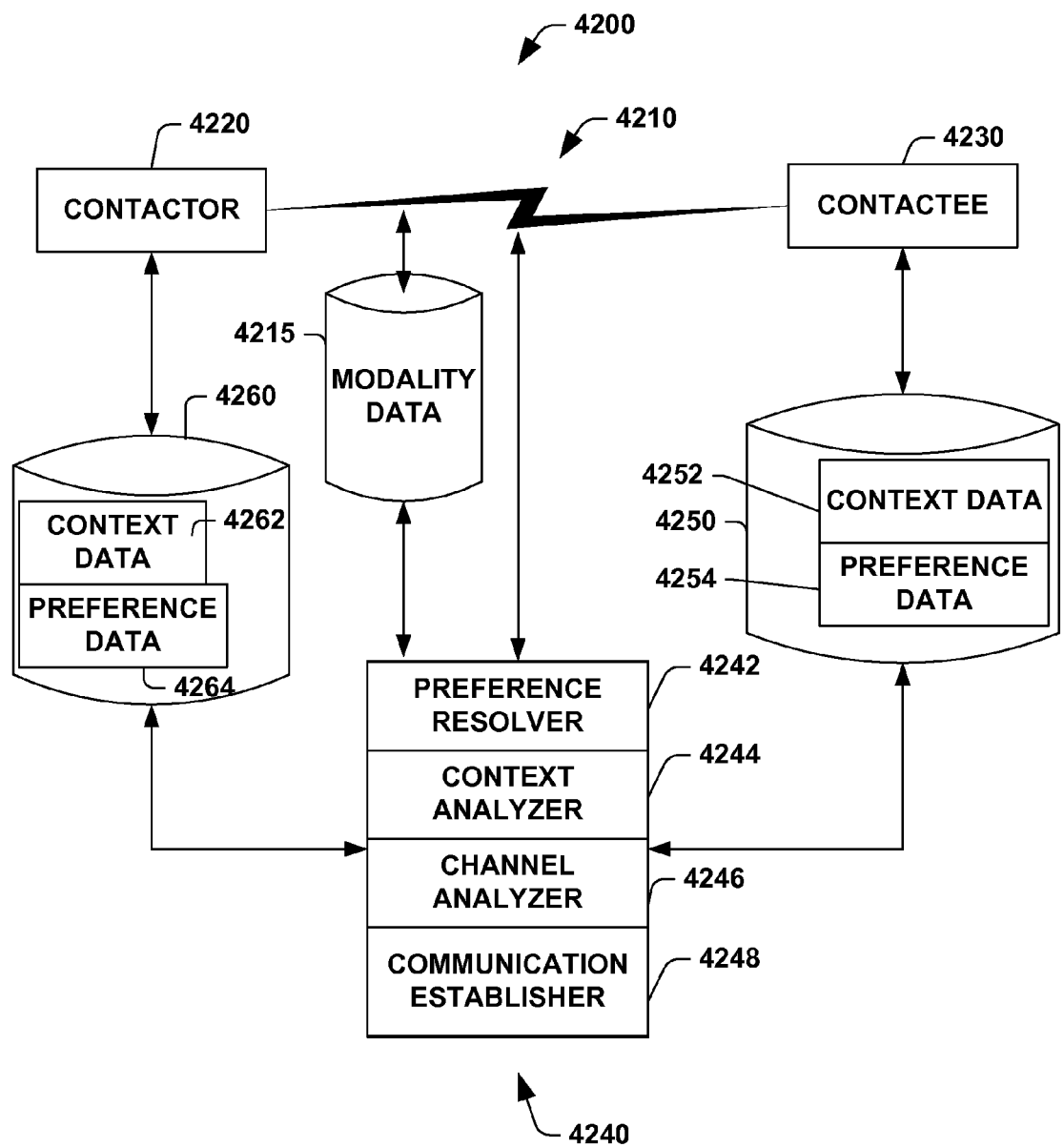
FIG. 53 is a schematic block diagram illustrating a system for identifying and establishing an optimal communication based on the preferences, capabilities, contexts and goals of the parties to engage in the communication, in accordance with an aspect of the present invention.

Referring now to FIG. 53, a system 4200 for identifying and establishing optimal communications based on the preferences and context of the parties engaged in a communication 4210 is illustrated. The communication 4210 may occur between a contactor 4220 and a contactee 4230. While one communication 4210 between one contactor 4220 and one contactee 4230 is illustrated, it is to be appreciated that a greater number of communications between a similar or greater number of contactors and/or contactees may be identified by the present invention. By way of illustration, communications 4210 to facilitate group meetings may be identified by the system 4200 as can multiple communications 4210 between two communicating parties (e.g., duplicate messages sent concurrently by email and pager).

The communication 4210 that is identified by a communication manager 4240 may depend, at least in part, on one or more sets of data concerning communication modalities, contactors and/or contactees, for example. One possible data set, a communication modality data set 4215 concerns the available communication channels. The available communication channels can include, but are not limited to email (of various priorities), telephone (POTS, cellular, satellite, Internet), paging, runners/couriers, video conferencing, face-to-face meeting, instantaneous collaborative editing, delayed posting collaborative editing, picture in picture television, home device activation (e.g., turning on lights in the study, ringing the telephone with a distinctive pattern) and so on. A communication modality may not be a static entity, and thus information concerning the state, capacity, availability, cost etc., of the communication modalities can change. Thus, the communication modality data set 4215 can contain current state information and/or data to facilitate making predictions concerning future state, capacity, availability, cost etc. associated with one or more communication modalities.

The location of the contactee 4230 can determine which communication modalities, if any, are available. For example, a speechwriter may have collaborative editing, phone, email, pager, video conferencing and face-to-face communications available at her office in the White House, may have phone, face-to-face and email available while in her office at home, may only have satellite phone available while on vacation and may have no real-time capacity while in the shower or asleep. The current task of the contactee 4230 can also determine which communication modalities, if any, are available. For example, if the speechwriter is currently on the phone, then the phone may not be available. Predictions concerning the likelihood that the phone will become available can be employed by the system 4200 in determining the optimal modality for the communication 4210. Thus, rather than sending an email at a first point in time (e.g., while the phone is busy), the present invention may schedule a real-time phone call at a second, later point in time, when it is likely that the speechwriter will be off the phone.

The communication manager 4240 may also have available another set of data referred to as the contactee data 4250. The contactee data 4250 may include information related to hardware, software, contactee task being performed, contactee attention status, contactee context data 4252 and contactee preference data 4254, for example. By way of illustration, the hardware data may include information related to what hardware is available to the contactee, what hardware is being employed by the contactee (e.g., desktop, laptop, PDA), the capabilities of that hardware (e.g., enough memory and communication bandwidth for videoconferencing), the cost of employing that hardware and the state(s) in which that hardware is currently functioning (e.g., online, offline). The hardware data may also include information concerning usage patterns that facilitate determining the likelihood that an unavailable piece of hardware will become available. The software data may include information related to what software is available to the contactee, what software is currently being employed by the contactee (e.g., which word processor is being used to edit the speech), the capabilities of that software (e.g., allows collaborative editing) and the state(s) in which that software is currently functioning (e.g., running and active, running but inactive). The software data may also include information concerning usage patterns that facilitate determining the likelihood that an unavailable piece of software will become available.

The contactee data 4250 may also contain preference data 4254 concerning the preferences of the contactee 4230. The preference data 4254 can include data concerning how the contactee 4250 prefers to be contacted, with those preferences varying over time with respect to various contactors 4220 and various topics of communication. For example, the speechwriter may initially allow communications from a large group of persons concerning the State of the Union speech. The speechwriter may also establish preferences that allow the President to communicate with her with a best effort at real-time telephony at all times up to the deadline for the speech. But the speechwriter may gradually restrict the group of people from whom she is willing to accept real-time communications as the deadline approaches and she may further restrict the means by which such people can communicate. In the last hours before the deadline, the speechwriter may be closed to all real-time communications except in person communications with the President and telephone based emergency medical information concerning family members, for example.

The contactee preference data 4254 can include data concerning, but not limited to, preferences concerning the time of day for communicating (e.g., early morning, business hours, evening, late night, sleeping hours), the time of the week for communicating (e.g., Monday through Friday, Weekend, Holiday, Vacation), identity of contactors (e.g., employer, employees, critical colleague, colleague, peers, nuclear family, extended family, close friends, friends, acquaintances, others), hardware currently available or available within a time horizon of a communication attempt (e.g., desktop, laptop, home computer), preferred software (e.g., email, word processing, calendaring) and preferred interruptability (e.g., do not interrupt while focused on work, only interrupt while not focused), for example. While six preferences are identified in the preceding sentence, it is to be appreciated that a greater or lesser number of preferences may employed in accordance with the present invention.

The contactee data 4250 may also include a context data 4252. The context data 4252 is generally related to observations about the contactee 4230. For example, observations concerning the type of activity in which the contactee 4230 is involved (e.g., on task, not on task), location of the contactee 4230 (e.g., office, home, car, shower), calendar (e.g., appointment status, appointment availability), history of communications with other party (e.g., have replied to email in the past, have spoken to on the telephone recently, the utility of the interaction, the duration of the interaction), background ambient noise at current location, number of hours at work that day and attentional status (e.g., high focus, focus, light focus, conversation with another person, light activity) may be stored in the context data 4252. While seven observations are listed in the preceding sentence it is to be appreciated that a greater or lesser number of observations may be stored in the context data 4252. On some occasions the context data 4252 may be incomplete (e.g., video analysis data unavailable because video camera broken). Thus, the communication manager 4240 may need to reason concerning the optimal communication while relying on such incomplete data. Thus, the contactee data 4250 may also include information to facilitate producing one or more probabilities associated with a missing data element. By way of illustration, the contactee data 4250 may contain information operable to predict the likelihood that the contactee 4230 is in a high attentional state even though gaze tracking information is unavailable.

The contactee data 4250 may further include information concerning the long-term and/or acute, dynamically changing communication needs of the contactee 4250. By way of illustration, the contactee 4250 may need to have no interruptions for the next hour (e.g., "hold everything unless high critical on this task or an hour from now"). By way of further illustration, to prevent a contactor 4220 from "ducking" the contactee 4230 by leaving an email or a voice mail when the contactee 4230 desires to speak with the contactor 4220, the contactee 4230 may require that contacts from the contactor 4220 be made in a certain way within X units of time of notification that the contactor 4220 desires communication (e.g., if research assistant tasked with finding a crucial fact tries to contact speechwriter by email, speechwriter wants real-time phone conversation within ten seconds of assistant's attempt).

In addition to the contactee data 4250 employed in determining the optimal communication, data concerning the contactor 4220 may also be employed. The contactor data 4260 may include hardware, software, context, preference and communication needs data similar to that available for the contactee 4230, but different in that it is prepared from the point of view of the contactor 4220.

The present invention is not limited to communications between two parties or to a single communication channel between two parties. It is to be appreciated that multiple channels and/or multiple communicating parties can be treated as increased sets of alternatives that may complicate utility maximizing computations without changing the fundamental process of identifying and establishing one or more communication modalities based on the preferences, contexts and capabilities of the communicating parties.

The communication manager 4240 may include several components responsible for performing portions of the functionality of the communication manager 4240. For example, the communication manager may include a preference resolver 4242. The preference resolver 4242 can examine the contactee preference data 4254 and the contactor preference data 4264 to find correlations between the two sets of data. For group communications, the preference resolver 4242 may examine multiple sets of preference data to find correlations between the preferences. By way of illustration, for a communication between two parties, the preference resolver 4242 may determine that both parties would prefer to communicate by high priority email for communications associated with a first task. Similarly, the preference resolver 4242 may determine that the contactee 4230 would prefer to communicate by collaborative editing and phone for communications concerning a particular document, while the contactor 4220 would prefer to communicate only by telephone. Thus, the preference resolver 4242 may produce data or initiate processing that assigns values to the correlations between the contactee 4230 preferences and the contactor preferences 4220. In one example aspect of the present invention, the preferences of the contactee 4230 are given more weight, and thus, if the contactor 4220 attempted a phone conversation concerning the document for which the contactee 4230 preferred both phone and collaborative editing, then the preference resolver 4242 may produce data or initiate processing that would make it more likely that the contactor 4220 would communicate by both phone and collaborative editing. In another example aspect of the present invention, the preferences of the contactor 4220 are given priority over the preferences of the contactee. By way of illustration, when a human contactor 4220 is attempting to communicate with an electronic contactee 4230, the preferences of the contactor 4220 may be considered more important, and thus the preference resolver 4242 may produce values or initiate processing that makes it more likely that the preferences of the contactor 4220 are observed. In another example aspect of the present invention, the preference resolver 4242 may produce a list of potential communication modalities ranked on their responsiveness to the preferences.

The communication manager 4240 may also include a context analyzer 4244. The context analyzer 4244 can examine the contactee context data 4252 and the contactor context data 4262 to find correlations between the two sets of data. For group communications, the context analyzer 4244 may examine multiple sets of context data to extract information concerning the contexts. By way of illustration, for a communication between two parties, the context analyzer 4244 may determine that the contactee context is such that real-time communications are not immediately available but there is an $X_1$% likelihood that such communications will be available at a point of time $T_1$ in the future, and an $X_2$% likelihood that such communications will be available at a point of time $T_2$ in the future. Further, the context analyzer 4244 may determine that although the contactor 4220 has requested real-time telephony that the context of the contactor 4220 is such that email communication may optimize utility. For example, the context of the contactor 4220 may include information concerning the ambient noise at the location of the contactor 4220.

The context analyzer 4244 may determine that the noise level is not conducive to optimizing utility by real-time telephony and thus may produce values and/or initiate processing that will make it more likely that the contactor 4220 will communicate with the contactee 4230 via email. Similar to processing performed by the preference resolver 4242, the context analyzer may, in different examples of the system 4200, weight the context of the contactee 4230 more than the context of the contactor 4220 or vice versa.

The communication manager 4240 may also include a channel analyzer 4246. The channel analyzer 4246 can be employed to analyze the communication modality data set 4215, for example. The channel analyzer 4246 can produce data concerning the current availability of a communication modality and/or the likelihood of the modality becoming available. The channel analyzer 4246 may examine one or more channels that the contactor 4220 specified for the communication, and/or one or more channels that the contactee 4230 listed as preferences in the contactee preference data 4254, for example. Further, the channel analyzer 4246 may examine currently available channels as determined by location information associated with the contactee 4230 and channels that may become available based on the activity of the contactee 4230. For example, if the contactee 4230 is currently driving home (as determined by GPS and schedule, for example), then the channel analyzer 4246 may examine current cellular modalities and may additionally examine the modalities available at the home of the contactee 4210. Thus, the channel analyzer 4246 facilitates producing data and/or initiating processing that make it more likely that a desired channel will be employed when determining the optimal communication channel(s) for the communication 4210 between the contactor 4220 and the contactee 4230.

The communication manager 4240 may also include a communication establisher 4248. Once the ideal communication actions A* have been identified, the communication establisher 4248 may undertake processing to connect the contactor 4220 and the contactee 4230 through the identified optimal communication modality. For example, if the optimal communication 4210 is identified as being email, then the communication establisher may initiate an email composing process for the contactor 4220 (e.g., email screen on computer, voice to email converter on cell phone, email composer on two-way digital pager), and forward the composed email to the most appropriate email application for the contactee 4230 based on the identified optimal communication 4210. For example, the communication establisher 4240 may forward the email to the pager of the contactee 4230 based on GPS data associated with the location of the contactee 4230. In an alternative embodiment of the present invention, the system 4200 does not include a communication establisher 4248, relying instead on contactor 4220 and/or contactee 4230 actions, for example, to establish the communication.

It is to be appreciated that the preference resolver 4242, the context analyzer 4244, the channel analyzer 4246 and the communication establisher 4248 may be implemented alone or in combinations of hardware, software and/or firmware. It is to be further appreciated that the preference resolver 4242, the context analyzer 4244, the channel analyzer 4246 and the communication establisher 4248 may employ one or more threads and/or processes executing alone and/or co-operating. Further, such threads and/or processes may reside on one processor and/or may be distributed over two or more processors. In one example of the present invention, the preference resolver 4242, the context analyzer 4244, the channel analyzer 4246 and the communication establisher 4248 are separate processes employing one or more threads, with each of the separate processes residing in one processor.

Figure 54:
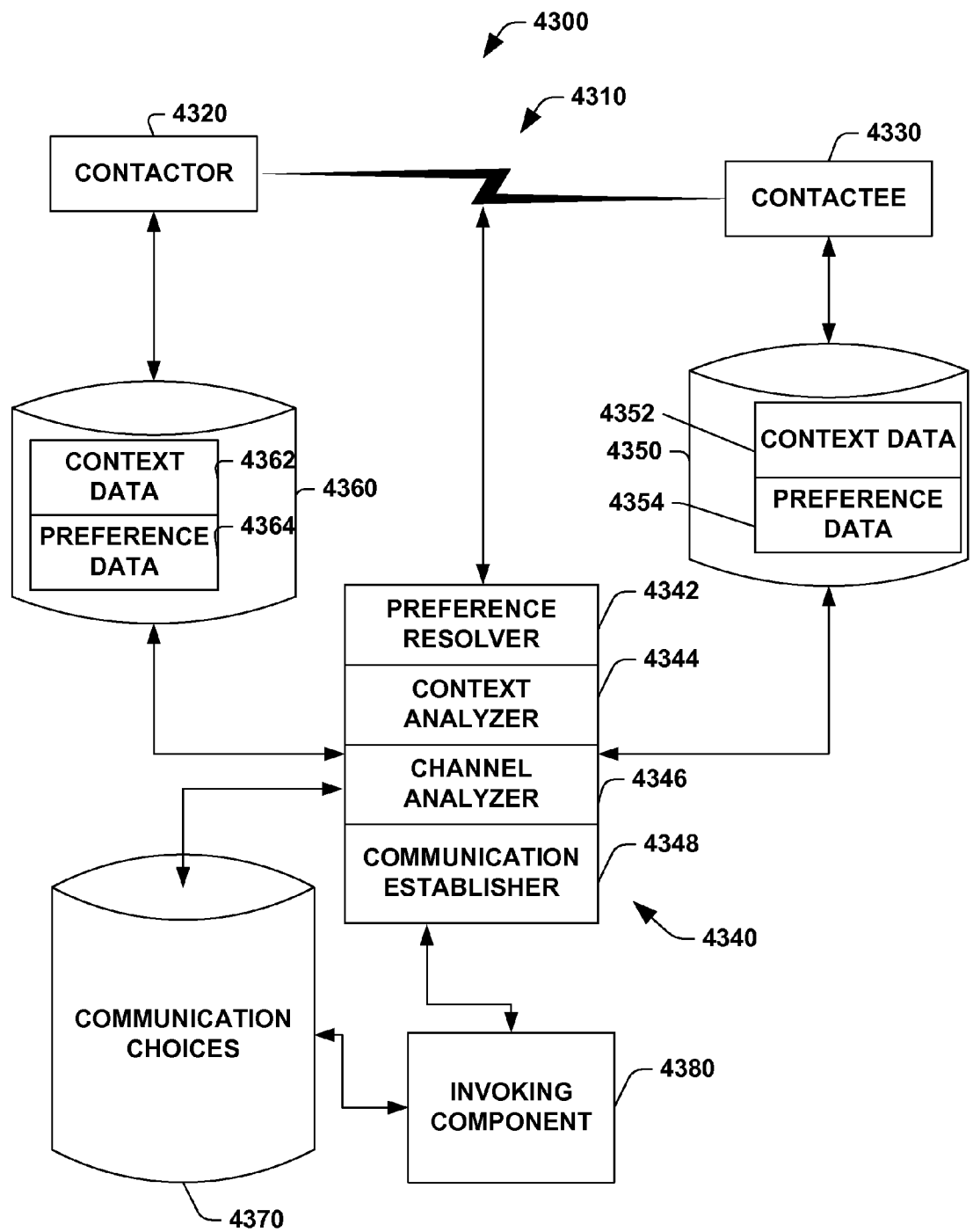
FIG. 54 is a schematic block diagram further illustrating a system for identifying and establishing an optimal communication based on the preferences, capabilities, contexts and goals of the parties to engage in the communication, in accordance with an aspect of the present invention.

FIG. 54 illustrates a system 4300 for identifying and establishing an optimal communication based on the preferences, capabilities and contexts of the parties to engage in the communication, wherein components previously described with respect to FIG. 53 are identified in FIG. 54 by similar reference numbers which have been increased by adding 100. The system 4300 includes a communication choices data store 4370 and an invoking component 4380. The communication choices data store 4370 can store data in data structures including, but not limited to one or more lists, arrays, tables, databases, stacks, heaps, linked lists and data cubes. The communication choices data store 4370 can reside on one logical and/or physical device and/or may be distributed between two or more logical and/or physical devices (e.g., disk drives, tape drives, memory units). The communication choices data store 4370 can store information produced and/or retrieved, for example, by the communication manager 4340 concerning potential modalities that can be employed to facilitate the communication 4310. For example, the communication choices data store 4370 can hold lists of communication modality rankings that can be presented to the contactor 4320 and/or contactee 4330, which will then allow the communicating parties to enter into a dialog with the system 4300 and/or each other to decide which of the available choices they would prefer for this particular communication. The dialog may produce entity selection data concerning the communication, where such data can be employed to choose between possible communication modalities. Similarly, the communication choices data store 4370 can hold lists of communication modality rankings that can be presented to the invoking component 4380. The invoking component 4380 may then attempt to establish the identified communications.

Due to race conditions, for example, the invoking component 4380 may attempt to establish a communication that is no longer possible (e.g., phone was available then becomes unavailable), and thus, the invoking component 4380 may work through the list available in the communication choices data store 4370 until a communication is established.

The invoking component 4380 may perform actions including, but not limited to, scheduling, calendaring and/or initiating a communication. By way of illustration, the invoking component 4380 may determine, based at least in part on data stored in the communication choices data store 4370, that a real-time communication should be performed in ten minutes. Thus, rather than immediately initiate the communication, the invoking component 4380 may schedule the communication and may inform the parties who are going to communicate that the communication has been scheduled. By way of further illustration, the invoking component 4380 may determine that a video-conference between four parties should be performed and by examining the calendars of the four individuals, the invoking component 4380 may determine that the video conference should occur at four o'clock in the afternoon on May $1^{st}$. Thus, the invoking component 4380 may update the calendars of the parties, arrange for the video-conference, and inform the parties of the plans. By way of still further illustration, the invoking component 4380 may determine that both parties are immediately available for the real-time communication and may dial the phones on both ends to establish the communication.

Figure 55:
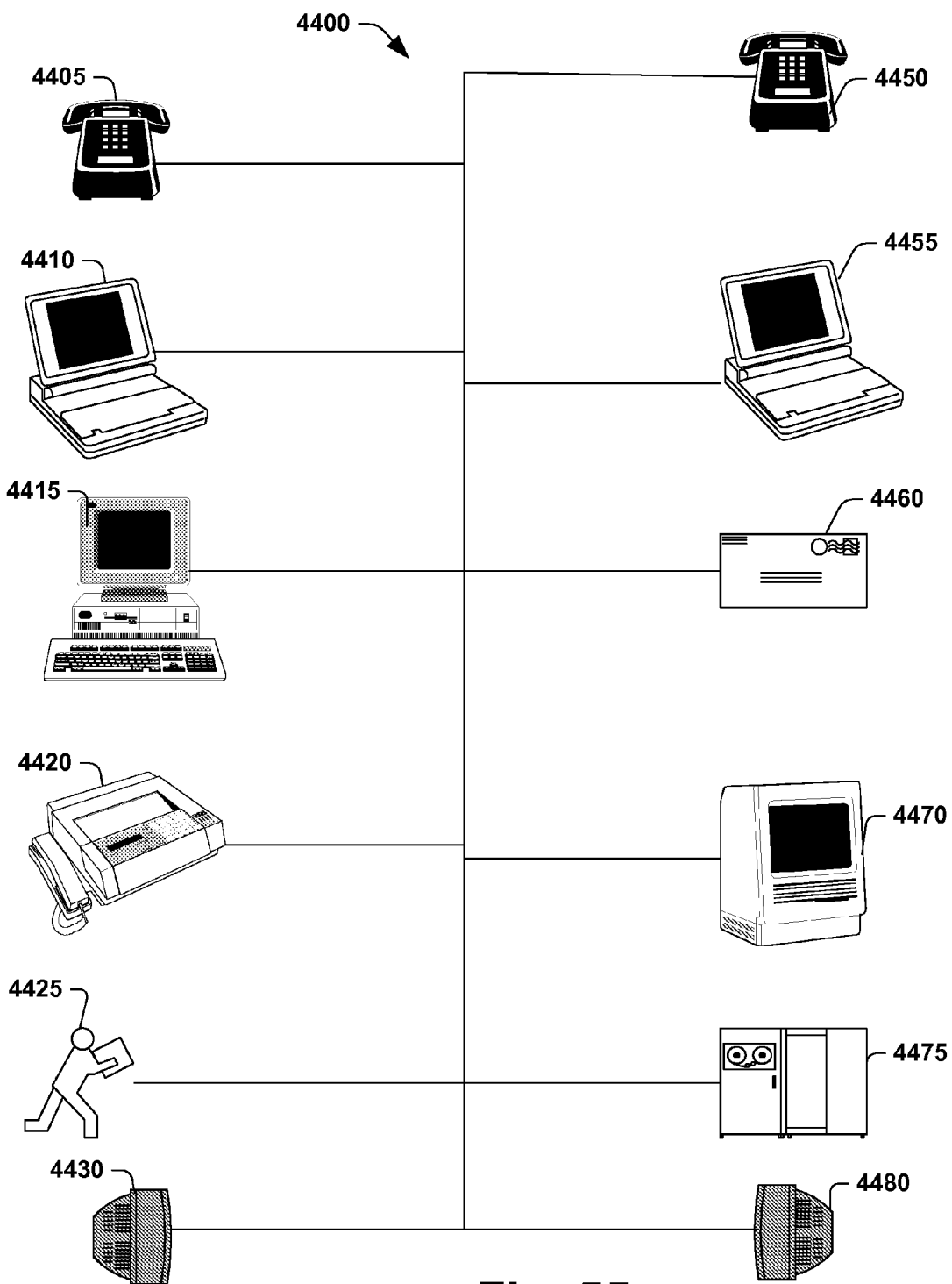
FIG. 55 illustrates an environment in which the present invention may be employed.

FIG. 55 illustrates an environment 4400 in which the present invention may be employed. The environment 4400 may include a plurality of communication devices, some of which are available to one or more contactors and some of which are available to one or more contactees. For example, the left side of FIG. 55 may represent communication devices associated with a contactor and the right side of FIG. 55 may represent communication devices associated with a contactee. The contactor may have, for example, a phone 4405, a laptop 4410, a desktop system 4415, a fax 4420, a courier 4425 and a home television 4430 available at different times and at different locations. The contactee may have, for example, a phone 4450, a laptop 4455, a regular mail reader 4460, a minicomputer system 4470, a mainframe system 4475 and a home television 4480 available at different times and at different locations.

The contactee may have established preferences that indicate that for communications from a first group of contactors (e.g., traveling salesmen employees of the contactee) the contactee would prefer email, and if the contactor does not have email capability, then the contactee would prefer regular mail, and would only prefer a real-time communication if no other modality was available and the communication was high critical. Similarly, the contactee may have established preferences that indicate that for communications from a second group of contactors (e.g., nuclear family, close friends) the contactee would prefer real-time phone communications concerning a first group of topics (e.g., work-related, emergency medical information related), and would prefer an email concerning other groups of topics. By way of further illustration, the contactee may have established preferences that indicate that for communications from a third group of contactors (e.g., collaborating authors) that the contactee would prefer both a real-time phone call and a shared computer screen displaying the document at a point concerning which the contactor wishes to communicate.

Given this set of preferences, communications attempted from a contactor may take a different form than the contactor would prefer. But since the attention of the contactee is the resource that is being accessed, for certain groups that resource will be sparely provided, while for other groups it will be generously provided, depending on the preferences of the contactee and the identity of the contactor.

The preferences of the contactee are not the only data points that are evaluated by the present invention when identifying the optimal communication modality for establishing a communication between the contactor and the contactee. For example, although the contactee may prefer an email or a regular piece of mail from a traveling salesman concerning a contract the salesman has written (e.g., for documentary purposes), the salesman may not have a computer operable to send email and may not have time to send a regular piece of mail. Thus, the salesman who desires to contact the contactee may be informed by the present invention, after it analyzes the preferences and the capabilities of the parties, to send a fax using the fax machine 4420. The present invention may then route the fax to the regular mail reading component 4460 that can produce a communication close to what the contactee desired, thereby maximizing the utility of the communication while taking into account both the preferences and capabilities of the parties.

The preferences of the contactee may depend on where the contactee is located. Similarly, the capabilities of the contactee may depend on where the contactee is located. By way of illustration, at the office, the contactee may have a phone 4450, the minicomputer 4470 and the mainframe system 4470 available. But at home the contactee may have only a phone 4450, a laptop 4455 and a television 4480. Furthermore, while on the road, the contactee may have only the laptop 4455. Thus, the present invention is able to examine the context of the contactee, which includes the location of the contactee, to determine capabilities. Even within a location, the capabilities of the contactee can vary from time to time. For example, at certain times during the day at work, the ambient noise level may be so high that real-time communications are impractical, and little, if any information could be communicated (e.g., while a particularly noisy piece of equipment is running near the telephone of the contactee). Thus, if a contactor attempts to contact the contactee employing real-time telephony, the present invention may schedule the phone call for a few minutes after the noisy equipment typically spins down, or may take a voice mail that is converted to email and displayed on the contactee's pager, for example. In this way, the present invention seeks to maximize the utility of the communication given the contactee's preferences and the contactee's capabilities, as those preferences and capabilities are affected by the dynamic environment in which the contactee exists.

The television 4430 and the television 4480 are examples of home devices that may be employed by the present invention to maximize the utility of a communication. For example, if the contactee's security company is trying to alert the contactee to an important piece of information (e.g., a theft in progress at the plant), and the contactee is at home watching a movie, then the present invention facilitates the contactor reaching the contactee by real-time phone communication and simultaneous video streamed to the contactee's television. Thus, the utility of the communication may be maximized as the contactee may be able to identify the thief or inform the security company that the apparent break-in is really a scheduled late-night pick-up.

Thus, it is to be appreciated that devices (e.g., televisions, telephones, heating systems, air filtration systems, etc.) may employ the present invention. By way of illustration, the contactor may be the local electric company computer, and the contactee may be a factory heating and air filtration system. The contactor may seek to inform the heating and filtration system, by the best means possible, that a rolling brownout is going to impact the plant in approximately thirty minutes. Thus, the present invention may attempt, based on the preferences and capabilities of the heating and filtration system and the preferences and capabilities of the electric company computer to communicate information concerning the length, duration and severity of the impending brownout. Thus, the factory may be able to act proactively, rather than reactively, to the brownout. This example is intended to illustrate that the present invention may be employed between computer processes. If the present invention informs the electric company computer that no communication is possible with the plant heating and filtration system, but that communication with the plant manager is possible via real-time telephony, then the electric company computer may place such a call. This escalation example is intended to illustrate that the present invention may be employed between computer processes and humans.

One example aspect of the present invention provides initiating means (e.g., button, icon, voice command) that can be employed to initiate identifying and establishing communications. The initiating means may, for example, be a button labeled BestCom, an icon with a star surrounding a data communication link or a voice command "Best Com Please". When the initiating means are employed, the context of the contactor is considered to be deterministic, and the context of the contactee is considered to be uncertain. Such may be the case where there is a relatively small amount of deterministic information available from the contactor, but rich, sensed context information available for the contactee. By way of illustration, the laptop 4410 may include an icon that signifies that the contactor desires the attempted communication to employ the present invention. Thus, in this example of the present invention, the context of the contactor would be considered deterministic and the context of the contactee would be considered uncertain, triggering processing associated with reasoning under uncertainty.

FIG. 55 presents several communication devices that may be employed in establishing an optimal communication between a contactor and a contactee. For example, the present invention may determine that a real-time telephony communication between the contactor employing telephone 4405 and the contactee employing telephone 4450 may optimize the utility of the communication between the parties. But communicating through the telephones may not be possible at the moment that the contactor desires to make contact. Thus, the present invention can also consider the likelihood of obtaining access to a modality within a time frame t, where the likelihood that modalities could be made available by time t is represented by $p(m^C_k(t)|E)$. Another aspect of the present invention includes considering the costs to the contactor and/or contactee of arranging to access modalities that might not be available immediately. Thus, the opportunity to establish a communication with a first expected utility that is available immediately may be foregone for the opportunity to establish a communication with a second, higher expected utility at a later point in time.

Figure 56:
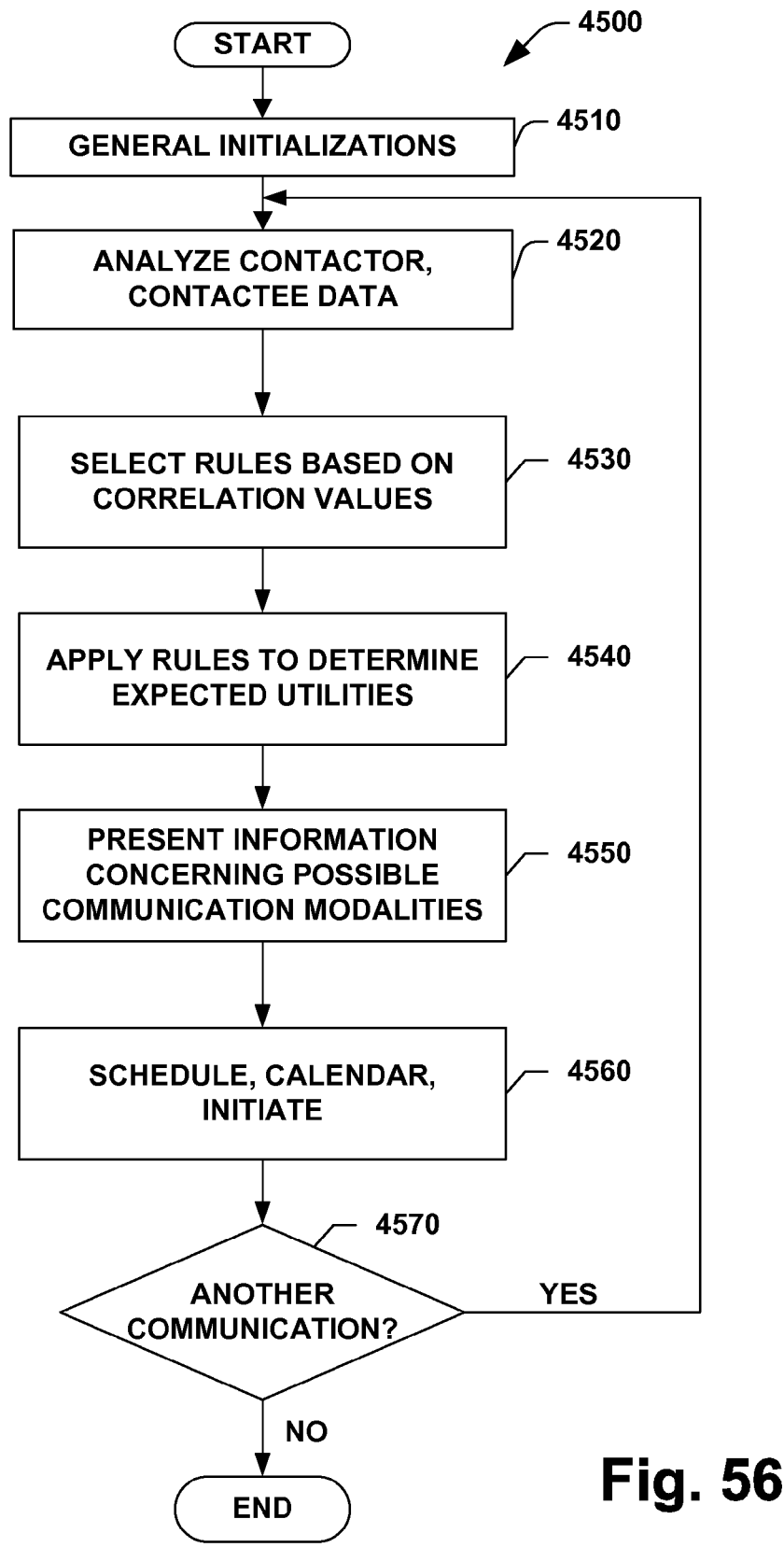
FIG. 56 is a flow chart illustrating one particular methodology for carrying out an aspect of the present invention.
Figure 57:
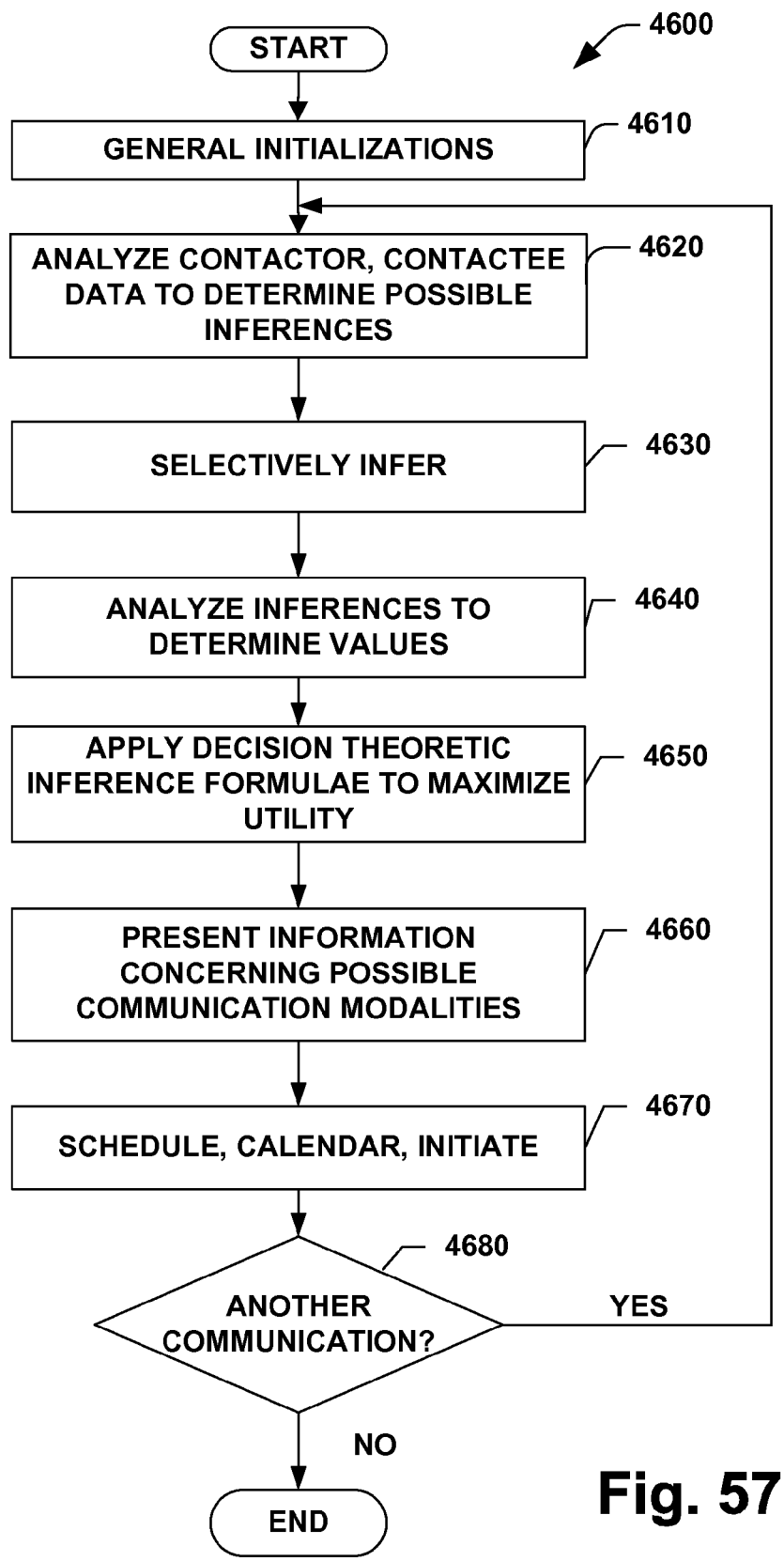
FIG. 57 is a flow chart illustrating another methodology for carrying out an aspect of the present invention.

In view of the exemplary systems shown and described above, methodologies, which may be implemented in accordance with the present invention will be better appreciated with reference to the flow diagrams of FIGS. 56 and 57. While for purposes of simplicity of explanation, the illustrated methodologies are shown and described as a series of acts, it is to be understood and appreciated that the present invention is not limited by the order of the acts, as some acts may, in accordance with the present invention, occur in different orders and/or concurrently with other acts from that shown and described herein. Moreover, not all illustrated acts may be required to implement a methodology in accordance with the present invention. Further, additional and/or alternative methodologies may employ additional acts, not illustrated herein.

Turning now to FIG. 56, a flow chart illustrates a method 4500 for identifying and establishing an optimal communication modality between two or more communicating parties. The method 4500 addresses determining maximum utility for a communication in a deterministic situation. At 4510, general initializations occur. Such initializations can include, but are not limited to, allocating memory, establishing pointers, establishing data communications, acquiring resources, setting variables and displaying process activity.

At 4520, data including, but not limited to, contactor data, contactee data and communication modality data is analyzed. The contactor data can include, but is not limited to, situation data and contactor preference data. The situation data can include observed data, for example, data gathered by watching the contactor and or observing the contactor's environment. For example, ambient noise levels may be analyzed to determine whether voice communications are practical. The contactor situation data can include, but is not limited to contactor application data (e.g., which applications are being employed), contactor user data (e.g., who is using the application) and contactor capability data. The contactor preference data refers to how the contactor would like the communication to be achieved. The contactor preference data includes, but is not limited to time data, location data, task data, goal data and communication needs data. In addition to the contactor and contactee preference data, there may be organization preference data. For example, when both a contactor and contactee belong to the same organization, then the contactor preferences and the contactor preferences may be blended together in accordance with organization policies. The communication needs data may, for example, include information that the contactor must contact the specified contactee within a specified period of time (e.g., investor must reach broker before the stock market closes). The contactee data includes, but is not limited to contactee situation data and contactee preference data. The contactee situation data can include but is not limited to contactee application data, contactee user data and contactee capability data. The contactee preference data includes but is not limited to time data, location data, task data, goal data and communication needs data.

The contactor data, the contactee data and the modality data may include information describing current conditions and information that facilitates predicting future conditions. For example, a phone may currently be in use, but data concerning phone usage patterns may be analyzed to facilitate determining the likelihood that that phone will be available at a point of time in the future.

The analysis of 4520 can model utilities that consider the relationships between contactor and contactee preferences. For example, if both parties prefer real-time telephone communications, then there may be a high utility to arranging real-time telephony, but if one party prefers email and another party prefers video-conferencing, then real-time communications may not be preferred. In addition to blending the contactor preference data with the contactee preference data, there may be blending with organization preference data. For example, when both a contactor and contactee belong to the same organization, then the contactor preferences and the contactor preferences may be blended together in accordance with organization policies. The best communication actions may also be influenced by the capabilities of communication devices available at the time the communication is attempted and/or at some future time by the contactor and contactee. For example, if the contactor has video conferencing equipment available and the contactee similarly has video conferencing equipment available, then video conferencing may receive a high value in the analysis of preferences. But if the contactor has email capability, and the contactee has only regular mail capability, then video conferencing may be untenable even if it would have been the most desirable feature. In such a case, if the cost (e.g., delay time, effort, and/or dollars) of one of the participants finding a video conferencing facility is lower than the cost of moving to the next best modality, then it may be optimal to delay the communication until the initially deficient participant locates and executes communication with tools allowing for such rich communication.

At 4530, one or more rules may be selected from a set of possible rules, where the rules can be employed to determine expected utilities. For example, given a large set of communication modalities and/or preferences, a first set of rules may be selected but given a small set of communication modalities and/or preferences, a second set of rules may be selected. The rules may be selected on other parameters including, but not limited to, the number of matching preferences, the number of matching capabilities, the nature and quality of the contexts, the type and number of communications requested and the time critical nature of the desired communication. The rules may have been specified by the contactee, for example. By way of illustration, contactees can specify groups of people and attributes concerning the nature of the contact and rules for communicating given the context (e.g., time, task, goals, location, contactor).

At 4540, the rules selected at 4530 are employed to determine one or more expected utilities for the candidate communication modalities. By determining a set of expected utilities, that include both immediately available modalities and modalities predicted to be available at a point of time in the future, the present invention facilitates optimizing the utility of the communication, thus providing improvements over conventional systems.

At 4550, information concerning the possible communication modalities and their expected utilities can be presented to a contactor and/or contactee. Thus, the contactor and/or contactee can select from the possible communications that are identified as maximizing the utility of the communication. For example, a contactor may want to place a real-time telephone call, but may be presented with a list of other communication modalities that may produce higher utilities (e.g., high priority page to a person in a meeting where there is no telephone, real-time telephone call to contactee's assistant). Similarly, the contactee may be informed that the contactor is trying to contact them, and the contactee may be given the opportunity to override their preferences based on their current capabilities. By way of illustration, the contactee may be at home watching a movie at two a.m. when the preferences indicate that no real-time phone communications are desired. Since the present invention determined that the contactee was immediately reachable, the contactee may be presented, on the television, with a list of options for being contacted by the contactor (e.g., phone call, email, streaming video) and may be given the opportunity to override the preferences (e.g., willing to accept a phone call from the police department).

At 4560, once the optimal communication modality or modalities have been identified, by the method and/or by the contactor and/or contactee, then the communication can be scheduled, calendared and/or initiated. By way of illustration, a real-time phone call, with both parties immediately capable and available can be initiated by ringing the phones, a collaborative editing session, with simultaneous instant messaging and cell phone communication may be scheduled for later in the day with email reminders sent to both parties and a video conference may be calendared for May $1^{st}$ at four o'clock in the afternoon, with calendar updates made for all invited parties. At 4570 a determination is made concerning whether another communication is desired. If the determination at 4570 is no, then processing concludes, otherwise processing continues at 4520.

The method 4500 is not limited to one on one communications. Groups may be linked together using method 4500 by analyzing data (e.g., hardware, software, context, preferences) of more than two communicators. By way of illustration, one or more participants may attempt to establish a communication between six people. The method 4500 may determine that four people are ready, willing and able to communicate via a videoconference, while two others may only communicate with email (one due to preferences and one due to lack of a video camera). The method 4500 may, therefore, alert the user with the email preference concerning overriding the preferences for this particular real-time communication, and may connect the person without a camera by voice only, while alerting the camera enabled group that this member cannot see them and can only hear them.

Turning now to FIG. 57, a flow chart illustrates a method 4600 for identifying and establishing an optimal communication between two or more communicating parties. The method 4600 addresses reasoning under uncertainty concerning one or more data points employed in determining a maximum utility for a communication. At 4610, general initializations occur. Such initializations can include, but are not limited to, allocating memory, establishing pointers, establishing data communications, acquiring resources, setting variables and displaying process activity.

At 4620, data including, but not limited to, contactor data, contactee data and communication modality data is analyzed to determine correlations that can be made and inferences that need to be made. The contactor data, which may be incomplete, can include, but is not limited to, situation data and contactor preference data. The situation data, which can also be incomplete, can include data gathered by watching the contactor and or observing the contactor's environment. For example, light levels may be analyzed to determine whether textual communications are practical. But there may be gaps in the contactor situation data. For example, information concerning the light level of the contactor may not be available, and thus inferences concerning such light may be required to be made from data like the location of the contactor (e.g., in a darkroom, in a truck) and the time of day (e.g., during daylight hours, late at night).

The contactee data, which may similarly be incomplete, includes, but is not limited to contactee situation data and contactee preference data. The contactee situation data, which is analogous to the contactor situation data, except that it is gathered from the point of view of the contactee, can similarly be incomplete and may include, but is not limited to contactee application data, contactee user data and contactee capability data. By way of illustration, data concerning the contactee's attentional state may be observed by monitoring data like gaze tracking data and desktop events (e.g., keyboard strikes, mouse movements). Such observed data may be combined to produce a likelihood that the contactee is in a certain attentional state (e.g., focused, not focused). Such a likelihood may then be combined with information concerning the assignment of the contactee and the current task being performed by the contactee to determine a value associated with the interruptability of the contactee. By way of illustration, if the contactee is focused on a task that is related to the contactee's assignment, then the contactee interruptability value may be very low while if the contactee is not focused and is not performing a task related to the contactee's assignment, then the contactee interruptability value may be very high. Calculating such an interruptability parameter may be a step in determining the optimal communication modality. But if a piece of data employed in calculating such interruptability is missing, then the present invention may make inferences concerning the missing data point so that likely optimal communications can be calculated.

The contactor data, the contactee data and the modality data may include information describing current conditions and information that facilitates predicting future conditions. For example, a phone may currently be in use, but data concerning phone usage patterns may be analyzed to facilitate determining the likelihood that that phone will be available at a point of time in the future.

Thus, at 4630, selected inferences may be made. For example, $p(\text{context}^R_i|E)$ may be inferred to produce the conditional probability that a recipient (contactee) has a given context given certain evidence E. Similarly, an inference concerning the likelihood of obtaining access to a modality within a time frame t, where the likelihood that modalities could be made available by t time is represented by $p(m^C_k(t)|E)$ can be made.

At 4640, values associated with the inferences of 4630 can be analyzed to determine one or more values that may be employed in inference formulae that are employed to determine a communication with a maximum utility. The inference formulae may be, for example, decision-theoretic formulae.

At 4650, inference formulae may be employed to determine the maximum utility for a communication. In one example aspect of the present invention, a basic decision-theoretic formula employed in decision-making under uncertainty can be utilized as described above.

The basic formulation for identifying optimal communication modalities can be extended by introducing uncertainty about the contactor's context. Variables associated with contactor and/or contactee contexts can be treated as explicit deterministic or probabilistic factors in optimization processing associated with identifying the optimal communication modality.

The present invention may further compare the best option for communication available now with the best communication option that will be available later, and update the value of the communication for the losses based in delays in communication, and potential gains or losses based on changes in disruptiveness if the communication should come at the later time t when the contactee is in a different state (e.g., more available or less available).

The present invention also facilitates considering the value of delaying the communication and rescheduling it for a later time. As an example, assume that a contactor attempts to contact a contactee in real-time and the contactee is in an important meeting. The best option (e.g., one that maximizes utility) may be to reschedule a real-time conversation when the contactee is back from meeting, based on the calendar information or on statistics about the contactee's coming and going that facilitate predicting the contactee's likely availability. One aspect of the present invention may also consider the calendar of the contactor to arrange a mutually good time.

Thus, decision-theoretic formulae like those described in equations 1 through 4 may be employed at 4650 to produce one or more expected utilities. In one example aspect of the present invention, a communication would automatically be initiated, scheduled and/or calendared based on such information. But in another aspect of the present invention, information concerning those expected utilities may be presented to one or more parties, as at 4660. By way of illustration, a contactor may be presented with a list of communications with high utilities determined in accordance with the preferences of the contactee. The contactor may then select from the list.

Based, at least in part on the selection of 4660, one or more communications may be initiated (e.g., phones dialed, email composer/receiver popped up), scheduled and/or calendared at 4670. At 4680 a determination is made concerning whether another communication is to be processed. If the determination at 4680 is YES, then processing continues at 4620, otherwise processing concludes.

Figure 58:
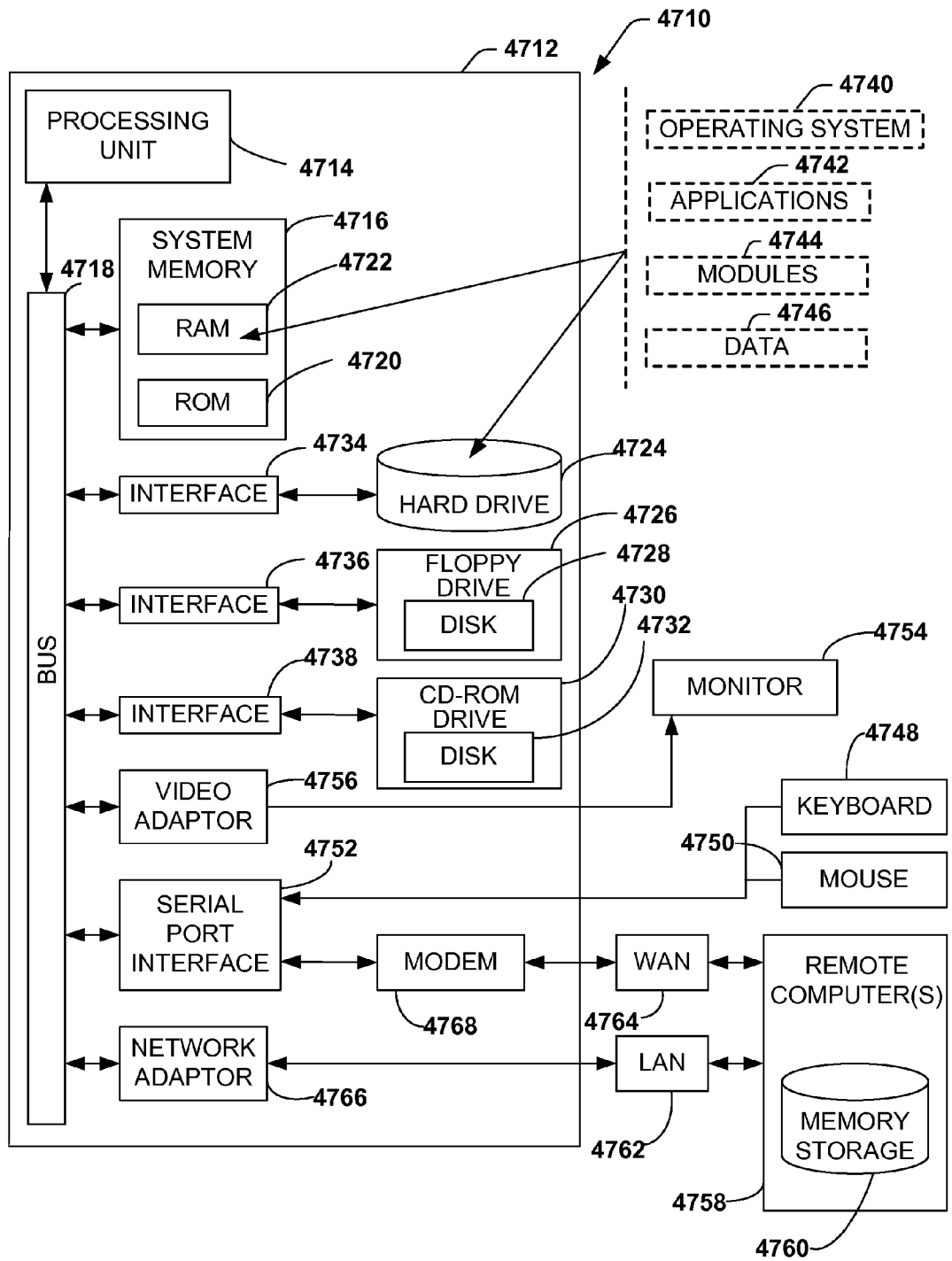
FIG. 58 is a schematic block diagram of an exemplary operating environment for a system configured in accordance with the present invention.

In order to provide additional context for various aspects of the present invention, FIG. 58 and the following discussion are intended to provide a brief, general description of a suitable computing environment 4710 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc. that perform particular tasks or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference to FIG. 58, an exemplary environment 4710 for implementing various aspects of the invention includes a computer 4712, the computer 4712 including a processing unit 4714, a system memory 4716 and a system bus 4718. The system bus 4718 couples system components including, but not limited to, the system memory 4716 to the processing unit 4714. The processing unit 4714 may be any of various commercially available processors. Dual microprocessors and other multi-processor architectures also can be employed as the processing unit 4714.

The system bus 4718 can be any of several types of bus structure including a memory bus or memory controller, a peripheral bus and a local bus using any of a variety of commercially available bus architectures. The system memory 4722 includes read only memory (ROM) 4720 and random access memory (RAM) 4722. A basic input/output system (BIOS), containing the basic routines that help to transfer information between elements within the computer 4712, such as during start-up, is stored in ROM 4720.

The computer 4712 further includes a hard disk drive 4724, a magnetic disk drive 4726, (e.g., to read from or write to a removable disk 4728) and an optical disk drive 4730, (e.g., for reading a CD-ROM disk 4732 or to read from or write to other optical media). The hard disk drive 4724, magnetic disk drive 4726 and optical disk drive 4730 can be connected to the system bus 4718 by a hard disk drive interface 4734, a magnetic disk drive interface 4736 and an optical drive interface 4738, respectively. The drives and their associated computer-readable media provide nonvolatile storage of data, data structures, computer-executable instructions, and so forth. For the computer 4712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 4722, including an operating system 4740, one or more application programs 4742, other program modules 4744 and program data 4746. It is to be appreciated that the present invention can be implemented with various commercially available operating systems or combinations of operating systems.

A user can enter commands and information into the computer 4712 through a keyboard 4748 and a pointing device, such as a mouse 4750. Other input devices (not shown) may include a microphone, an IR remote control, a joystick, a game pad, a satellite dish, a scanner, or the like. These and other input devices are often connected to the processing unit 4714 through a serial port interface 4752 that is coupled to the system bus 4718, but may be connected by other interfaces, such as a parallel port, a game port, a universal serial bus ("USB"), an IR interface, etc. A monitor 4754 or other type of display device is also connected to the system bus 4718 via an interface, such as a video adapter 4756. In addition to the monitor, a computer typically includes other peripheral output devices (not shown), such as speakers, printers etc.

The computer 4712 may operate in a networked environment using logical connections to one or more remote computers, such as a remote computer(s) 4758. The remote computer(s) 4758 may be a workstation, a server computer, a router, a personal computer, microprocessor based entertainment appliance, a peer device or other common network node, and typically includes many or all of the elements described relative to the computer 4712, although, for purposes of brevity, only a memory storage device 4760 is illustrated. The logical connections depicted include a local area network (LAN) 4762 and a wide area network (WAN) 4764. Such networking environments are commonplace in offices, enterprise-wide computer networks, intranets and the Internet.

When used in a LAN networking environment, the computer 4712 is connected to the local network 4762 through a network interface or adapter 4766. When used in a WAN networking environment, the computer 4712 typically includes a modem 4768, or is connected to a communications server on the LAN, or has other means for establishing communications over the WAN 4764, such as the Internet. The modem 4768, which may be internal or external, is connected to the system bus 4718 via the serial port interface 4752. In a networked environment, program modules depicted relative to the computer 4712, or portions thereof, may be stored in the remote memory storage device 4760. It will be appreciated that the network connections shown are exemplary and other means of establishing a communications link between the computers may be used.

Figure 59:
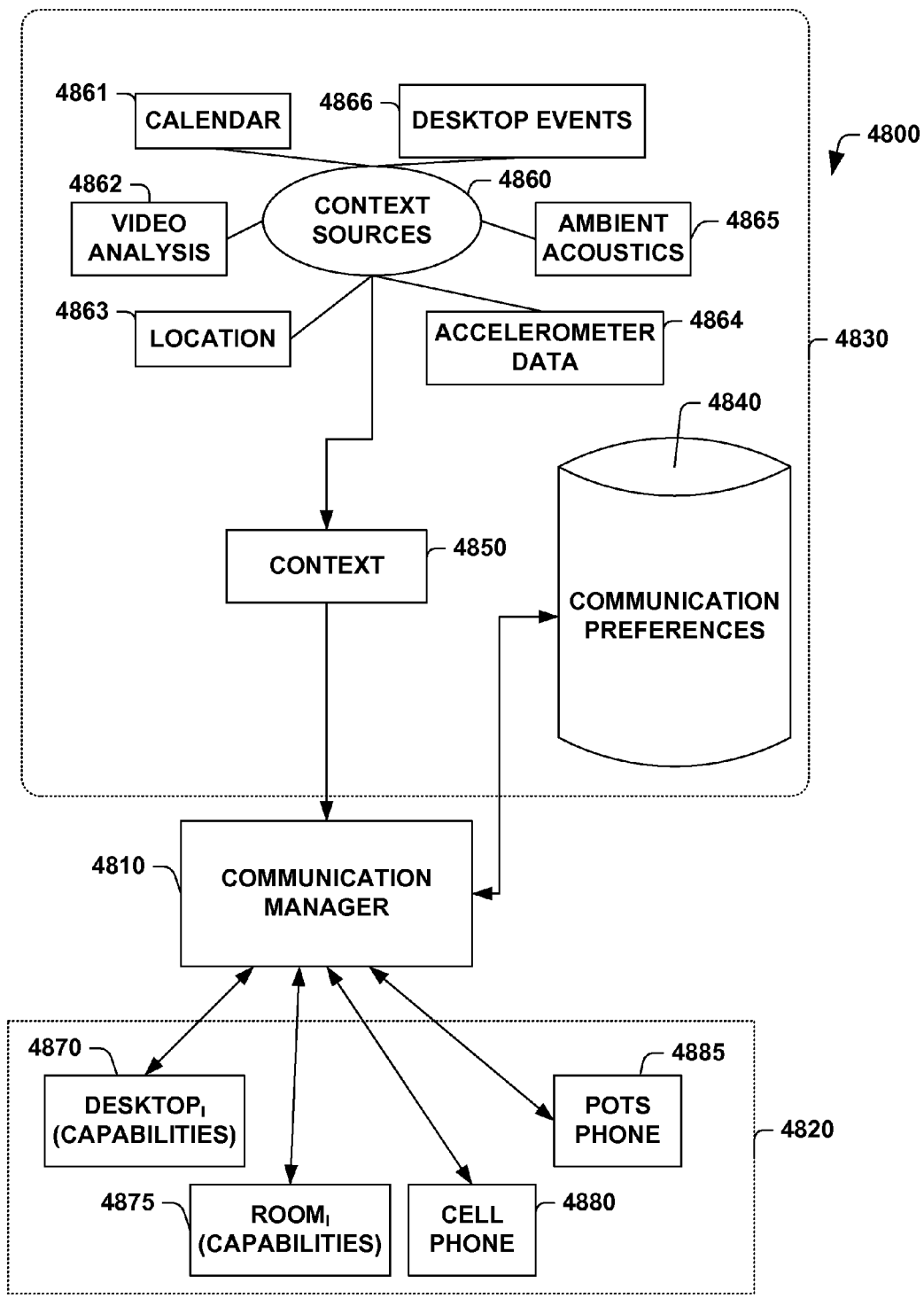
FIG. 59 is a schematic block diagram illustrating context awareness processing in accordance with an aspect of the present invention.

FIG. 59 illustrates an example system 4800 that performs context awareness processing to facilitate identifying and establishing optimal communication modalities. The system 4800 includes a communication manager 4810 operably connected to a set 4820 of possible communication modalities and a set 4830 of information concerning how a communicating party would prefer to communicate and the context of the communicating party. The set 4830 includes a communication preferences data store 4840 and a context 4850. The context 4850 holds information collected from and/or inferred about context sources 4860. The context sources can include, but are not limited to, calendar information 4861, video analysis 4862, location 4863, accelerometer data 4864, ambient acoustic information 4865 and desktop events 4866.

The context 4850 may vary widely depending on the location and task of the contactee. For example, a first contactee in a car moving 85 m.p.h. during rush hour is likely to have one context while a second contactee in a car moving 5 m.p.h. during rush hour is likely to have a different context. Similarly, a contactee piloting a jet fighter that is on autopilot, in clear skies, with no enemies within a thousand miles is likely to have a different context than a pilot currently engaged by surface to air missiles over enemy territory. Closer to home, a parent of grade school aged children at home during school hours on a school day is likely to have a different context than the same parent in the car with the school aged children ten minutes before school starts.

The communication manager 4810 examines the context 4850 and the preferences 4840 in light of the possible communication modalities currently available or likely to become available. The communication modalities can include, but are not limited to, a set 4870 of desktops (e.g., person with more than one computer, person with alternate contacts (e.g., secretary, assistant)), a set 4875 of room capabilities (e.g., person reachable in more than one meeting room, conference room, office), a cell phone 4880 and a POTS telephone 4885. After performing such analyses, the communication manager 4810 is then available to engage or be engaged by other communicating parties employing the present invention, as illustrated in FIG. 60.

Figure 60:
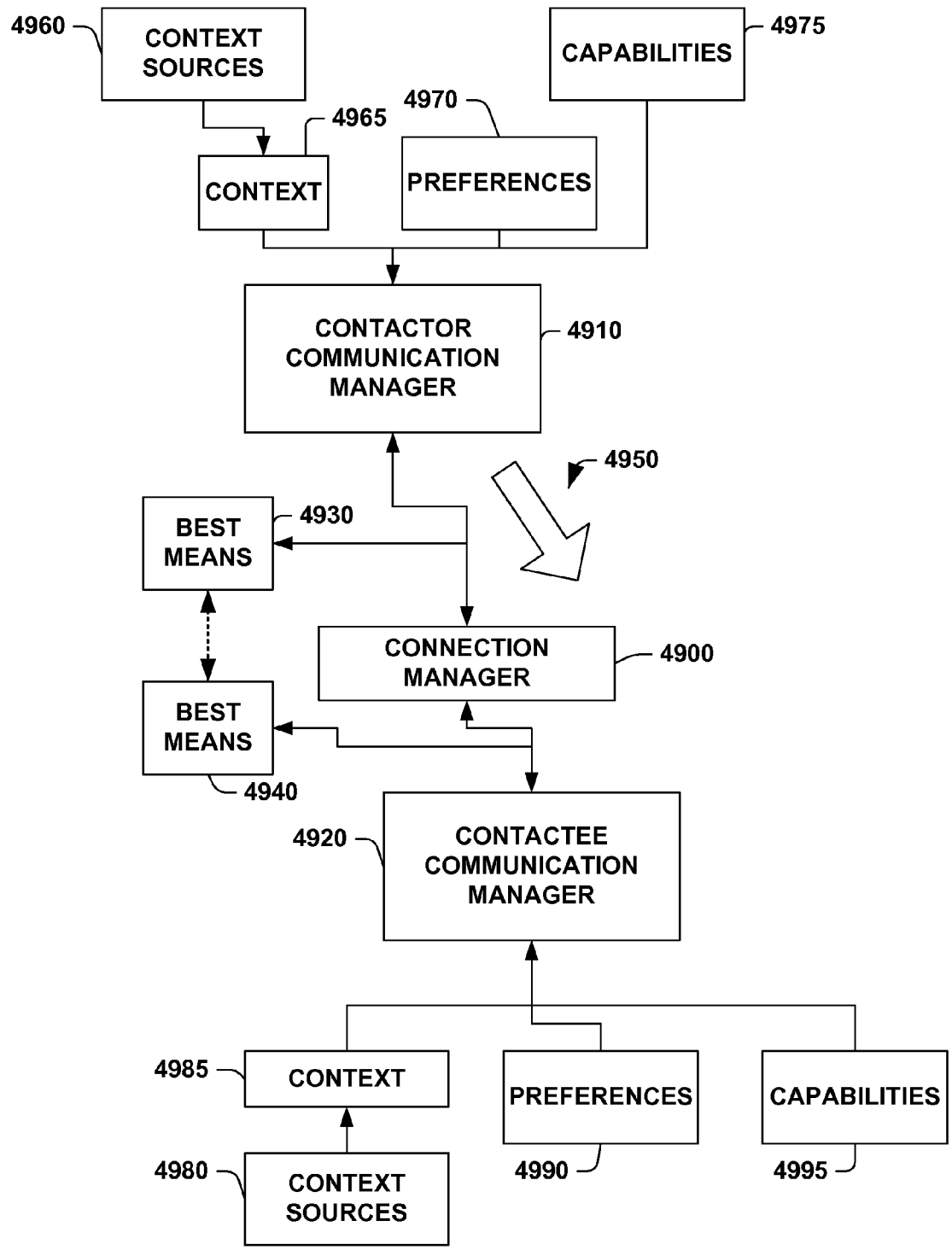
FIG. 60 illustrates processing associated with a contactor attempting a communication, in accordance with an aspect of the present invention.

FIG. 60 illustrates communicating parties employing the present invention and processing associated with a contactor attempting a communication. A connection manager 4900 is operably connected to a contactor communication manager 4910 and a contactee communication manager 4920, where the contactor communication manager 4910 and the contactee communication manager 4920 are examples of the communication manager described in association with FIG. 38. The connection manager 4900 communicates with the contactor communication manager 4910 and the contactee communication manager 4920 to acquire information employed in determining the optimal communication that can be achieved between a contactor best means 4930 for communicating and a contactee best means 4940 for communicating, employing, for example, the methods described in association with FIGS. 56 and 57.

The contactor communication manager 4910, after gathering information and/or making inferences concerning a context 4965 (derived from a plurality of context sources 4960), preferences 4970 and capabilities 4975 may transmit contactor schema 4950 to the connection manager 4900. The schema 4950 can hold information including, but not limited to, contactor identity, contactor history, registered documents, tasks, source modality, requested means and capabilities, for example. Similarly, the contactee communication manager 4920 may be queried, for example, by the connection manager 4900 for information including, but not limited to, contactee context 4985 (derived from a plurality of context sources 4980), contactee preferences 4990 and contactee capabilities 4995. It is to be appreciated that although the contactor communication manager 4910 is described as transmitting data and the contactee communication manager 4920 is described as being queried, that other data communication methods can be employed in accordance with the present invention.

The present invention provides for interacting with hardware and/or software to automatically establish the identified connections. Thus, the contactor in FIG. 52 may be able to make a first decision, that they would like to communicate with a contactee, select means for establishing the "best communication" and then wait for that "best communication" to be established. For example, a contactor word processing a document of interest to a contactee may select a revision in the document and be presented with a menu of options concerning the revision. One of the options may be a "BestCom" option to communicate with the contactee. The person may then select the "BestCom" option, whereupon analysis associated with the present invention would be initiated to establish communications with the contactee. Such processing may cause the contactor to be presented with situations including, but not limited to, display of information concerning a phone conversation being scheduled for later, presentation of a herald that indicates that a telephone call is being put through immediately, an Instant Messenger input field popping up, an email composition form popping up with the appropriate contactee(s) populating the To: field, for example. The situation experienced by the contactor may be based on the contactee's preferences and context.

As mentioned above, a communication modality and/or a contactee may not be immediately available. Thus, the present invention includes methods for predicting the likelihood of when contactee(s) may be available, where such likelihoods can be employed in scheduling group meetings where the utility of the group experience of n participants, n being an integer, is maximized. For example, calendars for the n participants can be examined to infer times at which the participants are likely to be available to share in some modality (e.g., videoconferencing, collaborative editing). Automated meeting request(s) can be constructed from such analysis.

It is to be appreciated that aspects of the present invention may be embodied in a computer readable medium such that a computer readable medium can store computer executable components for a system that facilitates communication between entities in accordance with the present invention. For example the computer executable components can comprise an identifying component that identifies a plurality of communication modalities that respectively provide for communication between at least two entities. Furthermore, the computer executable components can comprise an analyzing component that analyzes a first communication data set associated with a first entity and a second communication data set associated with a second entity, the analyzing component identifying one or more communication modalities of the plurality of modalities based at least in part on analysis of the first and second communication data sets and the analyzing component establishing a communication between the entities.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system to facilitate communications between parties comprising at least one of a contactor and a contactee, the system comprising:
a user interface that receives input specifying N parameters, the N parameters comprising a cost to the contactee of deferring a communication between the parties until a predetermined time, the cost is specified for at least one contactor based on identity of the at least one contactor and a comparison of a current state of the contactee and a future state of the contactee at the predetermined time, the current state comprising at least one first communication modality currently available to the contactee and the future state comprising at least one second communication modality projected to be available to the contactee at the predetermined time;
a data store that receives the N parameters from the user interface, wherein:
N is an integer,
the N parameters relate to at least one of a communications preference, context, or policy,
the N parameters are employed to guide decisions that facilitate communications between the parties, and
at least one of the N parameters relates to the cost to the contactee of deferring the communication; and
at least one computer processor that facilitates communications between the parties based upon a negotiation of the N parameters, wherein the negotiation comprises assessing the cost to the contactee of deferring the communication and a cost to the contactor of deferring the communication until the predetermined time.

2. The system of claim 1, wherein the N parameters further comprise one or more communications configuration parameters.

3. The system of claim 1, wherein the data store further comprises monitoring information for at least one of the contactor and the contactee; wherein the information includes at least one of an inferred or user setting regarding context of the parties or one or more gestures regarding communications preferences and capabilities of the parties; and wherein the context of the parties includes at least one of an availability, a task, a location, a current or recent software usage, an attentional status, a busy-ness state, a calendar appointment status, a recent communication history between at least one of the contactor and the contactee, or a status of shared projects or files among at least one of the contactor and the contactee.

4. The system of claim 3, wherein the one or more gestures is at least one of a predetermined or an inferred gesture that provides information between the parties when communications are attempted; and wherein the one or more gestures further comprise at least one of busy information, availability information, hardware information, channel reliability information, or urgency information.

5. The system of claim 1, wherein the data store further comprises K communications preferences, wherein K is an integer that relates to at least one of a present or future ability to communicate.

6. The system of claim 1, further comprising L selected groupings of potential parties to a communication; wherein L is an integer; and wherein the selected groupings include at least one of a static, a relationship, or a dynamic grouping.

7. The system of claim 6, further comprising M policy settings to control how, when, and if the patties communicate; wherein M is an integer; and wherein the policy settings are assigned to selected groupings via the user interface including at least one of a drag and drop assignment, an advanced assignment, a user-defined assignment, or a conditional assignment.

8. The system of claim 1, wherein the data store further comprises at least one user state; wherein the at least one user state includes at least one of a state of busy-ness or a state of availability; and wherein the at least one user state is configured in at least one of a disjunctive manner or a conjunctive manner.

9. The system of claim 1, wherein the data store further comprises a consideration of the utility of communications for different times in the future, based on current contexts of at least one of the contactor and the contactee, or based on forecasts of future contexts of at least one of the contactor and the contactee.

10. The system of claim 1, wherein the data store further comprises an encoding of preference information in a parameter representing at least one of the cost to the contactor of deferring the communication and the cost to the contactee of deferring the communication as a function of time and at least one of an identity, group memberships, relationships, or contexts of at least one of the contactor and the contactee.

11. The system of claim 10, wherein the encoding of preference information includes at least one of the cost of to the contactor deferring the communication and the cost to the contactee of deferring the communication, based on a decision-theoretic analysis of an expected utility of the best modality and time for scheduling a communication.

12. The system of claim 11, wherein the encoding of preference information includes a contactee's desire to communicate a stored message with contactors associated with at least one of particular identities, groups, or contexts to receive; and wherein the encoding of preference information relating to the contactee is stored to capture preferences about communicating some portion of the present or future context of the contactee.

13. A method to facilitate communications between parties comprising a contactor and a contactee, the method comprising:
with at least one processor:
negotiating at least one of a communications preference, context, or policy between of the contactor and the contactee who desire to enter into a communication session, wherein the negotiation uses a cost to the contactor of deferring the communication session between the parties until a predetermined time and a cost to the contactee of deferring the communication session between the parties until the predetermined time, the cost to the contactee is specified by the contactee for the contactor based on an identity of the contactor and based on a comparison of a current state of the contactee and a projected state of the contactee at the predetermined time, the current state comprising at least one first communication modality currently available to the contactee and the projected state comprising at least one second communication modality projected to be available to the contactee at the predetermined time;
employing the at least one of the communications preference, context, or policy to guide decisions that facilitate communications between the contactor and the contactee; and
conducting the communication session based on the negotiation of the at least one of the communications preference, context, or policy.

14. The method of claim 13, further comprising:
monitoring information for at least one of the contactor and the contactee that includes at least one of an inferred or user setting regarding context of the parties or one or more gestures regarding communications preferences and capabilities of the parties; wherein the context of the parties includes at least one of an availability, a task, a location, a current or recent software usage, an attentional status, a busy-ness state, a calendar appointment status, a recent communication history between at least one of the contactor and the contactee, or a status of shared projects or files among at least one of the contactor and the contactee.

15. The method of claim 14, further comprising:
providing information between the parties when communications are attempted as a function of the one or more gestures; and wherein the one or more gestures further comprise at least one of busy information, availability information, hardware information, channel reliability information, or urgency information.

16. The method of claim 13, further comprising:
controlling how, when, and if the parties communicate as a function of policy settings; wherein the policy settings are assigned to selected groupings via a user interface including at least one of a drag and drop assignment, an advanced assignment, a user-defined assignment, or a conditional assignment.

17. The method of claim 13, further comprising:
considering the utility of communications for different times in the future, based on current contexts of at least one of the contactor and the contactee or based on forecasts of future contexts of at least one of the contactor and the contactee.

18. The method of claim 13, further comprising:
encoding preference information in a parameter representing at least one of the cost to the contactor of deferring the communication and the cost to the contactee of deferring the communication as a function of time and at least one of an identity, group memberships, relationships, or contexts of at least one of the contactor and the contactee.

19. A computer system to facilitate communications between parties, the computer system comprising:
at least one processor; and
at least one first process configured to, when executed with the at least one processor, negotiate communication preferences between the parties, wherein the communications preferences are based on at least one of a present or future ability to communicate;
at least one second process configured to monitor information for the parties, wherein the information includes a recent communication history between the parties and a status of shared projects or files among the parties; and
at least one third process configured to facilitate optimal communications between the parties based on the monitored information and negotiated communications preferences.

20. The system of claim 19, further comprising:
at least one fourth process configured to select groupings of potential parties to a communication, wherein the groupings comprise at least one of a static, a relationship, or a dynamic grouping.

* * * * *